United States Patent [19]
Mangiapane et al.

[11] Patent Number: 5,173,707
[45] Date of Patent: Dec. 22, 1992

[54] ALL WEATHER TACTICAL STRIKE SYSTEM (AWTSS) AND METHOD OF OPERATION

[75] Inventors: Rosario Mangiapane, Burlington; Theodore J. Peregrim, Bedford; Arthur Crain, Framingham; Gordon L. Kettering, Bedford; Ken W. Chang, Arlington, all of Mass.

[73] Assignee: Raytheon Company, Lexington, Mass.

[21] Appl. No.: 234,032

[22] Filed: Dec. 29, 1980

[51] Int. Cl.$^5$ .............................................. G01S 13/44
[52] U.S. Cl. .................................................. 342/149
[58] Field of Search ...................... 343/16 M; 342/149

[56]           References Cited
       U.S. PATENT DOCUMENTS

| | | | |
|---|---|---|---|
| 4,134,113 | 1/1979 | Powell | 342/149 X |
| 4,204,210 | 5/1980 | Hose | 342/149 X |
| 4,219,816 | 8/1980 | Schenkel et al. | 342/149 X |
| 4,387,373 | 6/1983 | Longuemare, Jr. | 342/149 X |

*Primary Examiner*—T. H. Tubbesing

*Attorney, Agent, or Firm*—Donald F. Mofford; Richard M. Sharkansky

[57]            ABSTRACT

An AWTSS is shown to be made up of an improved synthetic aperture radar (SAR) for generating radar maps with various degrees of resolution required for navigation of an aircraft and detection of ground targets in the presence of electronic countermeasures and clutter. The SAR consists, in effect, of four frequency-agile radars sharing quadrants of a single array antenna mounted within a radome on a "four axis" gimbal with a sidelobe cancelling subarray mounted at the phase center of each quadrant. Motion sensors are also mounted on the single array antenna to provide signals for compensating for vibration and stored compensating signals are used to compensate for radome-induced errors. In addition, a signal processor is shown which is selectively operable to generate radar maps of any one of a number of desired degrees of resolution, such processor being adapted to operate in the presence of clutter or jamming signals.

1 Claim, 23 Drawing Sheets

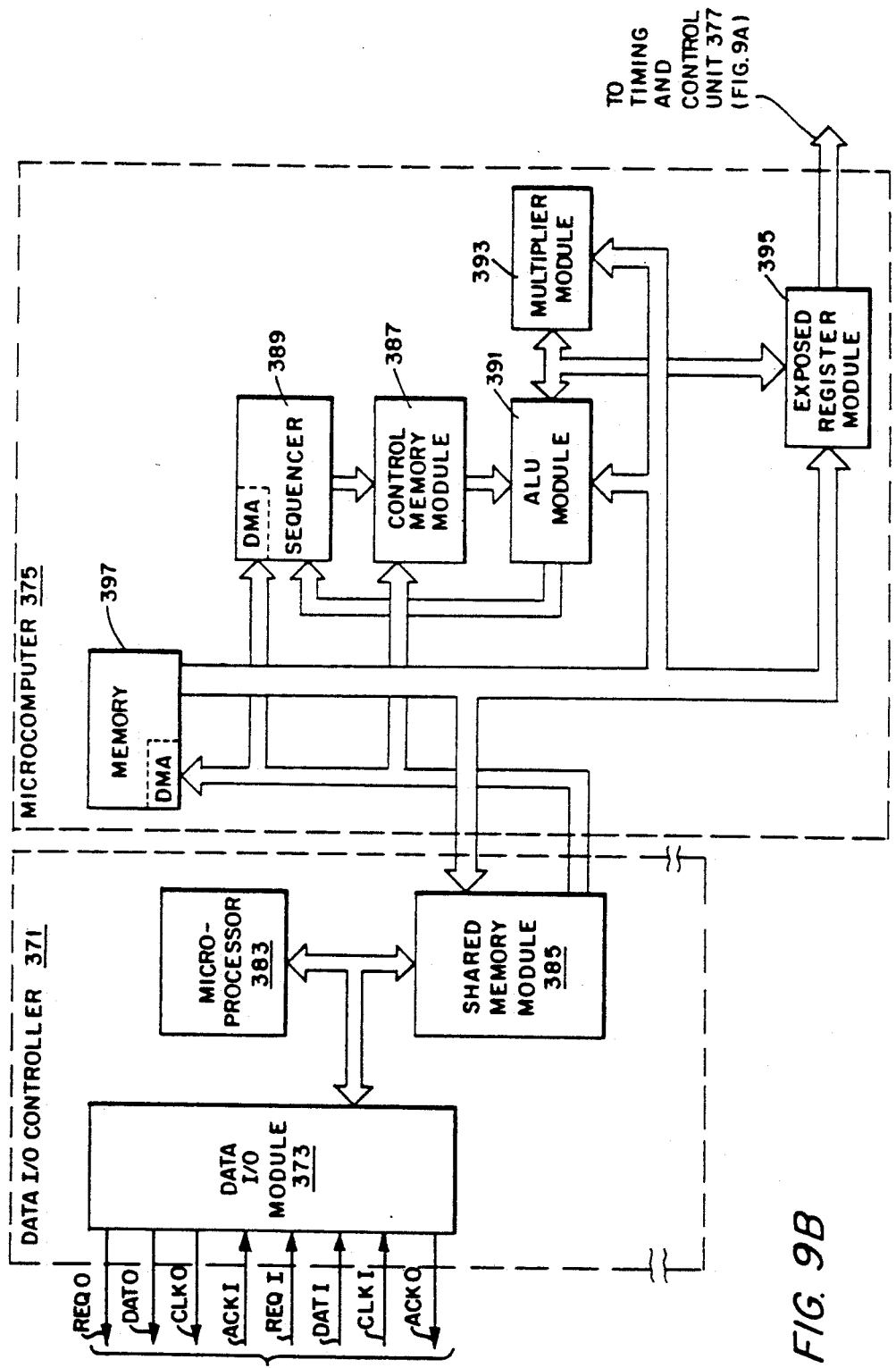

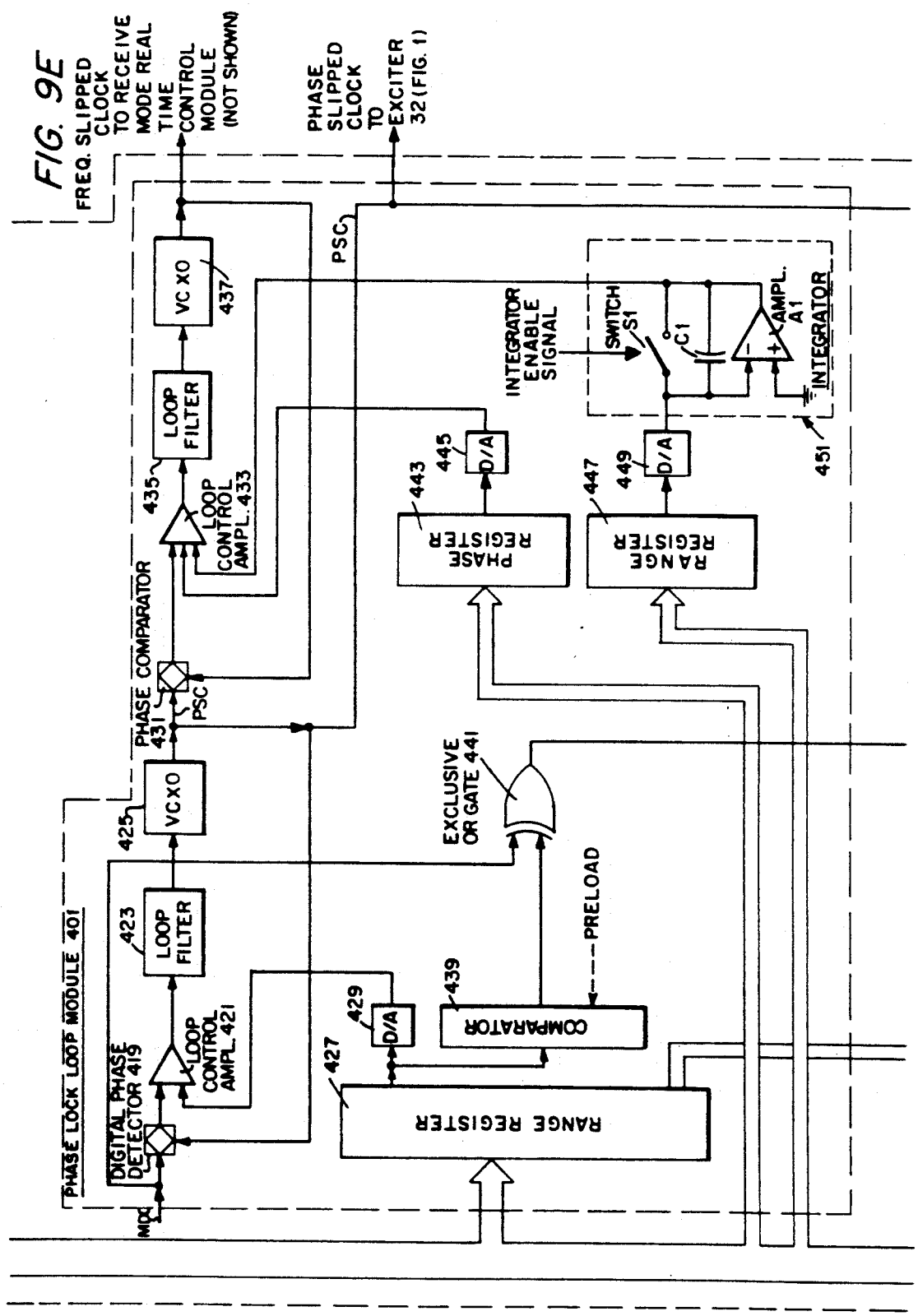

ALL WEATHER TACTICAL STRIKE SYSTEM (AWTSS) AND METHOD OF OPERATION

BACKGROUND OF THE INVENTION

This invention pertains generally to air-to-ground guided missile systems and particularly to systems of such type wherein a synthetic aperture radar is used to provide a map of optical quality of the terrain underlying an aircraft so that the position of ground targets may be determined with precision and an air-to-ground missile may be accurately guided to impact on any selected one of such ground targets.

It has been postulated for some years that, in the field of guidance systems for air-to-ground guided missiles, advantage could very well be taken of the speed and precision with which radar maps may be generated by processing echo signals to a synthetic aperture radar to provide guidance systems having "all-weather" capability.

Any satisfactory "All Weather Tactical Strike System" (hereinafter referred to by the acronym "AWTSS") must, in addition to possessing a guidance capability for air-to-ground guided missiles, have a capability of functioning as a navigational aid for the aircraft carrying the AWTSS and as a target acquisition and tracking means. All of the required functions, further, must be carried out in a hostile environment, meaning when the aircraft is maneuvering violently to avoid interdicting fire and when electronic countermeasures are being taken by the enemy. The fact that satisfactory operation in a hostile environment is a requisite has, to date, made it impossible to provide an AWTSS which may be used with any reasonable confidence of success.

SUMMARY OF THE INVENTION

With the foregoing background of this invention in mind, it is a primary object of this invention to provide an AWTSS which is capable of performing, in a hostile environment, all of the requisite actions of such a system.

A further object of this invention is to provide an AWTSS which uses a single radar to carry out the desired functions.

The foregoing and other objects of this invention are generally attained by providing, in a tactical aircraft carrying air-to-ground missiles, an improved pulse Doppler radar and signal processor, which radar and processor operate in conjunction with inertial measuring devices also carried on the aircraft to operate as desired in any of the modes of operation required for an AWTSS. Specifically, the contemplated radar and signal processor are arranged to be substantially immune to electronic countermeasures and to be operative even when the aircraft equipped with the contemplated AWTSS is violently maneuvered.

BRIEF DESCRIPTION OF THE DRAWINGS

For a more complete understanding of this invention, reference is now made to the following description of the accompanying drawings, wherein:

FIGS. 9B through 9F are block diagrams of various portions of the radar synchronizer shown in FIGS. 1 and 9A;

DESCRIPTION OF THE PREFERRED EMBODIMENT

Figure 1:
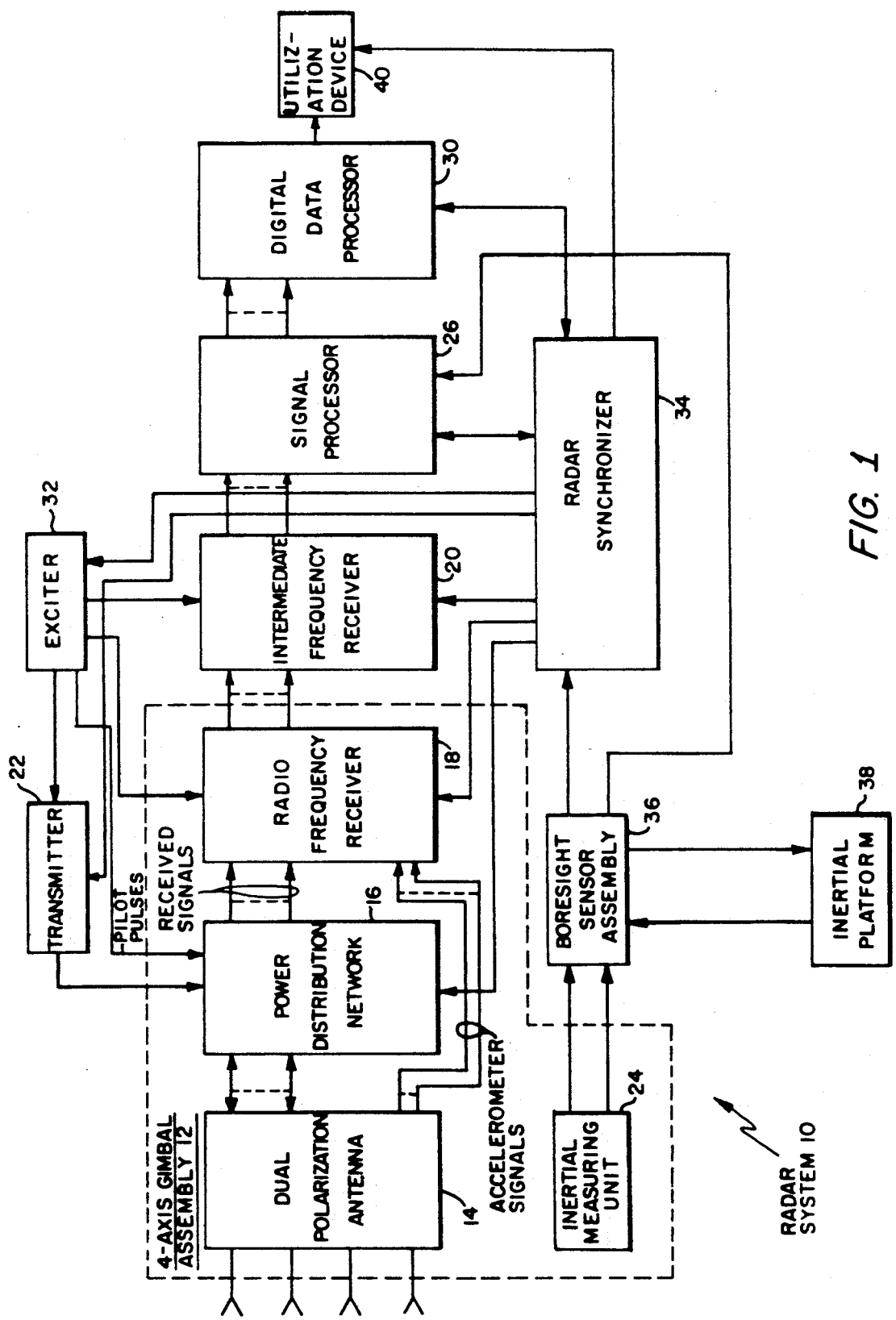
FIG. 1 is a block diagram showing generally the interconnections between the major components of the contemplated AWTSS.

General (FIG. 1)

Figure 3A:
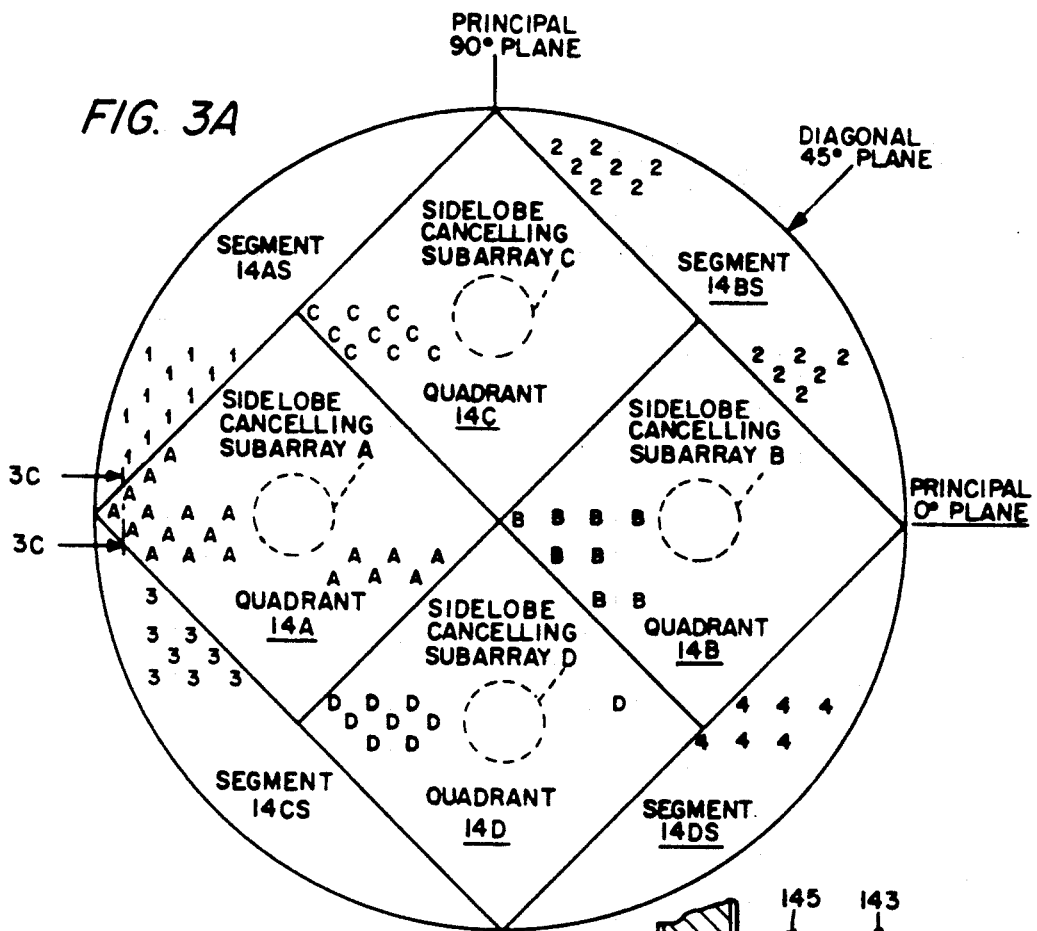
FIG. 3A is a sketch illustrating how the antenna elements of a planar array are arranged to provide the quadrants and segments here contemplated.

Referring now to FIG. 1, the herein contemplated synthetic aperture pulse Doppler radar system 10 is shown generally to include an antenna 14, a power distribution network 16, a multichannel radio frequency receiver (sometimes hereinafter referred to simply as R.F. receiver 18) and an inertial measuring unit 24, all of which are mounted on a four-axis gimbal assembly 12 and are to be described hereinbelow. Suffice it to say here that the antenna 14 has dual polarization and is divided into four separate quadrants and four segments, as shown in FIG. 3A, with a subarray of sidelobe cancelling elements in each separate quadrant. Radio frequency (R.F.) power from a transmitter 22 is fed to the antenna 14 via the power distribution network 16 which, in the receive mode of operation, directs the signals received by each antenna quadrant to the R.F. receiver 18. It is noted here in passing that the output signals from the subarrays are multiplexed into a single receiver channel in a manner which will be described in detail hereinbelow. The R.F. receiver 18 is effective to heterodyne the received signals to suitable intermediate frequency (I.F.) signals which are subsequently passed to an I.F. receiver 20 mounted off the four-axis gimbal assembly 12.

The inertial measuring unit 24 (sometimes hereinafter referred to as the head mounted IMU 24) comprises a pair of cross accelerometers, a boresight accelerator located on the back center of the antenna and three mutually orthogonal rate gyroes. In addition, a total of five vibration-sensitive piezoelectric accelerometers (not shown) are provided directly on the rear face of the antenna 14, one at the geometric center of such face and one at the center of each antenna quadrant. The output signals from the piezoelectric accelerometers (not shown) are passed to the R.F. receiver 18 wherein they are processed in a manner to be described in detail hereinbelow ultimately to phase-compensate the received signals to eliminate vibration-induced sidebands.

The output signals from the I.F. receiver 20, converted to digital format, are sent to a signal processor 26 wherein motion compensation and spectrum analysis are performed in accordance with a Fast Fourier Transform (FFT) algorithm. The resulting data are passed to a digital data processor 30 which serves as the command and control computer for the radar system 10 and generates, inter alia, angle pointing commands for the four-axis gimbal assembly 12 and timing commands for a radar synchronizer 34. It is noted here in passing that the requisite tracking loops (not shown) to maintain frequency control and to control the antenna 14 are implemented within the digital data processor 30. Completing the radar system 10 are an exciter 32 (which generates the transmitted waveforms as well as the local oscillator signals for the R.F. receiver 18 and the I.F. receiver 20), a utilization device 40 (which may, for example, be a cathode ray display tube), an inertial platform 38, and a boresight sensor assembly 36. The latter two units provide phase rotation multipliers to the signal processor 26 which are used for motion compensation of the received signals.

Figure 2A:
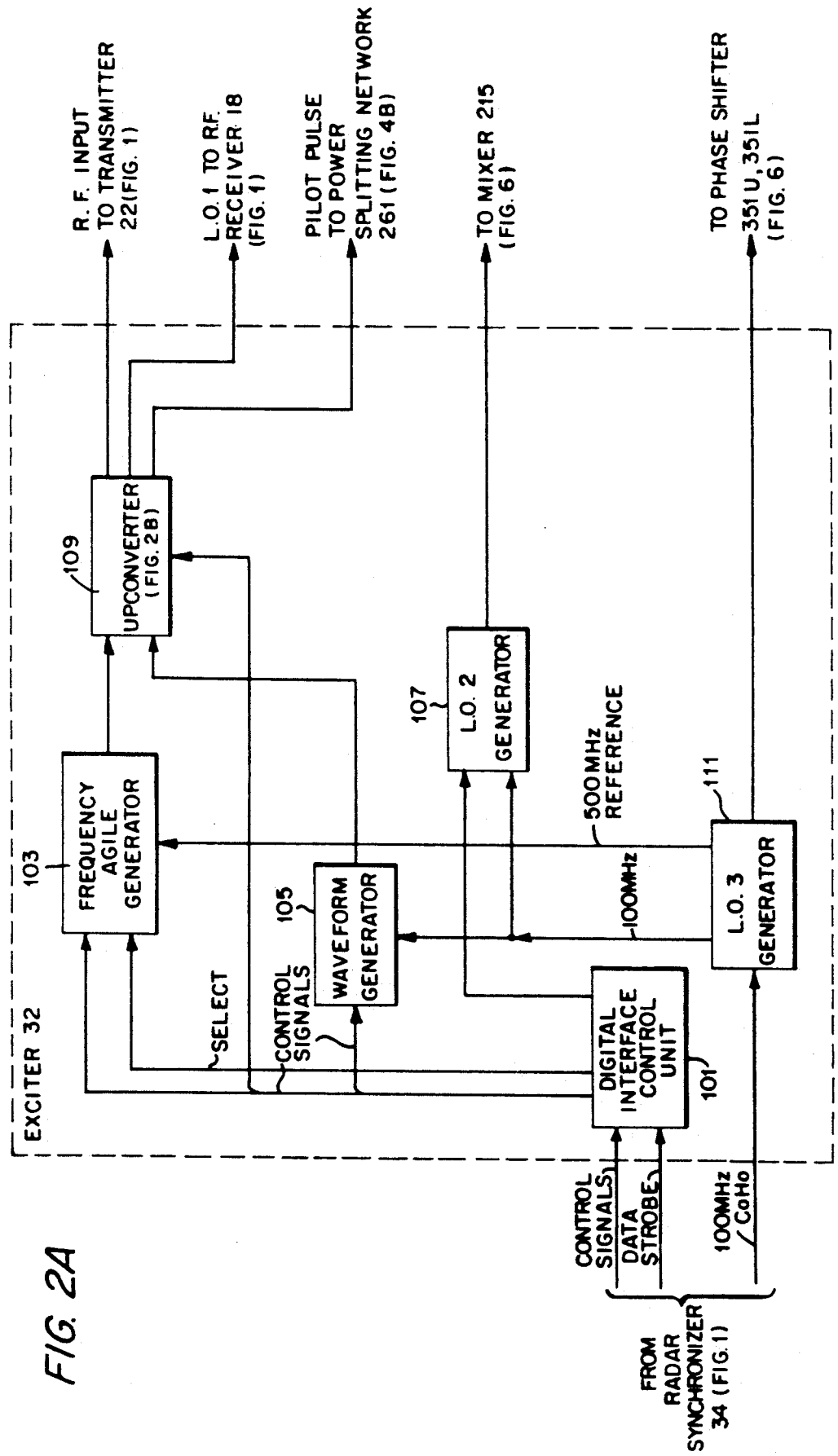
FIGS. 2A and 2B, taken together, constitute a block diagram of the exciter shown in FIG. 1 to be used.
Figure 2B:
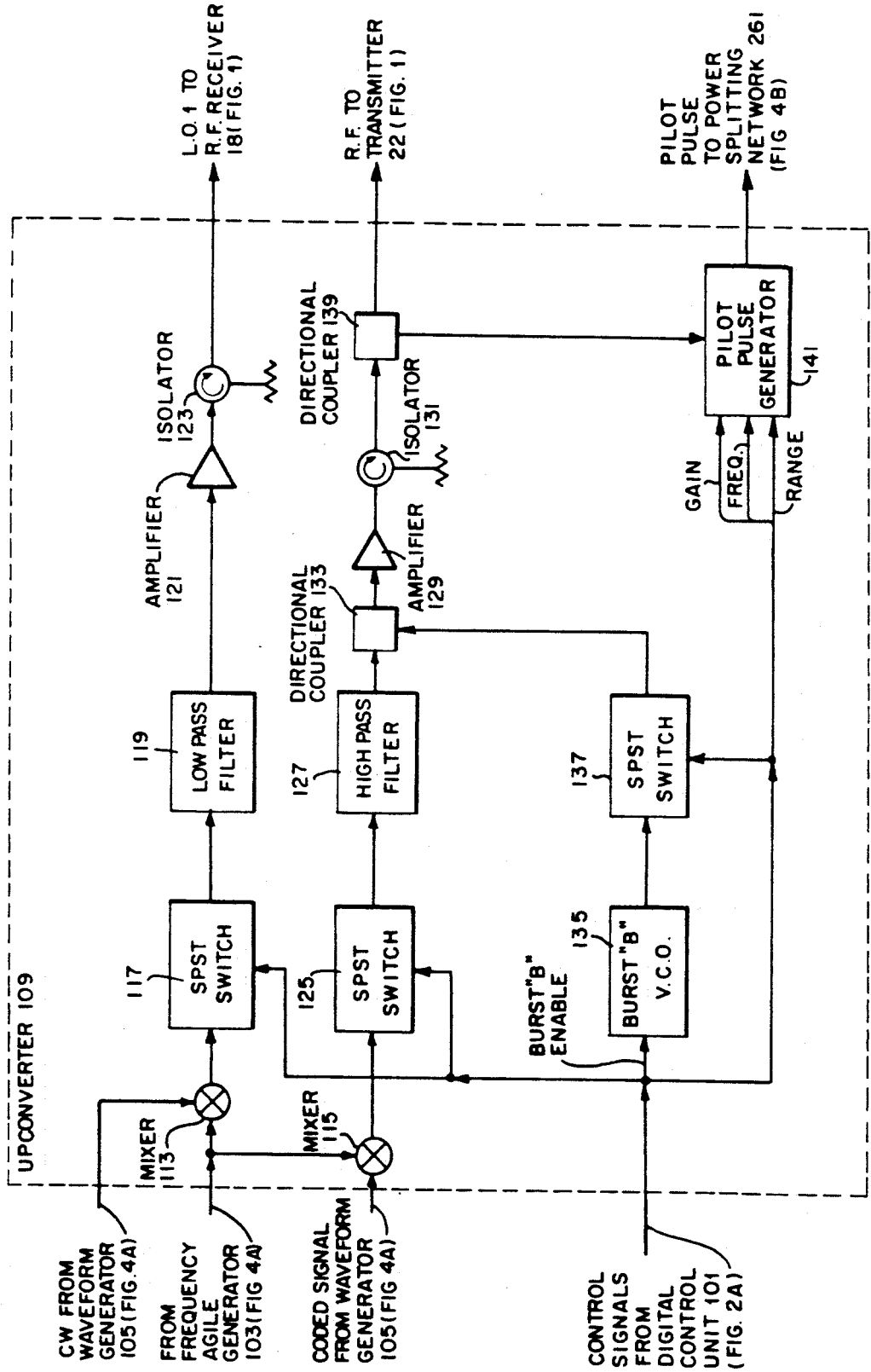

Exciter (FIGS. 2A, 2B)

The transmit, receive and ECCM waveforms required to support the radar system 10 (FIG. 1) are generated in the exciter 32. The coherent transmitted signals are either CW waveforms, frequency modulated (FM) chirp or binary phase modulated waveforms, sometimes referred to hereinafter as a Burst A waveform. In addition, a noncoherent waveform, referred to hereinafter as a Burst B waveform or a "spoof" waveform, may be transmitted as a counter counter-measure against jammers. Finally, the requisite local oscillator signals for coherently processing Burst A waveforms are generated in the exciter 32.

Each kind of Burst A waveforms contains signals which are frequency-agile from pulse-to-pulse following an ordered set of four frequencies. Each Burst B waveform is made up of a total of one to four uncoded, frequency-agile, but noncoherent, pulses which are interlaced between pulses of a Burst A waveform.

Referring now to FIGS. 2A and 2B, control signals from the radar synchronizer 34 (FIG. 1) are shown applied to a digital interface control unit 101. Such control signals are applied to the digital interface control unit 101 in serial format, non-real time. Control signals applied to the digital interface control unit 101 are stored until required by the various subassemblies of the exciter 32. A DATA STROBE pulse, also provided by the synchronizer 34 (FIG. 1), is then effective to cause control signals to be taken out of the digital interface control unit after having been converted in a known manner to analog signals whenever required.

Control signals from the digital interface control unit 101 are applied to a frequency-agile generator 103, a waveform generator 105 and a second local oscillator (designated L.O. 2 generator 107). The output signals from the frequency-agile generator 103 and the waveform generator 105 are provided to an unconverter 109 (shown in greater detail in FIG. 2B) wherein the RF INPUT signal for the transmitter 22 (FIG. 1), the first local oscillator signal (L.O. 1) for the RF receiver 18 (FIG. 1) and the PILOT PULSE signal are developed.

Figure 6:
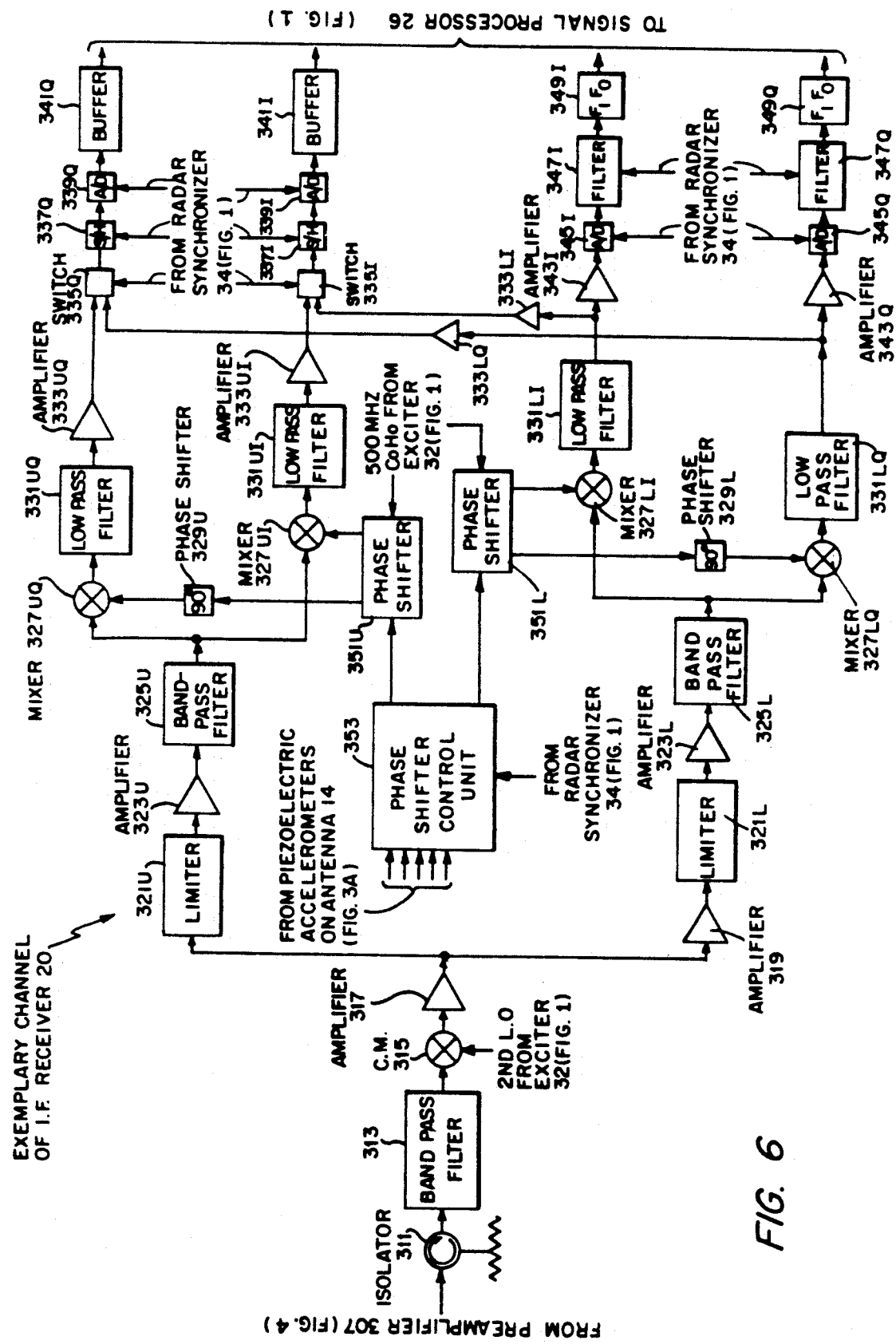
FIG. 6 is a block diagram of an exemplary channel of the intermediate frequency receiver shown in FIG. 1.

A 100 MHz COHO signal (the coherent local oscillator signal) is passed directly from the synchronizer 34 (FIG. 1) to a local oscillator (L.O. 3 generator 111) to "phase lock" a 100 MHz voltage-controlled oscillator (not shown) in a conventional manner to provide a low noise COHO signal having both good long-term and short-term stability. The narrow band characteristics of the phase lock loop (not shown) eliminate interference picked up in the cable (not shown) between the synchronizer 34 and the exciter 32 which would otherwise appear as jitter on the generated waveforms. The low noise COHO signal is provided as a reference signal to the waveform generator 105 and the L.O. 2 generator 107 and, after appropriate multiplication to 500 MHz, is applied to the frequency-agile generator 103 and also to phase shifters 351U, 351L (FIG. 6).

The frequency-agile generator 103 is of conventional design, here being made up of a total of four voltage-controlled oscillators (not shown) arranged so that a total of four tunable bandwidths of from 1 to 1.6 GHz may be achieved. The output frequency of each of the voltage-controlled oscillators is determined in a known manner by an associated phase-lock loop (PLL) with the 500 MHz COHO signal from the L.O. 3 generator 111 as the reference signal. The control signals to the frequency-agile generator 103 from the digital interface control unit 101 are converted to equivalent offset voltages for each of the voltage-controlled oscillators. The resulting signals out of the voltage-controlled oscillators are then selectively heterodyned in a conventional manner with a reference signal at C-band (such signal being generated within the frequency-agile generator 103 in a conventional manner). The resulting C-band signals are filtered and amplified to provide a set of frequency-agile signals to the upconverter 109.

The waveform generator 105, which is also of conventional design, generated modulating waveforms which are impressed on the output signals from the frequency-agile generator 103 to produce the input signals to the transmitter 22 (FIG. 1). Here the waveform generator 105 provides either a binary phase-coded waveform, a FM chirp waveform or a CW waveform. To produce the binary phase-coded waveform a first portion of the 100 MHz COHO input signal to the waveform generator 105 is multiplied by a factor of 11 in a frequency multiplier to produce a 1.1 GHz signal.

Such signal is band-pass filtered and applied to a PIN diode modulator wherein phase is switched between 0° and 180° in response to control signals from the digital interface control unit 101. The output signals from the PIN diode modulator are passed, via a single-pole double-throw switch and an amplifier, as an input signal to the upconverter 109. The single-pole double-throw switch, in response to control signals supplied by the digital interface control unit 101, is effective to select the waveform applied to the upconverter 109. It will be appreciated by those of skill in the art that a CW waveform for application to the upconverter 109 may be derived from the output of the waveform generator 105 by not actuating the pin diode modulator. It will also be appreciated that, as is done here for reasons to be explained, a CW waveform may be applied to the upconverter 109 by tapping the output of the bandpass filter.

In order to produce an FM chirp waveform, a portion of the 100 MHz COHO input signal to the waveform generator 105 is first multiplied by a factor of 72 in a frequency multiplier to produce a signal at 7.2 GHz. A voltage-controlled oscillator is operated periodically to sweep the frequency of its output signal from 8.3 to 8.9 GHz which is mixed with a signal at 7.2 GHz to produce, inter alia, a signal (a chirp waveform) which periodically varies from 1.1 to 1.7 GHz. After appropriate filtering, only the latter chirp waveform is passed through the single-pole double-throw switch to the upconverter 109.

At the upconverter 109 the 8.3 to 8.9 GHz output signal from the frequency-agile frequency generator 103 is applied as an input signal to each one of a pair of mixers 113 and 115. The second input signal to mixer 113 is a CW signal at 1.1 GHz from the waveform generator 105, such DW signal being taken from the output of the bandpass filter (not shown) in the waveform generator 105. The output signals from the mixer 113 are passed, via a single-pole single throw switch 117, to a low pass filter 119. That filter allows only the lower sideband signal from the mixer 113 to be passed so that a set of first local oscillator (L.O.) signals with frequencies 7.2 to 7.8 GHz appear at the output of the low pass filter 119 corresponding with the signals out of the frequency-agile frequency generator 103. The first L.O. signals are passed, via an amplifier 121 and an isolator 123, to the R.F. receiver 18 (FIG. 1).

The second input signal to the mixer 115 is the coded signal from the waveform generator 105 (a CW, phase-coded or chirp waveform). The output signals from the mixer 115 are passed, via a single-pole single-throw switch 125, to a high pass filter 127 which is effective to pass only the upper sideband signals from the mixer 115. Such filtered signals are passed, via directional couplers 133, 139, an amplifier 129 and an isolator 131, to the RF transmitter 22 (FIG. 1). It will now be appreciated that the single-pole single-throw switches 117, 125 are actuated (by a control signal from the digital interface control unit 101) so that the drive signal to the transmitter 22 (FIG. 1) is "off" when the RF receiver 18 (FIG. 1) is "on".

The directional coupler 133 and a single-pole single-throw switch 137 are provided to allow Burst "B" waveforms from a Burst "B" V.C.O. 135 to be passed to the transmitter 22 (FIG. 1). The Burst "B" generator 135 incorporates a voltage-controlled oscillator whose frequency differs from any passing through the high pass filter 127. The actuation of the single-pole single-throw switch 137 is determined by control signals provided by the digital interface control unit 101.

The second directional coupler 139 is positioned to couple a portion of the signal to the transmitter 22 (FIG. 1) to a pilot pulse generator 141. The latter, which is here of conventional design, is provided to generate a simulated target return signal for the purpose of calibrating the radar system 10 (FIG. 1). Thus, the pilot pulse generator 141 is shown to receive from the digital interface control unit 101, GAIN, FREQUENCY and RANGE commands. The GAIN command controls the gain of an amplifier (not shown) to provide simulated target return signals with different amplitudes. The FREQUENCY command controls a voltage-controlled oscillator (not shown) whose output signal is mixed with the coupled input signal in order to provide simulated target return signals with different Doppler frequencies. The RANGE command controls a variable delay line (also not shown) which is used to simulate target return signals from targets at different ranges.

The L.O. 2 generator 107 is also of conventional design. This unit develops any of the requisite L.O. signals to down-convert received signals in the I.F. receiver 20 (FIG. 1) to a second I.F. frequency. To this end, the 100 MHz COHO signal from the L.O. 3 generator 111 is multiplied by a factor of 66 in a frequency multiplier to produce a 6.6 GHz signal which is applied as a reference signal to a mixer (not shown). The second input signal to the latter is obtained from a voltage-controlled oscillator which is tunable from 8.3 to 8.9 GHz. The control signals to control that oscillator (as well as a ramp signal required to "dechirp" a received chirp waveform) are obtained from the digital interface control unit 101. The signal from the mixer is passed through a 1.7 to 2.3 GHz low pass filter to reject the upper sideband signal from the mixer, amplified and then passed (via an isolator) to a mixer 315 (FIG. 6) in the F.F. receiver 20 (FIG. 1).

Transmitter (FIG. 1)

The transmitter 22 (FIG. 1) is of conventional design and comprises a liquid-cooled traveling wave tube (TWT) amplifier. A variable attenuator (not shown) and a drive amplifier (also not shown), both of which are controlled by the radar synchronizer 34 (FIG. 1), are provided on the input to the TWT to provide a power management capability as well as to ensure that the power from the TWT remains constant with frequency and the TWT (not shown) does not saturate. The output power from the TWT is passed via an isolator (not shown) and a harmonic filter (also not shown) to the power distribution network 16 (FIG. 1).

Figure 3B:
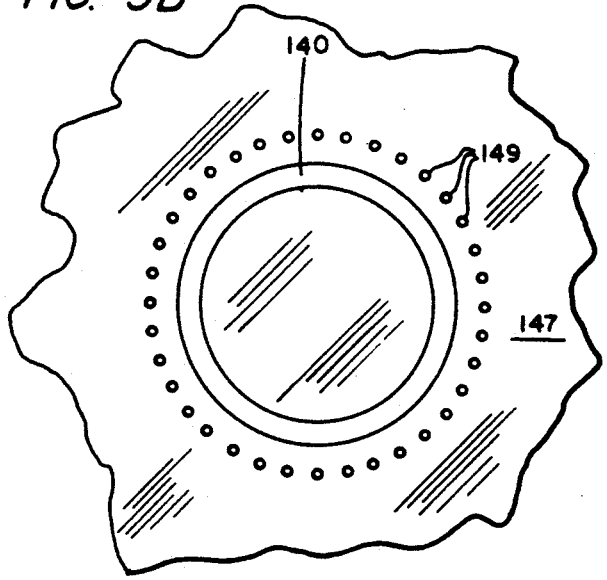
FIGS. 3B and 3C are views showing details of construction of the planar array of FIG. 3A.
Figure 3C:
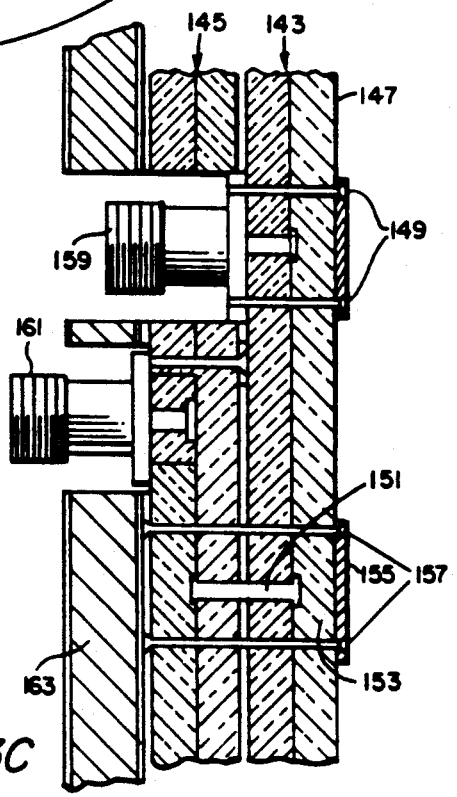

Dual Polarization Antenna (FIGS. 3A, 3B, 3C)

Referring now to FIGS. 3A to 3C, the dual polarization antenna 14 comprises an array of 560 dual-polarized, stripline fed annular slot radiating elements 140 (sometimes hereinafter referred to simply as elements 140), which are capable of simultaneously supporting orthogonal linear polarizations. That is to say, in the transmit mode the elements 140 radiate circularly polarized signals of either sense, while in the receive mode the received circularly polarized signals are resolved into orthogonal linearly polarized signals. The antenna aperture is subdivided into four identical quadrants 14A, 14B, 14C and 14D, each containing 100 elements, and four identical segments 14AS, 14BS, 14CS and 14DS, each containing 40 elements. The center four elements of each of the quadrants 14A, 14B, 14C and 14D are combined to form a sidelobe cancelling subarray (not numbered) for their respective quadrants. It should be noted here that while the sidelobe cancelling subarrays (not numbered) are utilized primarily in the receive mode, provision is made to allow the former to be utilized in the transmit mode. It should also be noted here that the antenna aperture (not numbered) is divided into square quadrants rather than serrated quadrants even though the latter design would produce low quadrant sidelobes in the 0°, 45° and 90° planes of the antenna 14. If the quadrants 14A, 14B, 14C and 14D were serrated the grating lobes would be randomly distributed to either side of the principal and diagonal planes of the antenna 14. The square quadrant configuration was here chosen because, in such a configuration, the sidelobes are known to lie along the diagonal planes so that compensation for such sidelobes may be effected.

The dual polarization antenna 14 and its requisite low and medium power feed networks (not shown) are contained entirely in two stripline packages 143, 145, respectively. The elements 140 are annular slots, one free-space wavelength in circumference, with an inter-element spacing of 0.707 inches by 0.707 inches on a 45° grid. The elements 140 are etched in the upper ground plane 147 of the first stripline package 143 which also contains the low power feed network. Mode suppression pins 149 are provided around each of the radiating elements 140.

The low power feed network (not shown) comprises a plurality of reactive type, binary 3 dB power dividers of conventional design, arranged to provide each radiating element 140 with a pair (referred to as the vertically and horizontally polarized feed signals) of linearly polarized feed signals in space and phase quadrature. Each of the reactive type power dividers feeds a total of eight radiating elements 140 with the power for each such divider being derived from a medium power feed network contained in the second stripline package 145. The requisite interconnections between the low and medium power feed network (not shown) are provided by means of feedthrough pins 151. Dielectric plugs 153 are inserted over the feedthrough pins 151 and metallic plates 155 are provided over the dielectric plugs 153. Mode suppression pins 157 are provided around each of the feedthrough pins 151. Coaxial connectors 159 are attached in any convenient manner, as by means of screws (not numbered), to the stripline package 143 containing the low power feed network (not shown). Coaxial connectors 161 are similarly attached to stripline package 145 containing the medium power feed network (also not shown). It should be noted here that the latter network provides a total of sixteen output signals (two vertically and two horizontally polarized signals from each one of the four antenna quadrants 14A, 14B, 14C and 14D) which are passed, via coaxial cables (not shown), to the power distribution network 16 (FIG. 1). A total of 16 outputs, corresponding to two vertically and two horizontally polarized signals from the side-lobe cancelling elements in each of the four quadrants of the antenna 14, are provided by the low power feed network (not shown) and are passed, via coaxial connectors 159, and coaxial cables (not shown), to the R.F. receiver 18 (FIG. 1).

The stripline packages 143, 145 are bonded together to form a composite assembly mounted to an aluminum honeycomb support structure 163. Such structure then renders the stripline packages 143, 145 impervious to the effects of vibration and, at the same time, provides a support member for the power distribution network 16 (FIG. 1) and the R.F. receiver 18 (FIG. 1).

A small monopole antenna (not shown) is disposed at the geometric center of the antenna 145 and is excited by the PILOT PULSE signals provided by the power distribution network 16 when the antenna 14 is to be calibrated.

Figure 4A:
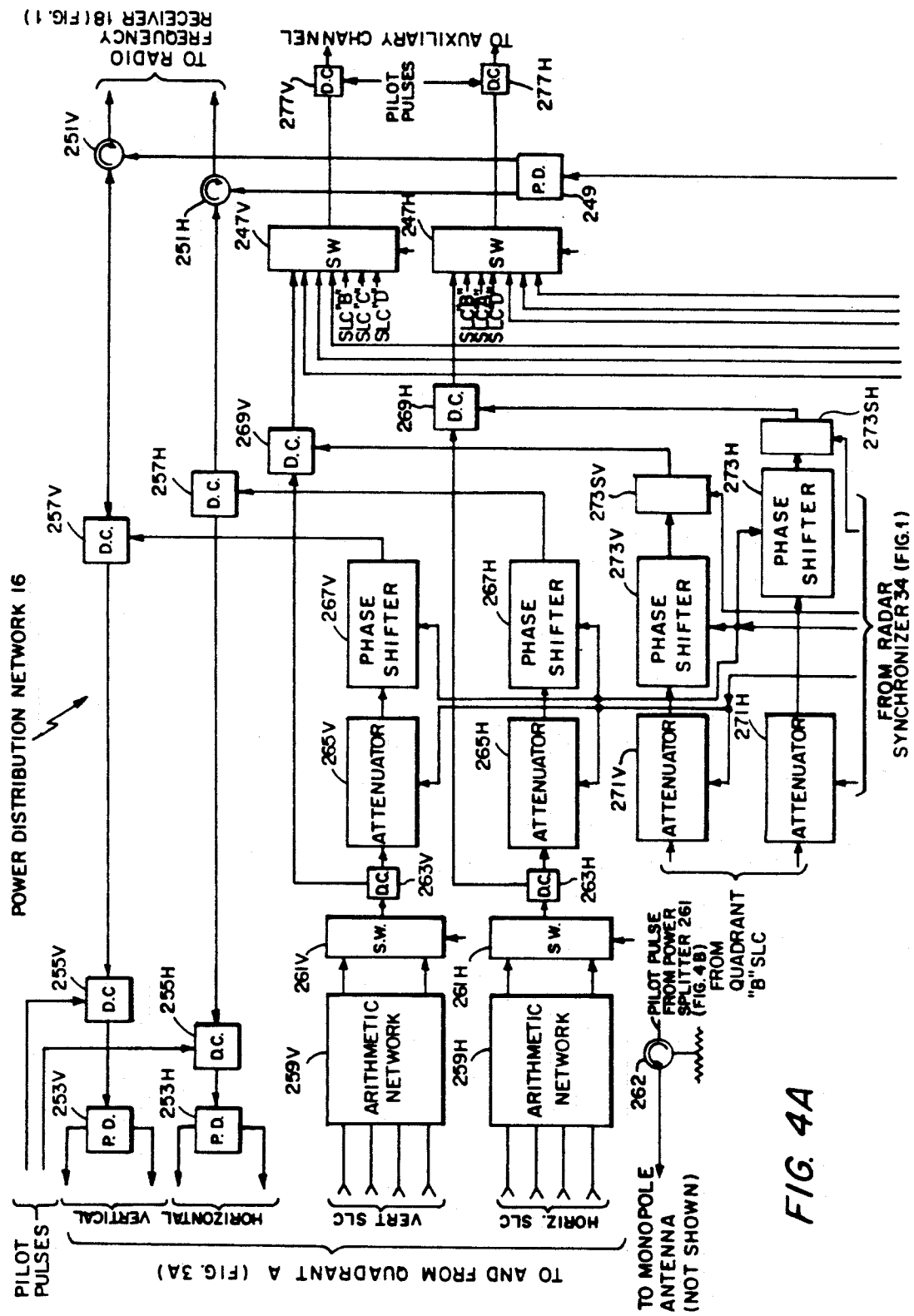
FIGS. 4A and 4B, taken together, constitute a block diagram of the radar synchronizer shown in FIG. 1, somewhat simplified to show how an exemplary receiver channel is controlled.
Figure 4B:
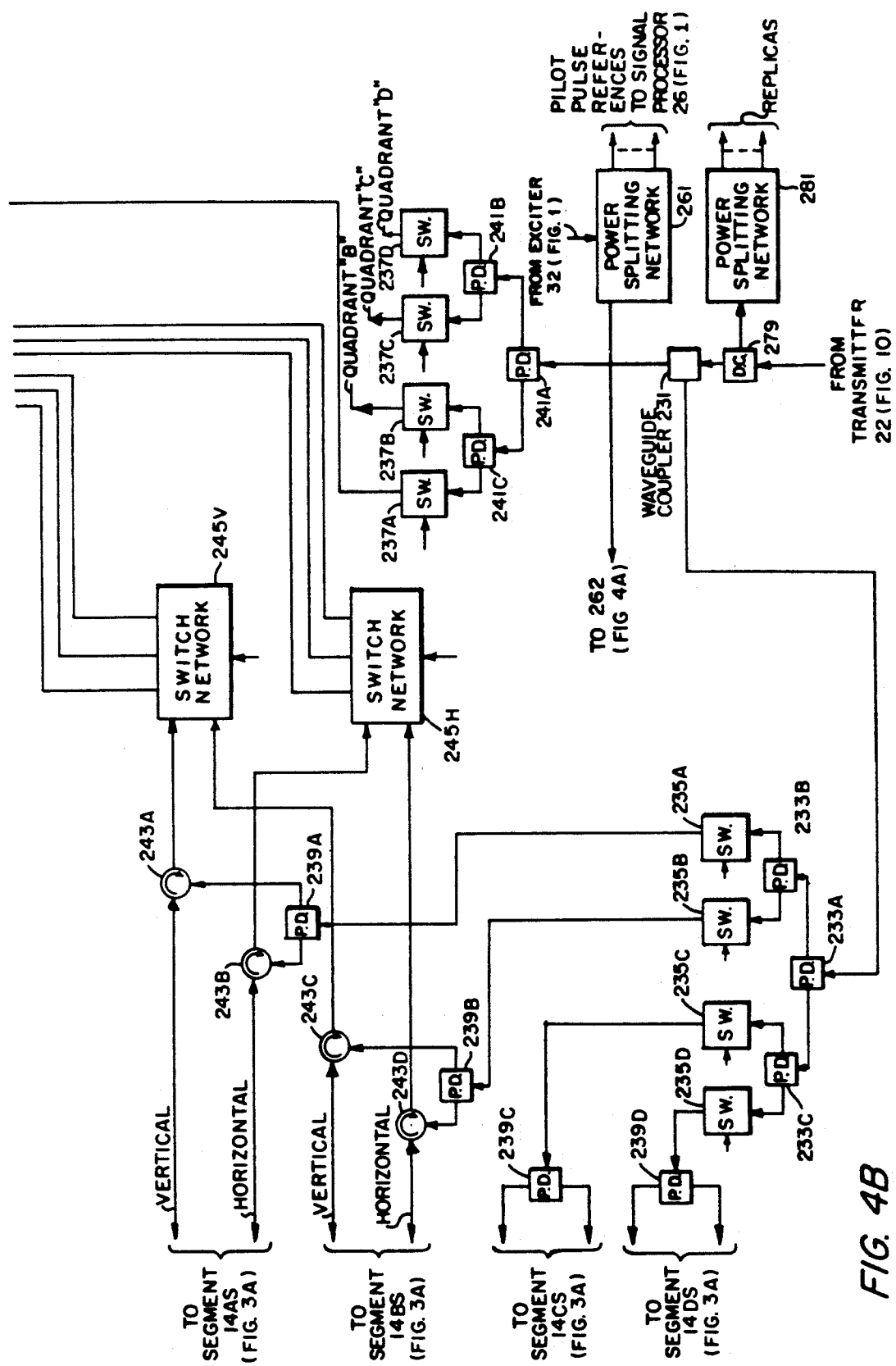

POWER DISTRIBUTION NETWORK (FIGS. 4A and 4B)

Before proceeding with a detailed description of the power distribution network 16 it is noted that, for the sake of simplicity, only one portion of that network (the portion required to feed a single antenna quadrant, here quadrant 14A), is shown in detail. Similarly, only the sidelobe cancelling networks for antenna quadrant 14A are shown in detail. It should be appreciated that the sidelobe cancelling networks for the remaining quadrants, as well as the requisite hardware within the power distribution network 16 for feeding the remaining antenna quadrants, are identical to the portion shown and to be described. Finally, before proceeding, it should be noted that antenna segments 14CS and 14DS are used only on transmit and, therefore, there are some minor differences (to be described) between the segment feeds.

Referring now to FIGS. 4A, 4B, power from the transmitter 22 (FIG. 1) is fed to the power distribution network 16 via a four axis waveguide rotary joint (not shown). A waveguide coupler 231 couples off a portion of the input power to the power distribution network 16 for antenna segment illumination. It is noted here in passing that the high power feed portion (not numbered) of the power distribution network 16 is implemented using half-height aluminum waveguide networks. Also, because of the high power airborne environment the waveguide is pressurized. Following the coupler 231 in the antenna segment feed network (not numbered) are a series of power dividers 233A, 233B and 233C which are here reactive H-plane tees and which serve to divide the input power and deliver it to a series of single-pole single-throw waveguide switches 235A, 235B, 235C and 235D. The latter are controlled by control signals from the radar synchronizer 34 (FIG. 1). It should be noted here that, for the sake of drawing clarity, all control signals from the radar synchronizer 34 will be represented simply as small arrows on the units being controlled and the requisite digital-to-analog (D/A) converters will not be shown.

The switches 235A . . . 235D provide the radar system 10 (FIG. 1) with a power management and beam shaping feature which is required in some modes (to be described in detail hereinafter) of the system. Suffice it to say here that by controlling the position of switches 237A . . . 237D in the antenna quadrant feed network (not numbered) and switches 235A . . . 235D in the antenna segment feed network (also not numbered), it is possible to transmit through any portion, or portions, of the antenna 14 (FIG. 3A) required for a particular mode. The output signals from switches 235C and 235D are passed, respectively, to waveguide power dividers 239C, 239D which are also reactive H-plane tees. The output arms (not numbered) of the latter are terminated in coaxial connectors (not shown) and the interconnections between antenna segments 14CS, 14DS and power dividers 239C, 239D are via semi-rigid coaxial cables (not shown).

As mentioned hereinabove, in certain system operating modes, it is desirable to transmit through only one or two of the antenna segments 14AS...14DS. In these modes the waveguide switches 237A...237D in the quadrant feed network (not numbered) as well as the requisite switches in the segment feed network (also not numbered) are synchronously switched to their open position so that the power incident thereon may be reflected back to an isolator (not shown) within the transmitter 22 (FIG. 1) where adequate cooling is provided. The switches are synchronously switched to prevent the dissipation of large amounts of power in the loads (not numbered) provided on the power dividers 233A...233C and 241A...241C. The quadrant switching function is not provided by a single switch preceding power dividers 241A...241C because a single switch having the requisite power handling capability could not be packaged within the allocated volume.

The output signals from switches 235A, 235B are split in waveguide power dividers 239A, 239B and passed via waveguide, three-port circulators 243A...243D as input signals to antenna segments 14AS and 14BS. The interconnections between antenna segments 14AS, 14BS and the three-port waveguide circulators 243A...243D are made by semi-rigid coaxial cables (not shown). It should be noted here that all the segment feed networks (not numbered) are made to be of equal electrical path length and that two inputs, corresponding to two orthogonal linear polarizations, are provided to each of the antenna segments 14AS, 14BS, 14CS and 14DS.

The three port waveguide circulators 243A...243D serve as duplexers to pass, in the receive mode, the vertically and horizontally polarized signals from antenna segments 14AS, 14BS to switch networks 245V, 245H (where the letters V and H refer to the vertical and horizontal components of polarization as resolved by the element feed networks (not shown)). It should be noted here that each of the switch networks 245V, 245H includes a 180° hybrid (not shown) and, therefore, each such network may, in response to a control signal provided by the radar synchronizer 34 (FIG. 1) produce an output signal corresponding to: (a) the input signal received from antenna segment 14AS; (b) the input signal received from antenna segment 14BS; or (c), the difference between the input signals received from antenna segments 14AS and and 14BS. The signals out of switch networks 245V, 245H are passed as input signals to switching networks 247V, 247H, respectively.

The quadrant feed network (not numbered) includes a series of high-power waveguide power dividers 241A...241C which are here "magic-tees" whose E-ports are terminated by loads (not numbered) and which are effective in splitting the input power into four equal phase, equal amplitude output signals which are passed to the waveguide switches 237A...237D. As mentioned hereinabove, only the hardware required for feeding antenna quadrant 14A will be described in detail. Thus, the output signal from switch 237A is passed to a waveguide "magic-tee" power divider 249 wherein it is split into a pair of equal amplitude and equal phase output signals which are passed to a pair of three port waveguide circulators 251V, 251H. The remaining two ports on each of the latter are terminated in waveguide-to-coax adaptors (not shown). Thus, the output signals from the circulators 251V, 251H are passed to a pair of stripline power dividers 253V, 253H via coaxial cables (not shown). The latter dividers provide two pairs of input signals to the element feed networks (not shown) in antenna quadrant 14A (FIG. 3A).

It is noted here in passing that the transmission line networks (not numbered) between power dividers 253V, 253H and circulators 251V, 251H contain two pairs of directional couplers 255V, 255H and 257V, 257H. The directional couplers 255V, 255H are used in the receive mode of operation to inject pilot pulse signals during calibration of the radar system 10 (FIG. 1). That is to say, since the herein-contemplated radar system 10 (FIG. 1) utilizes a so-called "pipeline" receiver wherein the signals received by each of the antenna quadrants 14A...14D (FIG. 3A) are brought down to the signal processor 26 (FIG. 1) in separate channels rather than being combined in a monopulse arithmetic network into sum ($\Sigma$) and difference ($\Delta$) channels, each of the separate channels must be calibrated to ensure that phase and amplitude tracking is maintained within very precise tolerances. Such calibration is here provided through the use of pilot pulses. The pilot pulses are obtained from the exciter 32 (FIG. 1) and are split in a power splitting network 261. The pilot pulses then are of equal amplitude and phase and, therefore, any detected differences between the channels may then be compensated for within the signal processor 26 (FIG. 1).

It should be noted here that one of the output signals from the power splitting network 261 is passed, via a circulator 262, to the monopole antenna at the center of the antenna 14 (FIG. 1). As mentioned briefly hereinabove, that monopole antenna (not shown) is excited by the applied pilot pulse signal to calibrate the antenna 14 (FIG. 1). In order to minimize the effect of the antenna radome (not shown) on the antenna 14 (FIG. 1) during the calibration procedure, the latter is always gimballed to the identical position for purposes of calibration. In this manner the antenna 14 (FIG. 1) will always receive the identical reflections from the radome (not shown) and the effect of the latter may, therefore, be neglected.

As mentioned hereinbefore, the center four elements of each of antenna quadrants 14A...14D (FIG. 3A) are combined to form a sidelobe cancelling subarray for their respective quadrants. These sidelobe cancelling subarrays are utilized only in the receive mode and their operation in each of the quadrants is identical with the exception of an added feature (to be described) provided between the subarrays in antenna quadrants 14A and 14B. As also mentioned hereinabove, only the sidelobe cancelling networks (not numbered) for antenna quadrant 14A will be described in detail. Thus, the vertically and horizontally polarized signals from the sidelobe cancelling elements of quadrant 14A are combined in monopulse arithmetic networks 259V, 259H, respectively. The monopulse sum ($\Sigma$) and difference ($\Delta$) signals then formed are passed to switches 261V, 261H which are responsive to control signals provided by the radar synchronizer 34 (FIG. 1) to gate either the sum or the difference signals for further processing. The signals out of the switches 261V, 261H are passed through a pair of directional couplers 263V, 263H which couple off a portion of the signals from the switches 261V, 261H. Such coupled signals are passed, via the switching networks 247V, 247H, through the auxiliary channel (not shown) of the R.F. receiver 18 (FIG. 1) to the signal processor 26 (FIG. 1). The $\Sigma$ and $\Delta$ signals from the switches 261V, 261H are also passed to sidelobe cancelling circuits (not numbered) comprising variable attenuators 265V, 265H and phase shifters 267V, 267H, all of which are of conventional design and are controlled by control signals supplied by the radar synchronizer 34 (FIG. 1). The output signals from the sidelobe cancelling circuits (not numbered) are injected, via the directional couplers 257V, 257H, into the quadrant receiver channels (not numbered).

It will now be appreciated by those of skill in the art that sidelobe cancellers are utilized to reduce the level of jamming power entering the main channel sidelobes of radar systems. That is to say, the magnitude and phase of the jamming signals received by the sidelobe cancelling circuits (not numbered) are modified by the variable attenuators 265V, 265H and the phase shifters 267V, 267H in response to the applied control signals so that, when such modified signals are injected into the quadrant receiver channels (not numbered) they are of equal magnitude but 180° out-of-phase with the jamming signals received by quadrant 14A. The requisite control signals are developed within the digital data processor 30 (FIG. 1) from analysis of the Σ channel signals received by the R.F. receiver 18 (FIG. 1) from the directional couplers 277V, 277H.

Digressing now for a moment, it will also be appreciated by those of skill in the art that, in general, the sidelobe antennas also receive returns from the target being tracked and inject such target return signals, together with the jammer cancellation signals, into the channel being nulled. Since the phase of the injected target return signals is rotated by the sidelobe canceller phase angle, a bias error will develop. However, because the herein-contemplated radar system 10 (FIG. 1) is continuously self-calibrated by pilot pulses to the signal processor 26 (FIG. 1), and because the commanded amplitude and phase of the sidelobe cancelling circuits (not numbered) are known a priori by the digital data processor 30 (FIG. 1), the bias error due to sidelobe cancelling may be neutralized. Thus, the digital commands from the signal processor 26 (FIG. 1) to the sidelobe cancelling circuits (not numbered) are also sent to the signal processor 26 (FIG. 1) for compensation purposes, thereby ensuring that the bias error on target signals is corrected.

It should be noted here that the herein-contemplated sidelobe cancelling circuits (not numbered) provide an advantage in terms of wide instantaneous bandwidth. That is to say, conventional sidelobe cancellers incorporate cancelling antennas which are physically displaced from the aperture to be cancelled. Such displacement results in a time delay which induces a phase dispersion across a finite bandwidth, thereby limiting the degree of nulling attainable in such cancelling systems. Because the sidelobe cancelling subarrays are here centered in the antenna aperture and because the cancelling is realized at microwave frequencies rather than at I.F. frequencies as in standard sidelobe cancellers, a unique solution to the problem of phase dispersion is provided. Further, not only are the centered sidelobe cancelling subarrays positioned to reduce phase dispersion, each needs to operate on a smaller aperture (a quadrant only as opposed to the entire antenna aperture). The single antenna quadrants 14A . . . 14D (FIG. 3A) have twice the sidelobe frequency stability as that of the full aperture sum beam and therefore amplitude dispersal effects are minimized. That is, the null produced on a small quadrant by a centered sidelobe canceller is twice as wide in angle as that normally obtained for full aperture cancelling and, therefore, cancelling over a greater area is realized. This feature is advantageous for handling multiple spatially displaced jammers and/or multipath effects.

The herein-contemplated radar system 10 (FIG. 1) also includes a sidelobe monitor (to be described to prevent false target repeater type jammers from overloading the target tracking capability of the system by injecting false target returns through the antenna sidelobes, thereby preventing true target identification and tracking. Briefly, when the sidelobe monitor (not numbered) is utilized, two simultaneous maps of a given area are generated within the digital data processor 30 (FIG. 1), a first one of such maps being a conventional map generated from the data received by the four antenna quadrants 14A through 14D (FIG. 3A), and the second being generated from the data received through the sidelobe monitors (not numbered). The two maps are compared within the digital data processor 30 (Fig. 1) and nay potential targets whose amplitude is greater in the sidelobe monitor generated map than in the conventional map are rejected as false targets. A moment's thought here should make it apparent that, as the false target repeater type jammers enter the conventional map via the antenna sidelobes, their amplitude in that map vis-a-vis their amplitude in the sidelobe monitor generated map will be decreased by the ratio of the gain of the sidelobe monitor antenna pattern to the gain of the antenna sidelobes. That is to say, the gain of the sidelobe monitor pattern is designed to be greater than that of the antenna sidelobes in the region of the antenna sidelobes.

The output signals from the sidelobe monitor (not numbered) are passed through the auxiliary channel of the R.F. receiver 18 (FIG. 1). Directional couplers 269V, 269H are included in the transmission line sections (not numbered) carrying the signals from the sidelobe cancelling subarrays to the switching networks 247V, 247H. Preceding the directional coupler 269V are a variable attenuator 271V, a switch 273SV and a phase shifter 273V, while the directional coupler 269H is preceded by a variable attenuator 271H, a switch 273SH and a phase shifter 273H. The input signals to the variable attenuators 271V, 271H are obtained from directional couplers (not shown) disposed, respectively, in the vertically and horizontally polarized sidelobe cancelling channels (also not shown) carrying the sidelobe cancelling signals from antenna quadrant 14B to the switching networks 247V, 247H. The variable attenuators 271V, 271H, the switches 273SV, 273SH and the phase shifters 273V, 273H are all controlled by control signals supplied by the digital data processor 30 (FIG. 1). It should now be appreciated by those of skill in the art that the variable attenuators 271V, 271H and the phase shifters 273V, 273H provide the sidelobe monitor (not numbered) with a null forming capability which is useful in cancelling noise jammers which might otherwise render the latter ineffective.

Digressing now for a moment, it will be appreciated by those of skill in the art that synthetic aperture radar maps are particularly vulnerable to dedicated tracking standoff spot jammers. That is to say, since most synthetic aperture radars employ waveforms having necessarily long coherent dwell times to obtain azimuth angle resolution, they normally cannot shift frequency during a dwell in order to avoid spot jammer noise. Thus, the herein-contemplated synthetic aperture radar system 10

(FIG. 1) employs a multiple frequency waveform comprising four coherent frequencies, as was mentioned hereinabove. Although the use of multiple frequency waveforms can defeat a single spot jammer, additional immunity is required to counter the threat of multiple spot jammers.

The sidelobe cancelling circuits (not numbered) will step in frequency with the multiple frequency waveform and will form time-multiplexed spatial nulls in each resolved carrier frequency band. Thus, the sidelobe cancelling circuits (not numbered) will self-adapt and neutralize jamming in each carrier band; however, they will only be successful when the carrier channel is not being jammed by more than one jammer. Thus, two triple frequency jammers can double cover a maximum of three frequencies and essentially desirable the sidelobe cancelling in these channels, but the fourth carrier channel would still be clear.

Additional immunity from spot jammers is provided in the herein-contemplated system through the transmission of four proof frequencies. As explained hereinabove, the exciter 32 (FIG. 1) may generate interlaced bursts of four frequency agile coherent pulses and four frequency agile noncoherent pulses which are used as spoof frequency waveforms. The four noncoherent spoofing frequency waveforms are narrow pulses to conserve on power and to fit within the coherent pulse repetition interval. The spoof waveforms are radiated through antenna segments 14AS and 14BS so that the spoof peak power will appear larger than that of the coherent synthetic aperture radar waveforms. The spoof transmissions precede a synthetic aperture radar dwell time in order to capture a multiple frequency spot jammer throughout the dwell time.

As was explained above, the switching networks 247V, 247H are effective to gate selected ones of the signals incident thereon to the fifth or auxiliary channel of the R.F. receiver 18 (FIG. 1). Directional couplers 277V, 277H are provided in the output arms (not numbered) of the former for the purpose of injecting pilot pulse signals into the auxiliary channel of the R.F. receiver 18 (FIG. 1).

Finally, before proceeding it should be noted that a third waveguide directional coupler 279 is provided in the input channel of the power distribution network 16. The former couples off a portion of the input power to a power splitting network 281 which divides said portion into five equal amplitude and equal phase output signals, referred to here as REPLICA signals. The REPLICA signals are provided to compensate for the effects of vibration on the waveguide components in the power distribution network 16 which otherwise would be manifested in the form of false targets or paired echoes appearing in the Doppler band on each side of the return signals. That is to say, vibrations of the R.F. components impress an amplitude and phase modulation on a chirp signal, thereby producing deviations from ideal quadratic phase characteristics which distinguish a chirp waveform. A second problem, existing with any type of transmitted waveform, is that the phases of successive pulses vary randomly. Because each one of the REPLICA signals corresponds with a transmitted signal, successively derived REPLICA signals may be demodulated, converted to digital numbers and processed to form (for each receiver channel) a running "nominal" complex conjugate of the transmitted pulses. When a received signal is multiplied by the nominal complex conjugate existing as the received signal is being processed in the I.F. receiver 20 (FIG. 1), the resulting signal is compensated for deviations in phase or amplitude of the corresponding transmitted signal.

R. F. Receiver (FIG. 5)

Before proceeding with a detailed description of the R.F. receiver 18 it is noted that while that receiver actually has a total of ten identical channels (a separate channel for each of the signals from each of the four antenna quadrants 14A, 14B, 14C, 14D (FIG. 3A) and two auxiliary channels which are time shared between the sidelobe cancelling subarrays (not shown) and the antenna segments 14AS, 14BS, only a pair of channels, corresponding to those passing the signals from antenna quadrant 14A, will be described in detail. It should be appreciated that the remaining channels are identical to those to be described.

Figure 5:
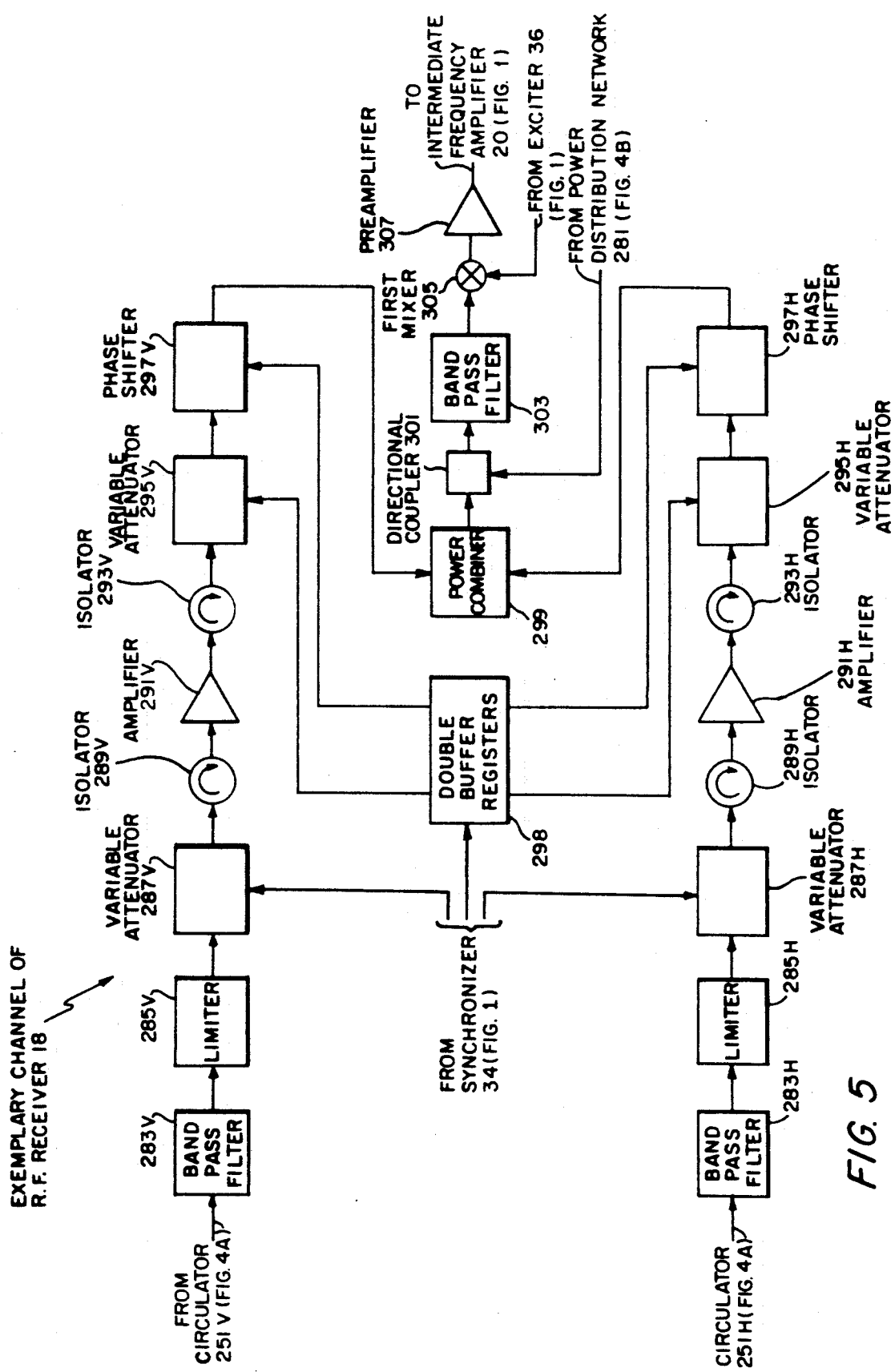
FIGS. 5 and 5A are diagrams of an exemplary channel of the radio frequency receiver showing radome calibration.

Referring now to FIG. 5, the vertically and horizontally polarized input signals from circulators 251V, 251H (FIG. 4A), respectively, are applied to a pair of bandpass filters 283V, 283H. Such filters, have waveguide devices, are provided to reject undesired, out-of-band signals of any nature. Following the bandpass filters 283V, 283H are a pair of waveguide limiters 285V, 285H which are of conventional design and may, for example, comprise self-activated TR tube limiters. The latter are provided to limit the input power to the R.F. receiver 18, thereby preventing burnout of the latter. Following the limiters 285V, 285H are: (a) a pair of variable PIN diode attenuators 287V, 287H; (b) a pair of isolators 289V, 289H; (c) a pair of field effect transistor (FET) amplifiers 291V, 291H; (d) a second pair of isolators 293V, 293H; and (e) a second pair of PIN diode variable attenuators 295V, 295H, all of which are of conventional design and are here fabricated in stripline. Each of the variable attenuators 287V, 287H, 295V, 295H (all of which are controlled by control signals provided by the radar synchronizer 34 (FIG. 1), has a 40 dB dynamic range. The inclusion of the variable attenuators 287V, 287H prior to, and the variable attenuators 295V, 295H after the FET amplifiers 291V, 291H allows spatial filtering, i.e. three phase center monopulse filtering to be described hereinafter, to be employed as a counter-countermeasure against an escort jammer and a delta jammer. The attenuators in such a tactical situation prevent saturation so that the requisite linearity of response is maintained to allow spatial filtering to be carried out in a proper manner. It is noted here that the bandwidth of the R.F. receiver being described is one-half the first I.F. frequency. This relationship then inhibits the appearance of a false I.F. signal from a delta jammer. A bandpass filter 303 is provided in front of the mixer 305 to protect the latter from spurious cross products which may be generated when the FET amplifiers 291V, 291H are forced into saturation.

The output signals from the variable attenuators 295V, 295H are passed, via phase shifters 297V, 297H, respectively, to a power combiner 299 wherein they are combined to provide a single output signal. The variable attenuators 295V, 295H and phase shifters 297V, 297H are, as will be explained hereinbelow, included to provide the radar system 10 (FIG. 1) with a randome compensation capability. The output signals from the power combiner 299 are passed, via a directional coupler 301 and the bandpass filter 303, to the mixer 305 wherein they are heterodyned with the first L.O. signal from the exciter 32 (FIG. 2), ultimately to produce an S-band first I.F. signal. A preamplifier 307 is provided to amplify the S-band signals from the mixer 305 as such signals are passed to the I.F. receiver 20 (FIG. 1). The directional coupler 301 is included to allow injection of the REPLICA of the transmitted signal (obtained form the power distribution network 281 (FIG. 4B) into the receiver channel (not numbered). The REPLICA is processed and stored in the signal processor 26 (FIG. 1) prior to the reception of any echo signals.

It is here noted that the REPLICAs of the transmitted pulses are passed through A/D converters after correlation in the I.F. receiver 20 (FIG. 1) with the second L.O. signal from the exciter 32 (FIG. 1). The resultant digital signals therefore represent the phase of the L.O. at the time of transmission and the phase errors due to differential transmission line perturbations between the antenna 14 (FIG. 1) and the second correlation mixer. After T.B samples (where B is the A/D sampling rate and T is the pulse duration) are taken of the REPLICAS, the resulting number is stored within the signal processor 26 (FIG. 1) and is used to represent a phase reference for all received signals resulting from that particular pulse transmission. Therefore, the signal processor 26 (FIG. 1) may cause return signals to be corrected for the effects of phase modulation and phase distortion as mentioned hereinbefore.

As also mentioned hereinabove, phase shifters 297V, 297H are included to provide the radar system 10 (FIG. 1) with a radome compensation capability. Before proceeding with a detailed description of this capability the need for a radome compensation technique will first be explained. Thus, the radar system 10 (FIG. 1) employs a so-called "R.F. Cueing Mode" for the detection, location and subsequent attack of ground-based threat radars. In this mode the radar system 10 (FIG. 1) must passively detect a source of R.F. energy (a threat radar) and locate the source both in angle and range so that a high resolution synthetic aperture radar map may be made of the surrounding area. After mapping of such surrounding area, the radar system 10 (FIG. 1) must then track the threat radar so that an attack may be mounted and carried out even when the threat radar ceases to transmit or to scan.

In order to initiate tracking, accurate directional information of the threat radar must be obtained (for example, by using the antenna 14 (FIG. 1) as a passive sensor) and the Doppler shift of return signals from the cell in which such radar is located derived. The requisite directional information (in elevation and azimuth relative to the aircraft carrying the radar system 10 (FIG. 1)) determines the initial position to which the antenna 14 (FIG. 1) is to be slued to commence map making of the proper area of the ground. The Doppler shift of the signals from the cell at such initial position is, of course, a function of aircraft velocity and the directional information. With the antenna 14 (FIG. 1) slued to the initial position, the radar system 10 (FIG. 1) is actuated to transmit. Range strobes are then used to sweep in range until the range to the center of the elevation monopulse null is measured. The radar system 10 (FIG. 1) then commences mapping the area (here to a 20 square foot resolution), measuring the azimuth and elevation angular location of each cell in the vicinity f the map center as the mapping is effected. For each cell the azimuth and elevation angles, the range and Doppler shift are recorded. Consequently, a file of data is built up, defining ground reflectors in the cells about the line-of-sight (LOS) to the threat radar. With knowledge that mapping was initiated when the antenna 14 (FIG. 1) pointed directly at the threat radar, the cell at the intersection of the azimuth elevation nulls is first assumed to be the cell in which the threat radar is located. It will be appreciated, however, that situations may exist when return signals from adjacent cells may be so similar to the returns from the first assumed cell that the threat radar could very well be located in one of such cells. In such a situation, the cell with the return signals having the largest signal-to-noise ratio is selected. In any event, the range and Doppler coordinates of the selected cell are used to initiate a Doppler tracking loop (not shown) and the azimuth and elevation tracking loops (also not shown).

It should now be apparent that the accuracy of the foregoing threat radar tracking technique is dependent upon knowing the precise angular location of a ground target. To put it another way, the azimuth and elevation of the threat radar must be determined to within 0.50 milliradians (mrad) to provide a cross-range accuracy of 15 meters at a 30 Km range. Therefore, the effects of radome induced errors must be considered because radome boresight errors resulting from cross-polarization and refraction effects can introduce up to ±20 and ±8 mrad of error, respectively.

Digressing here now for a moment, it will be appreciated by those of skill in the art that, in general, in a phase monopulse radar system the $\Sigma$ channel signal is formed by vectorially adding the received signals in the four quadrants while the $\Delta$ channel signals are formed by vectorially subtracting the received signals in opposite halves of the aperture of the antenna. After limiting, or otherwise equalizing, the amplitude of the received signals prior to forming the $\Sigma$ and $\Delta$ signals, the quotient of $\Delta/\Sigma$ is a measure of boresight error which is independent of signal amplitude. However, any phase error introduced into the received signals prior to forming the $\Sigma$ and $\Delta$ signals will cause a boresight error.

In order to understand the effect of randome cross-polarization on boresight error, a short discourse on the nature of polarized signals is in order. In general, a polarized microwave ray passing through a radome at an incident angle (i.e., an angle not perpendicular to the surface of the radome where the ray strikes), can be resolved into a polarization component parallel to the plane of incidence (the plane between the incident ray and the normal to the radome surface) and a polarization component perpendicular to the plane of incidence. The radome passes these two components with different degrees of attenuation and different microwave phase delays with the result that the ray emerging from the inside of the radome on the antenna has had its polarization altered. If the receiving antenna was originally co-linearly polarized with the impinging ray and the polarization of that ray was shifted by the radome, a component of the cross-polarized energy will be accepted by the antenna. Since the cross-polarized energy has a different microwave phase than the co-polarized energy, the resulting vector will be phase-shifted and will create a bore-sight error when processed.

For purposes of explanation, vizualize two microwave rays of the same polarization impinging on a radome at equal and opposite angles of curvature (as they would when entering the two halves of a monopulse antenna). It is also assumed that the polarization of the two rays is neither parallel to, or orthogonal to, the plane of incidence where they enter the radome. For radome transmission purposes, the polarization of each of the rays may be resolved into a component parallel to the plane of incidence and a component orthogonal to the plane of incidence. The transfer function through the radome for each resolved component then results in differing signal vectors which, when combined, define the microwave signal after passage through the radome. The apparent origin of such a signal ordinarily differs from the actual origin of the microwave signal being processed, i.e. there ordinarily is a boresight error.

The two prime methods of compensating for radome induced boresight errors are either: (a) to apply a correction factor to the boresight error, or (b) to compensate each monopulse quadrant signal with an inverse radome transfer function. To correct the boresight error requires a knowledge of the signal polarization which cannot be determined until the signal is processed. The contemplated inverse transfer function method of compensation was chosen because it can be applied to signals of any polarization without a priori knowledge of that polarization.

The inverse transform method of radome calibration requires a monopulse antenna in which each quadrant is sensitive to two orthogonal polarizations. A microwave attenuation and phase shifting network is connected to each of the orthogonal ports of each quadrant. The transfer functions of these networks are digitally set to the mathematical inverse of the radome/antenna transfer function for the associated polarization and quadrant. Since this transfer function changes with, inter alia, the incident angle of the signal upon the radome, a multiplicity of commands must be stored in order to cover all possible incident angles so that the residual boresight error after compensation never exceeds 0.5 milliradians.

Figure 5A:
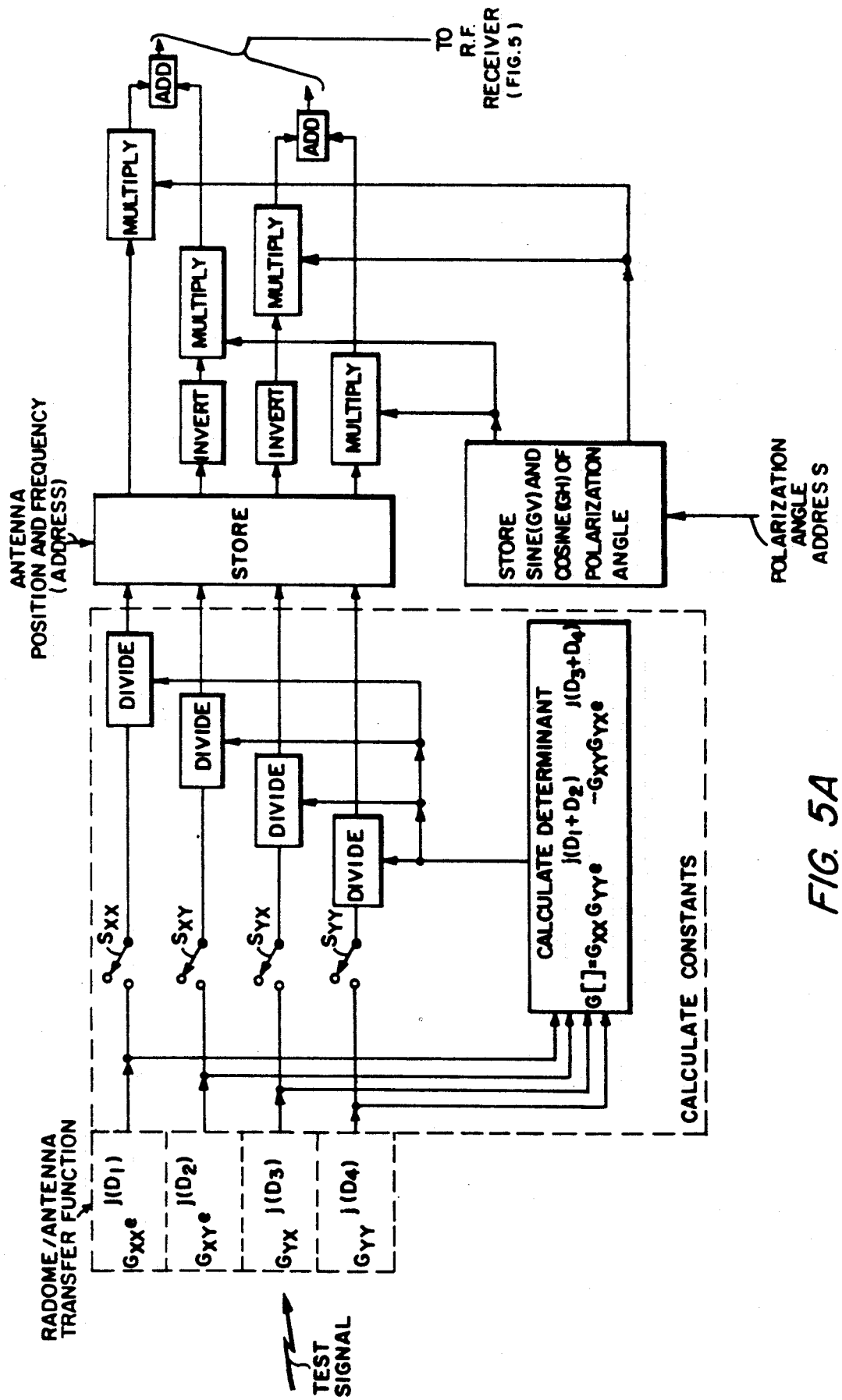

Referring briefly now to FIG. 5A, a flow path in mathematical form for a particular quadrant is illustrated to show how compensation is to be effected in the contemplated way. The radome/antenna transfer function can be represented as a two-by-two matrix which multiplies the orthogonally polarized signals passing through the radome to reach the antenna quadrant. The method of compensation illustrated in FIG. 5A then performs an inverse matrix to the one representing the effect of the radome to produce two compensated signals which are identical to the ones which entered the radome for that particular antenna quadrant. It should be noted here that in the radar system 10 (FIG. 1) complete polarization information is not maintained after the compensation process is completed since this would require ten receiver channels instead of five. A selection is made of a particular or desired polarization (say for purposes of rain rejection) by adding together the horizontal and vertical components as illustrated in FIG. 5A.

Referring briefly now to both FIGS. 5 and 5A, the contemplated radome calibration technique will be described. It will be understood, of course, that the contemplated technique may be carried out on any convenient type of radar test range where the desired polarizations and frequencies of microwave energy may be directed toward an assembly to be calibrated and the orientation (relative to the source of the microwave energy) of the radome in such assembly may be adjusted as required. Before proceeding, however, it should be noted that the calibration procedure will be described with reference to the receiver channel (not numbered) dedicated to antenna quadrant 14A and that the calibration procedure would be repeated for each one of the remaining channels (not shown).

As mentioned hereinabove, the degree of radome cross-coupling is dependent, inter alia, on the sense of the incident polarization, the operating frequency and the antenna position. Consequently, a vertically polarized signal is first transmitted toward the antenna 14 (FIG. 1) with the radome being calibrated in place so that the response of the associated receiver may be measured and recorded. Next, keeping the operating frequency and antenna position constant, a horizontally polarized signal is transmitted and the response of the associated receiver may again be measured and recorded. The process is systematically repeated, changing the orientation of the radome being calibrated and the frequency of the microwave energy so that the response of the associated receiver to any microwave energy under different operational conditions may be measured and recorded.

It will be instructive at this point to recall that a polarized microwave ray passing through a radome at an incident angle (i.e., an angle not orthogonal to the surface where the ray strikes) may be resolved into a polarization component parallel to the plane of incidence (the plane defined by the incident ray and the normal to the radome surface) and a polarization component perpendicular to the plane of incidence. The two components are passed through the radome with different degrees of attenuation and different microwave phase delays, with the result that the polarization and amplitude of a ray emerging from the inside of the radome differs from an incident ray.

Referring now to FIG. 5A, a radome compensation flow path in mathematical form for a particular antenna quadrant is illustrated. Thus, the effect of the radome may be mathematically represented as a two-by-two matrix which multiplies orthogonally polarized signals which pass through the radome to reach the antenna quadrant. The compensation circuitry (not numbered) performs an inverse matrix to the one representing the effect of the radome and, therefore, two compensated signals are produced which correspond with the incident orthogonally polarized signals.

With the foregoing in mind, it is here contemplated that each radome and antenna assembly be calibrated on a range where the orientation of such assembly to a linearly polarized test signal may be measured and the operating frequency of such a signal may be controlled to derive appropriate compensation signals for any orientation of the radome and antenna assembly with respect to any incident signal at any frequency within the operating bandwidth of such assembly. Thus a radome and antenna assembly to be calibrated is positioned in any convenient manner on a range to receive a linearly polarized test signal, E, of the form (simplified)

$$E = E_i e^{j\omega t}(\cos\theta + \sin\theta)$$

where $E_i$ is the amplitude of the test signal and $\theta$ is the polarization angle. It will be recognized that such a signal is the equivalent of two orthogonally polarized signals, one (the cosine component) being horizontally polarized and the other (the sine component) being vertically polarized. Each such component, upon passing through the radome and antenna assembly under test is, in turn, subjected to differing degrees of attenuation and phase delays. Thus, after the test signal passes through the radome and antenna assembly the original horizontally polarized component may be expressed as $$A_H = E_1 (G_{xx} \cos\theta \, e^{j(\omega t + D1)} + G_{XY} \sin\theta \, e^{j(\omega t + D2)})$$

where $G_{XX}$ and $G_{XY}$ are attenuation factors and $D_1$ and $D_2$ are phase shifts.

Similarly, for the original vertically polarized component.

$$A_v = E_1(G_{yy} \sin\theta e^{j(\omega t + D4)} + G_{YX} \cos\theta e^{j(\omega t + D3)})$$

The attenuation factors and phase shifts describe the transfer function of the radome and antenna assembly under the given conditions.

The calibration procedure then is directed to the calculation of the inverse radome and antenna transfer function for the given conditions.

The determinant G [ ] associated with the radome compensation network (not numbered) is of the form:

$$G[\,] = G_{XX} G_{YY} e^{j(D1 + D4)} - G_{XY} G_{YX} e^{j(D2 + D3)}.$$

From the foregoing it should now be apparent that if $G_H = \cos\theta$ and $G_V = \sin\theta$, the resultant signal from a radome compensation and polarization selection network should be $A_i e^{j(\omega t)}$.

The contemplated calibration technique will now be described in terms of the mathematical model of FIG. 5A. Thus, as mentioned above, the calibration procedure for a given antenna look angle, antenna roll angle, and operating frequency involves first illuminating the radome with a horizontally polarized signal and measuring the response, and next, keeping everything else constant, illuminating the radome with a vertically polarized signal and measuring the response to this input. The detailed procedure is as follows: With a horizontally polarized input signal variable attenuators 287V and 295V (FIG. 5) are set to provide maximum (80 dB) attenuation (in effect turning OFF the vertically polarized channel (not numbered)) and the response as seen by the signal processor 26 (FIG. 1) is recorded. This response corresponds to the $G_{XX} e^{j(D1)}$ term in mathematical model of FIG. 5A. Next, still with the horizontally polarized input signal, variable attenuators 287H and 295H (FIG. 5) are set to provide maximum attenuation (thereby turning OFF the horizontally polarized channel) while variable attenuators 287V, 295V are set to provide minimum attenuation and the response as seen by the signal processor 26 (FIG. 1) is recorded. This response corresponds to the $G_{YX} e^{j(D3)}$ term. The foregoing procedure is repeated with a vertically polarized input signal to yield the $G_{YY} e^{j(D4)}$ and $G_{XY} e^{j(D2)}$ terms. On the basis of these measurements, the determinant G [ ] and the terms $$\frac{G_{YY} e^{j(D4)}}{G[\,]}, \frac{G_{YX} e^{j(D3)}}{G[\,]}, \frac{G_{XX} e^{j(D1)}}{G[\,]}, \text{ and } \frac{G_{XY} e^{j(D2)}}{G[\,]}$$

are computed and stored in memory.

Digressing briefly here now for a moment, it should be noted that the variables considered here to be important to radome compensation are antenna look angle, antenna roll and operating frequency. Given the variables selected, it may be estimated that a solid angle of 0.03 steradians (10°×10°) would encompass a volume within which the boresight error would be permissible and that a total of eight roll positions would cover the ±75° of roll required by a 4 g acceleration specification.

Twenty frequencies were selected to cover the operating bandwidth of the system. Based on the foregoing, a total of approximately $4 \times 10^6$ bits of memory are required for the requisite data for radome calibration.

Further, it should also be noted here that the transfer function through the radome (not shown), the antenna 14 (FIG. 1) and the R.F. receiver 18 (FIG. 1) may be represented solely by a network comprising a pair of attenuators and a pair of phase shifters. Thus, the radome compensation is provided through the use of a pair of variable attenuators and a pair of phase shifters in each channel of the R.F. receiver 18.

Proceeding now with the description of the calibration technique, once all the constants are calculated and stored, the procedure is to select a desired polarization (for a given operating frequency, antenna look angle and antenna roll angle), calculate the requisite transfer function, and convert the calculated transfer function into equivalent attenuator and phase shifter values.

It is noted here that the tolerances of the attenuators 295V, 295H and the phase shifters 297V, 297H are relaxed because the pilot pulse is used to set them to the correct value.

It should be noted here that the contemplated radome calibration technique also provides an advantage in terms of two way antenna sidelobe control with a nonreciprocal antenna. That is to say, on traversing the radome a transmitted beam will have impressed on it a sidelobe pattern dependent on the attenuation and phase delay through the radome. Without compensation, the corresponding received beam would, upon traversing the radome, have an entirely different sidelobe pattern impressed on it, depending upon the motion of the aircraft, between the pulse transmission and reception times. The contemplated radome compensation technique would, however, remove the effect of the radome on the received beam with a concomitant improvement in operation.

I. F. Receiver (FIG. 6)

Referring now to FIG. 6, a single channel of the I.F. receiver 20, corresponding to that associated with antenna quadrant 14A, will be described in detail. It should be appreciated that the remaining channels (not shown) are identical to that to be described. The S-band I.F. signals from the R.F. receiver 18 (FIG. 5) are passed, via an isolator 311, through a bandpass filter 313 to a correlation mixer 315, which also is fed by the second L.O. signal from the exciter 32 (FIG. 2A) to down-convert the S-band I.F. signals to a second I.F. frequency of 100 MHz. It should be noted here that the correlation mixer 315 also performs the correlation or "stretch" processing for the chirped waveforms. The second I.F. signal from the correlation mixer 315 is amplified by an amplifier 317 and split into two channels (not numbered), the upper channel being used in the short range tracking mode and the lower channel being used in the mapping and long range tracking modes. It should be noted here that two channels are provided because of the different dynamic range requirements which are imposed on the two tracking modes.

The lower channel (sometimes hereinafter referred to as the mapping and long range tracking channel) comprises an amplifier 319, a limiter 321L, an amplifier 323L and a bandpass filter 325L, all of which are of conventional design. The upper channel (sometimes hereinafter referred to as the short range tracking channel) includes a limiter 321U, an amplifier 323U and a bandpass filter 325U, all of which are also of conventional design. The bandpass filters 325U, 325L are provided to remove any harmonics or spurious signals generated within the limiters 321U, 321L and the amplifiers 323U, 323L.

The filtered output signals from the bandpass filters 325U, 325L are split and applied to mixers 327UI, 327UQ, 327LI, 327LQ wherein they are downconverted to baseband quadrature video signals by being heterodyned with COHO L.O. signals obtained from the exciter 32 (FIG. 2A). It should be noted that the requisite quadrature relationships are obtained by passing the COHO reference signals to mixers 327UQ, 327LQ through 90° phase shifters 329U, 329L, respectively. The output signals from mixers 327UI, 327UQ, 327LI, 327LQ are filtered by low pass filters 331UI, 331UQ, 331LI, 331LQ to remove undesired sidebands and are amplified by amplifiers 333UI, 333UQ, 333LI, 333LQ prior to being passed to switches 335I, 335Q. The latter, which are controlled by control signals provided by the radar synchronizer 34 (FIG. 1), are effective to gate either the long or short range tracking waveforms through a video receiver (not numbered). The long range tracking waveforms are obtained from the mapping and long range tracking channel wherein they are subjected to an additional stage of amplification by virtue of the amplifier 319.

The selected waveforms from the switches 335I, 335Q are sampled and gain-scaled in sample/hold circuits 337I, 337Q, of conventional design, by mode control signals from the radar synchronizer 34 (FIG. 1). The sampled output signals from the sample/hold circuits 337I, 337Q are digitized by ten bit A/Ds 339I, 339Q and are passed, via buffers 341I, 341Q, to the signal processor 26 (FIG. 1).

The mapping signals in the long range track and mapping channel (not numbered) are amplified in buffer amplifiers 343I, 343Q prior to being applied to eight bit A/Ds 345I, 345Q. The latter have a throughput rate of 50 MHz which is faster than the throughput rate of the signal processor 26 (FIG. 1). In consequence, then, "first in, first out" memories (FIFO 349I, 349Q) are provided to store a series of real time samples from the A/Ds 345I, 345Q and provide output signals to the signal processor 26 (FIG. 1) at a slower date rate. To reduce the storage requirements of the FIFO memories 349I, 349Q, digital filters 347I, 347Q are provided between the A/Ds 345I, 345Q and the FIFO memories 349I, 349Q. The digital filters 347I, 347Q perform an integration (or summation) of several contiguous samples which appear at the output of the A/Ds 345I, 345Q. The number of outputs to be summed before being dumped into the FIFO memories 349I, 349Q is determined by a control signal provided by the radar synchronizer 34 (FIG. 1).

Completing the I.F. receiver 20 are a pair of phase shifters 351U, 351L and a phase shifter control unit 353, which is shown to receive input signals from the radar synchronizer 34 (FIG. 1) as well as from the five vibration sensitive piezoelectric accelerometers (not shown) on the rear face of the antenna 14 (FIG. 1). The phase shifter control unit 353, which here is simply a double integrating filter, is effective to develop control signals for the phase shifters 351U, 351L, depending upon the vibration experienced at each antenna quadrant phase center at time of pulse transmission as well as the frequency of the transmitted pulse. The piezoelectric accelerometers (not shown) are provided to measure the differential vibratory motion between the antenna phase centers, corresponding to the centers of antenna quadrants 14A . . . 14D (FIG. 3A), which, unless compensated for, would result in phase tracking errors between the latter. Thus, the phase shifters 351U, 351L are provided to compensate for any differential vibratory motion between the antenna quadrants 14A . . . 14D (FIG. 3A) by rotating the COHO signal before it is applied to the quadrature downconversion mixers 327UI, 327UQ, 327LI, 327LQ.

It is anticipated that the vibratory motion of the antenna will introduce approximately ±6 degrees of phase error in the received signals and, therefore, the design of the phase shifters 351U, 351L becomes less critical. Thus the latter may, for example, be fabricated by terminating the output ports of a quadrature hybrid with varactor diodes. As the impedance of the diodes is changed in response to an applied voltage the phase of the signal reflected from the output ports will be correspondingly altered.

Radome Compensation Electronics

As hereinbefore described, the compensation for radome error requires the adjustment of two compensation elements (variable attenuators 295V, 295H and phase shifters 297V, 297H being shown in FIG. 5) in each channel of the R.F. receiver 18 (FIG. 1). This means that a total of thirty-two compensation elements must be digitally controlled. The bit length is a maximum of 10 bits for any one element. Further, because each control word must be updated whenever frequency or antenna pointing direction is changed and because the calculation of each control word is performed in the radar synchronizer 34 (FIG. 1), an interface between each compensation element and the radar synchronizer 34 (FIG. 1) is needed. The requisite interface is provided by an interface in the radar synchronizer 34 (FIG. 1), which interface is similar to the one shown in FIG. 9B. Because the construction of the interfaces are so similar, only one will be illustrated.

To allow asynchronous operation, two memories are required, one storing control signals from the radar synchronizer 34 and the other providing control signals to a set of thirty-two buffer registers. The memories perform the so-called "corner turning" function to convert each control signal to a serial form for entry in the proper buffer register. Each one of such registers converts the applied control signal back to a parallel form and holds that signal for the associated compensation element.

The requisite control signals are partially calculated in the radar synchronizer 34 (FIG. 1). Common inputs for the calculation of all of the control signals include frequency and antenna pointing direction which together determine the address of a block of radome compensation data stored on a dedicated disk. In addition, signals indicative of temperature of the antenna 14 (FIG. 1), radar mode and weather conditions are supplied to digital data processor 30 (FIG. 1) for completing the calculation of the radome compensation values. Combinations of the addressed block in the dedicated disk and the outputs of the digital data processor 30 (FIG. 1) then make up the control signals.

A complete data set for the radome compensation process consists of thirty-two control signals for each of the four frequencies transmitted after each PRI. Assuming a 10 bit digital word for each control signal, there are 1280 bits in a complete data set. Although updating here of the control signals in only one quarter (8) of the buffer registers need be done when frequency is changed, it is preferred here to update all of such buffers when frequency is changed. The use of two memories makes such complete updating possible without interfering with calculation of new control signals and eliminates the necessity for differing updating modes when, for example, updating is required when the pointing direction of the antenna is changed with respect to the radome.

Because compensation must be done in real time, double buffering at each compensation element is dictated to allow each one of the thirty-two control signals to be changed four times in each PRI (with the maximum allowable time for change being one microsecond). Double buffering at each compensation element lengthens the maximum allowable time for change to twenty-five microseconds without affecting performance. Just after a pulse is transmitted and before the R.F. receiver 18 (FIG. 1) is enabled, each newly assembled set of control signals then is clocked into a corresponding double set of double buffer registers 298 (FIG. 5).

The provision of two memories and the sets of double buffer registers 298 (FIG. 5) relieves the digital data processor 30 (FIG. 1) of very high overhead real-time refresh chores.

Within the radar synchronizer 34 (FIG. 1) the memory used for storing the control signals is arranged so that one bucket of such memory is loaded while the corresponding bucket of the other is clocked out. The requisite bucket switching (which is conventional) is performed when needed under control of the digital data processor 30 (FIG. 1), at most every 10 ms (during a worst case roll).

It is noted here that the bandwidths and center frequencies of the I.F. receiver 20 are designed to be immune to delta jamming by using the same technique as was described in connection with the description of the R.F. receiver 18. That is to say, the bandwidth of each section of the I.F. receiver 20 is designed to be one-half the frequency of each succeeding downconverter so no false I.F. signal may be engendered from the difference signal of a delta jammer.

Figure 7A:
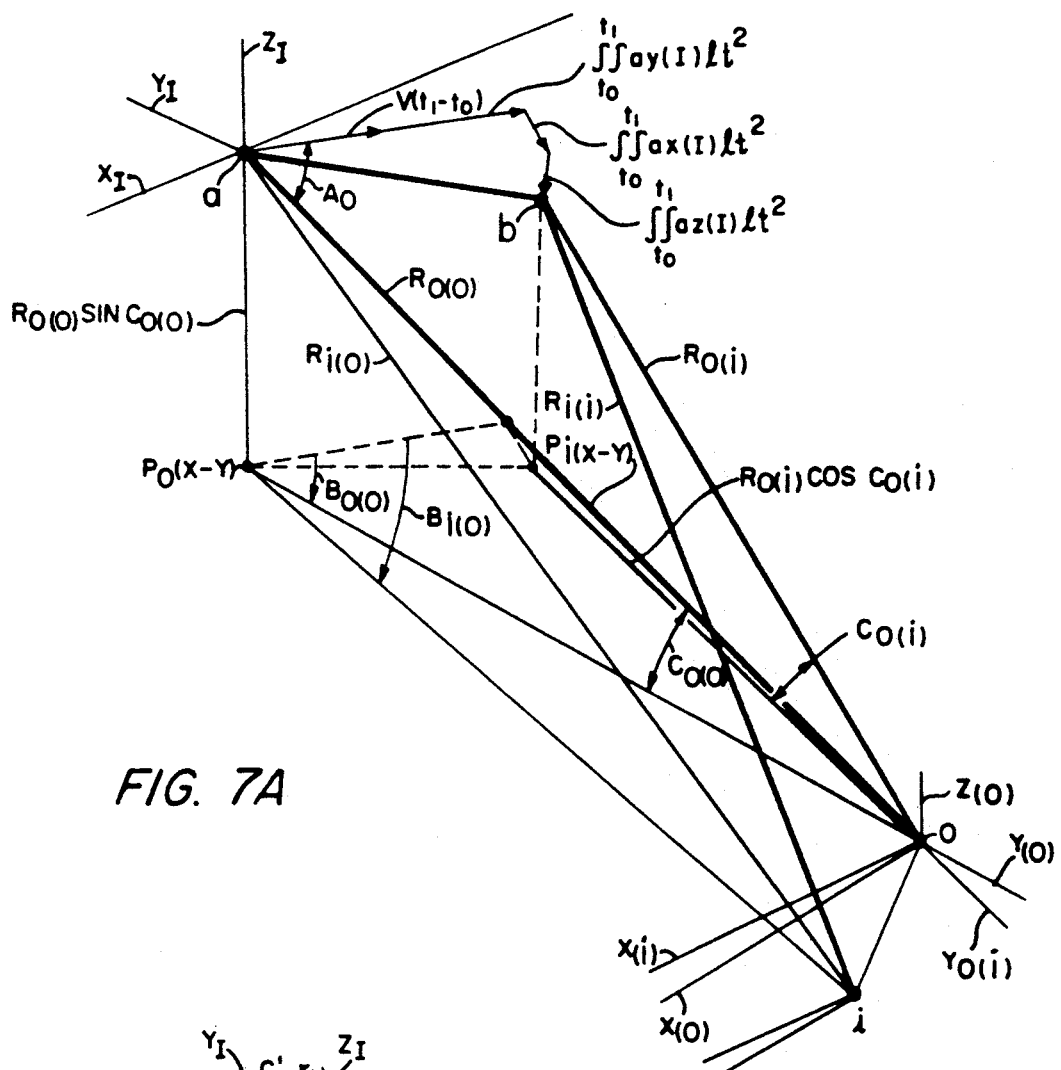
FIG. 7A is a sketch illustrating how movement of an aircraft carrying the contemplated AWTSS imposes limits on the extent of the field which may be satisfactorily mapped.
Figure 7B:
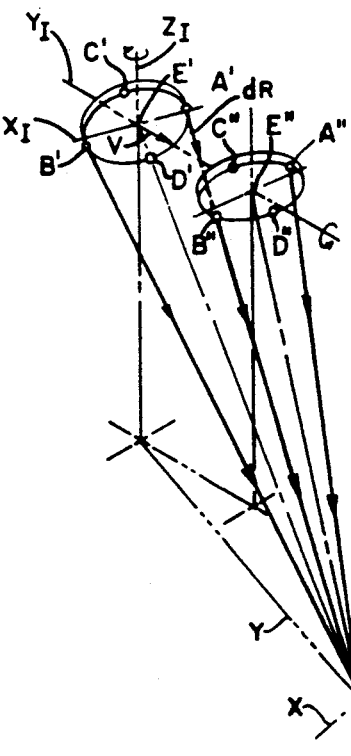
FIG. 7B is a sketch illustrating how the antenna of FIG. 1 may be rotated about an axis to enlarge the field which may be satisfactorily mapped.

Motion Compensation (FIGS. 7A and 7B)

Before proceeding with a detailed description of the radar synchronizer 34 (FIG. 1), the signal processor 26 (FIG. 1) and the digital data processor 30 (FIG. 1), it will be instructive at this point to discuss the motion compensation requirements of the radar system 10 (FIG. 1).

As is known, any synthetic aperture radar used to map a terrain with high resolution utilizes coherent processing of signals from each individual ground reflector in the terrain being mapped for a dwell (or coherent integration time) of sufficient length to resolve such signals in a set of range gates and Doppler filters. Such processing makes direct use of the motion of an airborne radar during the dwell period to provide different Doppler frequencies for ground reflectors at different angles from the velocity vector of an aircraft. However, significant movement of the range gates and Doppler filters during the dwell induce quadratic and cubic phase components on the terrain and cause degradation of the resolution of the map finally produced. Compensation for such movements includes "slipping" range gates and the Doppler filter bank with sufficient accuracy in a known manner to reduce the unwanted motion during each dwell to acceptable bounds.

A further source of error in radar mapping is phase modulation, induced by random or vibrational motions of the phase center of the radar antenna, during each dwell. With such motions, if the resulting phase modulation is sufficiently large, modulation sidebands of signals associated with each particular ground reflector may overlap with signals from nearby ground reflectors. Compensation for such motions therefore consists of impressing a time-varying phase shift on each signal being processed, such phase shift being determined by a sensor monitoring the phase center motion of the radar antenna along boresight and being opposite in sense to the phase modulation introduced by the unwanted motion of the radar antenna.

The Doppler frequency of any ground reflector will change during each dwell as a result of the slightly changing angle to each ground reflector caused by the motion of the radar antenna. If such change is sufficiently large during each dwell so that the Doppler resolution width is exceeded, then a spreading of the energy from ground reflectors into adjacent Doppler filters results. To prevent such spreading, compensation in the form of an appropriate time-varying Doppler shift of each received signal is required. In this case, however, inertial instrumentation is used to sense the motion causing the unwanted change in Doppler frequency.

In addition to the foregoing, other perturbations of the antenna cause phase modulation of the received signals. If these modulation terms are in a small bandwidth, i.e., small with respect to the Doppler resolution bandwidth (which is approximately equal to the inverse of the time of dwell), then the effect is apparently the same as a Doppler modulation caused by a slowly moving ground reflector, with a maximum Doppler rate given by:

$$f(t) = 2a(t)/\lambda \qquad \text{Eq. (1)}$$

where a(t) is the acceleration of the antenna phase center in the direction of the line-of-sight and $\lambda$ is the wavelength of the transmitted signals. When modulation containing significant energy at frequencies higher than the coherent resolution bandwidth are caused, a phase error that varies during each dwell results. If such error changes sinusoidally during a dwell, a spurious pair of sidelobes in the Doppler filter output is created. The Doppler offset of such sidelobes (relative to the mainlobe filter response) is equal to the frequency of the perturbation causing the unwanted phase modulation. The amplitude of each such sidelobe (relative to the mainlobe filter response) is directly proportional to the peak excursion of the phase center of the radar antenna along boresight.

Conventional motion compensation techniques cancel the effects of radial acceleration from the radar return signals. However, under dynamic flight conditions as here contemplated, cancellation of such effects is not of prime concern. Rather, the most important object is to attain width and depth of focus of any map when violent maneuvers are required in a tactical situation without exceeding the computational time constraints. It can be shown that the horizontal component of aircraft acceleration perpendicular to the antenna boresight direction (usually denoted simply as the cross-acceleration) has a devastating effect on the width of focus when any conventional motion compensation technique is followed.

In order to maintain the width, depth and "height" of focus of the requisite synthetic aperture maps under severe aircraft acceleration, the pulse repetition interval (PRI) of the herein contemplated radar system 10 (FIG. 1) is varied to hold constant the angular increment swept out by the horizontal component of the line-of-sight between the antenna and the map reference point. The width of focus then is a function of the horizontal component of radial acceleration as opposed to the cross-acceleration. The depth of focus, on the other hand, is a function of both vertical and horizontal radial acceleration components. The depth of focus is, however, not as strongly dependent on aircraft acceleration as is the width of focus, and the depth of focus is relatively independent of PRI variation.

"Height" of focus refers to the height (above or below) that a given ground reflector may be (with respect to that of a map reference point) without undue defocusing. The height of focus is limited by the horizontal (radial) and vertical components of aircraft acceleration and centripetal acceleration effects, with the vertical component of vehicle acceleration being the most important. Since the height of focus is proportional to the square of the azimuth resolution, it imposes a severe restriction when a map with very high resolution is to be made. The height of focus cannot be increased in any direct manner by more processing capability since it is jointly dependent upon vehicle acceleration and terrain variation.

Figure 7C:
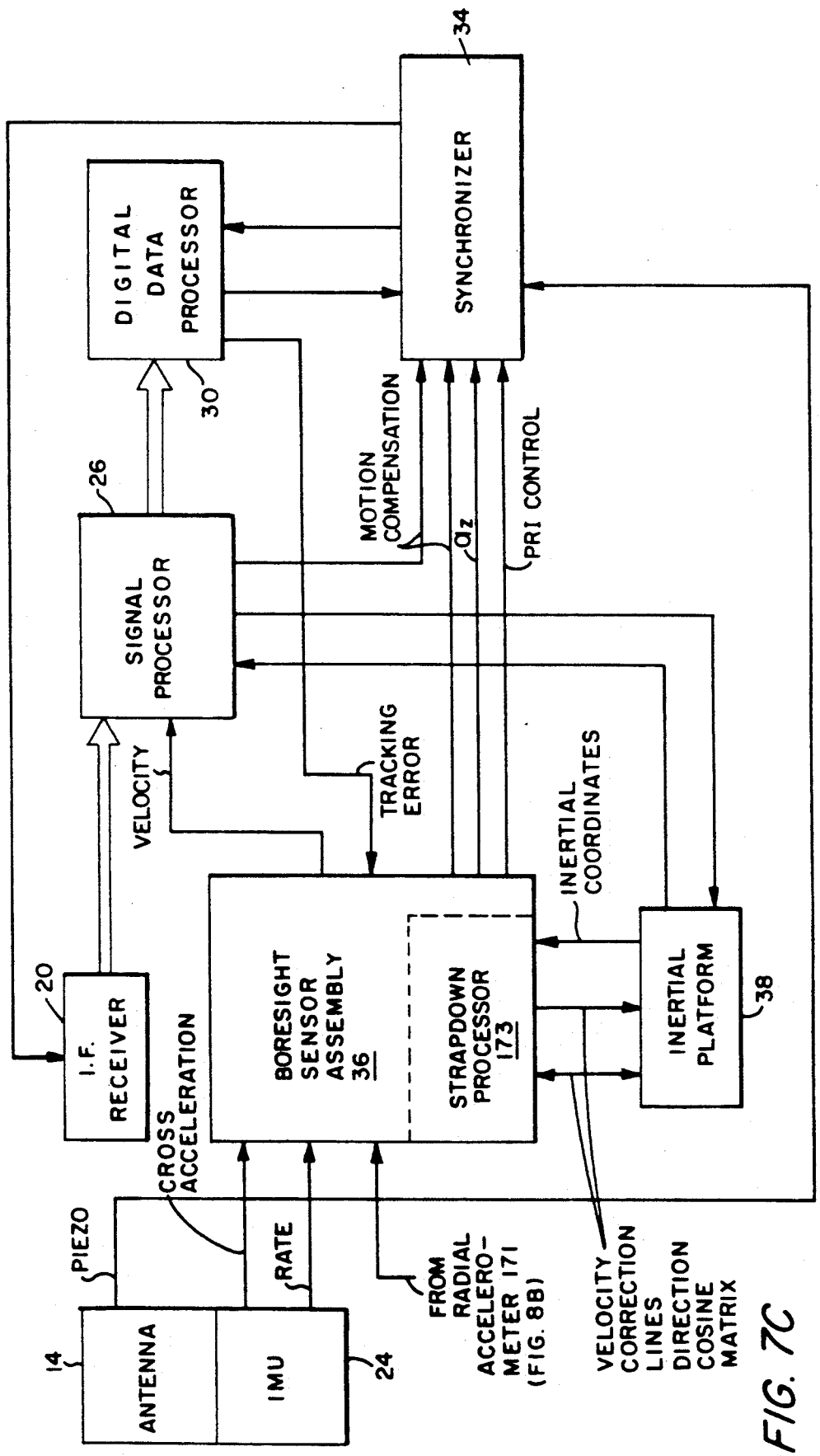
FIG. 7C is a block diagram showing how various elements of the contemplated AWTSS may be interconnected to compensate for movement of the aircraft during a dwell.
Figure 10:
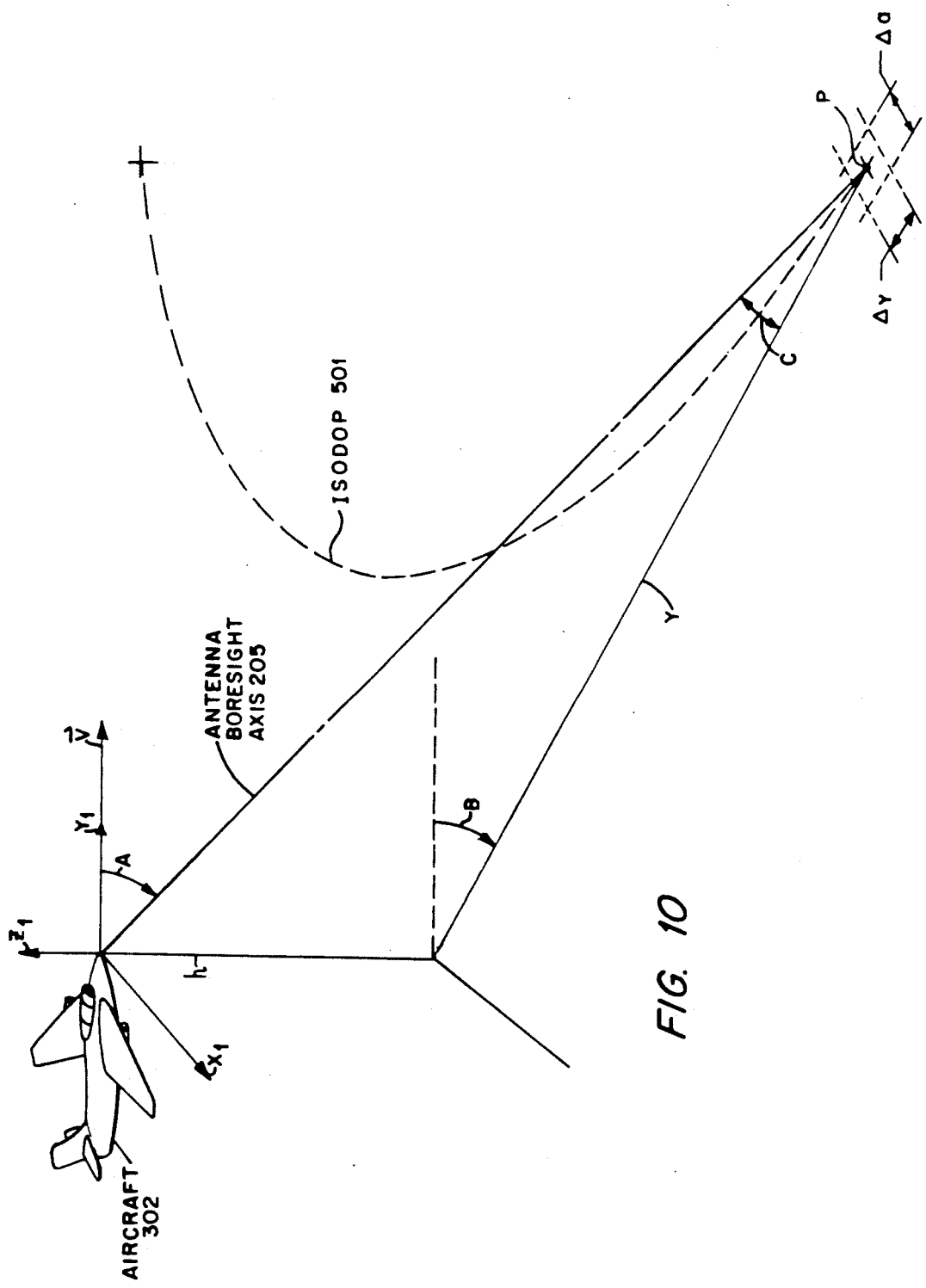
FIG. 10 is a sketch showing, in a general manner, the geometry of a tactical situation when the contemplated AWTSS is used to aid in the navigation of an aircraft over a terrain.

Referring now to FIGS. 7A to 7C, the effects of aircraft accelerations on the problem of focusing a synthetic aperture map will be explained. Thus, an aircraft 302 (FIG. 10) employing a synthetic aperture radar (not shown) has its radar antenna (also not shown) located at point a, while a synthetic aperture map reference point is located at point o. A ground scatterer is located at a point i with cartesian coordinates $X_i$, $Y_i$, $Z_i$ with respect to the map reference point o. A reference coordinate frame (the $X_o$, $Y_o$ and $Z_o$ coordinate frame) is a cartesian coordinate frame centered at the map reference point o, with the Z axis being vertical and Y axis being along the horizontal component of the position vector (not numbered) from point a to point o at time $t_o$. The X axis completes the orthogonal triad, here in the right-handed sense. The $X_1$, $Y_1$, $Z_1$ coordinate frame is another local vertical frame centered at point a, with the $Z_1$ axis being vertical and the $Y_1$ axis disposed along the horizontal projection of the velocity vector of the aircraft 302 (FIG. 10). $A_o$ is the angle between the line-of-sight vector to the map reference point o and the velocity vector. The angles $B_o$ and $C_o$ are, respectively, the squint and elevation angles.

It will be noted that, as the aircraft 302 (FIG. 10) moves, the boresight line of the antenna remains fixed on point o, which means that the $x_o$, $y_o$ coordinates of the point o rotate about the $Z_o$ axis and that (for small changes of position of the aircraft 302 (FIG. 10)) the $X_i$, $Y_i$ coordinates of the point i similarly rotate about the $Z_o$ axis.

It will be apparent that no cross-acceleration, i.e. acceleration along the X axis, resulting from movement of the aircraft 302 (FIG. 10) is experienced at the point o. It follows then that any compensation technique for nonlinear motion between the aircraft 302 (FIG. 10) and the point o need only be directed to compensation for radial acceleration, i.e. acceleration along the Y axis. On the other hand, because of the displacement of the point i from the point o, motion of the aircraft 302 (FIG. 10) causes (in addition to a radial movement along the Y axis), cross-acceleration along the X axis and a concomitant nonlinear change in phase of the returned signals from the point i. The magnitude and sense of the cross-acceleration (and also of the radial acceleration) at the point i is a function of its direction and distance, measured in the X-Y plane, from the point o. As mentioned hereinbefore, compensation for the displacement of the point i along the Z axis may not be directly calculated; however, if vertical acceleration of the aircraft 302 (FIG. 10) is reduced to a minimum during a dwell, the compensation for cross-acceleration and radial acceleration will also provide a modicum of compensation for "Z" axis displacement. In this connection it will be recognized that an inherent ambiguity exists between return signals from a point above the plane of the selected range-Doppler matrix, i.e. the X-Y plane, and return signals from a point below such plane. A moment's thought will make it clear that, although the selected range-Doppler matrix is defined in the X-Y plane by appropriate pairs of isorange and isodop lines, such pairs of lines are also lines which lie on curved surfaces. The isorange lines lie on spherical sectors of "range" spheres which are centered at point a and the isodop lines lie on the surfaces of halves of "Doppler" cones having vertices along the velocity vector and intersecting the terrain being mapped to define the isodops as hyperbolas. Return signals from any point within the space between selected spherical sectors and the "Doppler" cones have the same "range-Doppler" signature and are therefore undistinguishable from each other. Further, all such signals would have the same "range-Doppler" signature as return signals from a point on the Y coordinate. The result is that a three dimensional field mapped by radar appears as a two dimensional image in which it appears that there is no difference in elevation across such field. Fortunately, however, there is little chance for confusion (when a terrain is being mapped) as to whether a given target is "higher than" or "lower than" the point o. On any terrain being mapped, all targets of interest are ground targets approximately on the same level as the center of the map, here point o. Further, because of the long experience people have had with conventional photography, the interpretation of images in two dimensions of features which are actually three dimensional is easily accomplished.

It will now be appreciated that, if the differences between the radial acceleration at the points o and i and the cross-acceleration at the point i are determinable, then compensation for motion may be effected for points on the map other than point o. As a result, then, a radar map of higher quality may be made. It will also be appreciated that the degree of improvement, in a practical case, is the result of trade-off between the size and quality of the desired map and the necessity of providing a computer to calculate and to apply the requisite compensation factors in real time. Obviously, it would be ideal to calculate and apply a proper compensation factor to each range-Doppler cell in order to increase the resolution of each cell making up a radar map. It is equally obvious, however, that the amount of data to be processed to obtain the large number of correction factors required would make such an approach impractical, considering the present state of the art of airborne computers. It is, however, here contemplated, using presently known computers, to calculate compensation factors to improve resolution by at least an order of magnitude over the resolution usually attained, making it possible to generate a radar map on which small targets, such as tanks, may be distinguished.

With the foregoing in mind it is here contemplated to derive compensation factors which improve the resolution of point i without allowing the nonlinear change in phase of signals from point o to exceed a given tolerable amount, say 45°. Because the phase of any received signal is a function of the range of the reflector giving rise to such signal, the requisite compensation factors, i.e. phase shifts, may be calculated by first determining how the ranges to the points of interest (points o and i) change during a dwell.

Referring now to FIG. 7A, the geometry of an exemplary situation wherein an aircraft moves from point a to point b during a dwell (time interval $(t_1-t_o)$) while the boresight of an antenna (not shown) is kept on point o to measure the depression angle (which is the same as the elevation angle C when the air craft is in level flight), the angle A and the angle B and the range to point o. The aircraft here, in its inertial coordinate system $(X_I, Y_I, Z_I)$, has a velocity V, and is subject to acceleration which may be resolved into accelerations $A_{X(I)}, A_{Y(I)}, A_{Z(I)}$ along the inertial coordinates $X_I, Y_I, Z_I$. In addition, it should be noted that relative movements between the antenna 14 (FIG. 3A) and the aircraft 302 (FIG. 10) add to the accelerations. It will be apparent from inspection of FIG. 7A that the range $R_i$ to any selected points, here points o and i, on the X-Y plane may be determined and that the amount and direction of rotation of the X-Y axes may also be determined. To put it another way, using point o as the reference point during a dwell, the position and orientation of the isorange lines and isodops in the "range-Doppler" matrix relative to the inertial coordinates $X_I, Y_I$ may be determined. As a result, the signals returned from different points on the terrain being mapped may be appropriately modified to allow the finally generated radar map to be presented in inertial coordinates with greater resolution than would be possible if only point o were to be compensated.

It will now be appreciated that the rationale of the method of operating a pulse radar disclosed by Nathan Slawsby in U.S. Pat. No. 4,084,158 (which patent is assigned to the same assignee as this application) is applicable here. That is to say, because the Doppler shift of the signals returned from each point on the terrain being mapped changes in a nonlinear manner, i.e. exhibit a Doppler acceleration as well as a Doppler velocity, compensation for such nonlinear changes may be effected here by changing the pulse repetition frequency of the radar so that the received signals from each point on the terrain are properly phased with respect to each other to minimize the effect of Doppler acceleration.

Although the method described by Slawsby in the cited patent is effective in compensating for movement of the radar to improve the resolution of a radar map, it is not completely satisfactory by itself in all situations. In particular, when a moving target (such as a tank) is to be detected in the presence of "clutter", the signal-to-clutter ratio obviously should be optimized. Here "clutter" is made up of the features on the mapped terrain which allow the radar map to be made, such features being stationary.

Optimization of the signal-to-clutter ratio may be effected here by following an iterative procedure whereby: (a) the antenna 14 (FIG. 3A) is oriented so that, with the boresight line intersecting the point o, the phase centers A', B' are in the plane defined by the boresight line to the point o and the velocity vector of the aircraft 302 (FIG. 10); (b) the pulse repetition interval between successive pulses is adjusted (as described hereinbefore) to reduce the effect of acceleration on the received signals from point o to a minimum; (c) the difference between the signals received in the quadrants 14A, 14B, integrated during a dwell, are compared to a predetermined level; and the process is repeated (with different pulse repetition intervals) until only the integrated returns from moving targets are above the predetermined level. As indicated in FIG. 7B, the optimum pulse repetition interval occurs when, in the interval between successive pulses, the phase center B' moves into coincidence with the line between the phase center A' and the point o existing when a preceding pulse was transmitted.

It will be appreciated on inspection of FIG. 7B that the just-described movement of the phase center B' (to the point marked B") may be accomplished only if the antenna is rotated about both the $Z_I$ and the $Y_I$ axes as the antenna is moved. It will also be appreciated that, because the transmitted signals are coherently modulated and the distance dR in FIG. 7B may be measured, the phase shift of received signals due to the propagation delay suffered by any signal moving through the distance dR is calculable so that compensation of such phase shift may be effected. To put it another way, the phase centers A' and B' may (after movement of the latter to point B" and compensation) be considered to be at the same range from any stationary object at or near the point o. It follows then that subtraction of one of the demodulated received signals from the other will effect cancellation in the same manner as a conventional monopulse receiver would be processing received signals in two opposite parts of a monopulse antenna.

A moment's thought will now make it clear that compensation for the distance dR to make it seem that the phase centers A', B" are coincident (as far as return signals from a stationary object adjacent the point o are concerned) may, or may not, have a similar effect on return signals from a moving target. Thus, the distance dR may be defined in terms of a number of wavelengths of the transmitted signal; this in turn means that the phase shift of any received signal moving through the distance dR may be expressed as $2\pi n/\lambda$, where "n" equals the distance dR expressed in terms of the number of wavelengths of the transmitted signal. It will be recognized that the expression just made is the same as the expression for Doppler "blind" speeds (where "n" is any integer greater than unity). Therefore, if return signals from a moving target are being processed, the range rate of such target (which, of course, determines the phase shift impressed on such return signals over a period of time) controls the degree of cancellation suffered when the signals from the phase centers A', B" are processed. That is to say, whenever a moving target has a Doppler "blind" speed, the return signals from such target will appear to be the same as received signals from a stationary object, with the result that processing cancels such return signal.

To reduce the number of Doppler "blind" speeds, it is necessary to reduce the distance, in wavelengths, between the phase centers, i.e., reduce the size of "n".

Here, because the phase centers A∝ and B' are fixed in position relative to one another, it is contemplated to process the return signals at phase centers C∝, D' to produce an equivalent phase center E', midway between phase centers A', B'. Thus, the return signals at phase centers C', D' are added and the resultant sum signal is divided in half to produce the equivalent phase center E'. When the equivalent phase center E is coincident with the original line from A' to the point o (again by controlling the pulse repetition intervals and rotating the antenna) the intervals between Doppler "blind" speeds are increased. It follows then that "low speed" targets may be detected using received signals from phase centers A' and B' and "high speed" targets may be tracked using received signals from phase centers A' (or B') and E'.

It will now be noted that, although FIG. 7B and the discussion in connection with FIG. 7B have been specifically directed to how the signal/clutter ratio adjacent the point o would be enhanced, the signal/clutter ratio in other areas could be enhanced simply by having the phase center B" fall on the original line of sight to a point other than point o. It will also be noted that considering FIGS. 7A and 7B together, in a particular tactical situation with known dimensions of the antenna, there are a sufficient number of measured or known angles and distances to allow a complete solution of the problem to be made.

Integrated Radar/Inertial System (FIG. 7C)

Referring now to FIG. 7C, a simplified block diagram of the radar system 10 (FIG. 1) illustrating the interplay between the various subassemblies for the purposes of motion compensation is illustrated. Thus, the line labeled "PIEZO" out of the antenna 14 represents the output signals from the piezoelectric accelerometers (not shown) which are passed, here via the synchronizer 34, to the I.F. receiver 20 (FIG. 1) wherein they are used, in a manner to be described in detail hereinbelow, to compensate for any vibratory motion of the antenna phase centers (not shown). The output signal from a radial accelerometer 171 (FIG. 8B) as well as the output signals from the cross accelerometers (not shown) and the rate gyros (also not shown) within the head mounted IMU 24 are passed in analog form to the boresight sensor assembly 36 wherein they are processed ultimately to form motion compensation signals for the four quadrant phase centers (not shown). Thus, in order to calculate the antenna axis components of the gravity vector a processor, referred to as the strapdown processor 173, within the boresight sensor assembly 36 computes a direction cosine transformation which defines the angular orientation of the antenna axes relative to the north, east and local vertical axes determined by the inertial platform 38. The angular motion of the radar antenna axes is sensed by the three orthogonal rate gyros (not shown) within the head mounted IMU and their output signals are used in the strapdown processor 173 for high frequency (200 Hz) updating of the direction cosine matrix. Low frequency updating of the direction cosine is, as will be described in detail hereinbelow, provided via a transfer alignment Kalman filter (not shown but within the inertial platform 38) which utilizes the coordinate frame instrumented by the inertial platform 38 as a reference for the strapdown direction cosine transformation matrix.

The strapdown processor 173 rotates the three accelerometer input signals, via the direction cosine matrix, into locally level coordinates and integrates the equations of motion to obtain velocity output signals. The latter, after conventional lever arm corrections in the signal processor 26 to account for displacement vector changes between the inertial platform 38 and the antenna 14, are passed to the inertial platform 38. The latter compares, in a transfer alignment Kalman filter (not shown), the velocity estimates from the strapdown processor 173 with its own velocity estimates. The velocity differences are the result of errors in the direction cosine matrix within the strapdown processor 173 as well as in accelerometer and gyro measurement errors. The Kalman filter (not shown) is designed to estimate these errors which are subsequently passed back, as corrections, to the strapdown processor 173.

The output signals from the radial accelerometer 171 (FIG. 8B) are accumulated in high speed motion compensation buffer registers (not shown, but each having twenty-one bits) within the boresight sensor assembly 36. The buffer registers are bumped at a rate corresponding to the PRF to provide signals for the synchronizer 34, to be digitally integrated along with feedback signals from the signal processor 26 to form incremented motion compensation (phase correction multipliers) for the radar signal processing. The horizontal cross-accelerometer data is also accumulated in the boresight sensor assembly 36 and sent to the synchronizer 34 to be used for PRI control. The component of vertical acceleration due to antenna motion is also passed from the boresight sensor assembly 36 to the synchronizer 34 for use, in a manner to be described in detail hereinbelow, for ultra high resolution A/D sampling rate variation.

The signal processor 26 performs the following high speed motion compensation functions: Phase rotation of the PRF samples from each of the four antenna phase centers, phase rotation required for clutter cancellation, and differential phase corrections for map range sectors. The digital data processor 30, on the other hand, performs low frequency centripetal motion compensation and supplies tracking error commands to the boresight sensor assembly 36.

Figure 8A:
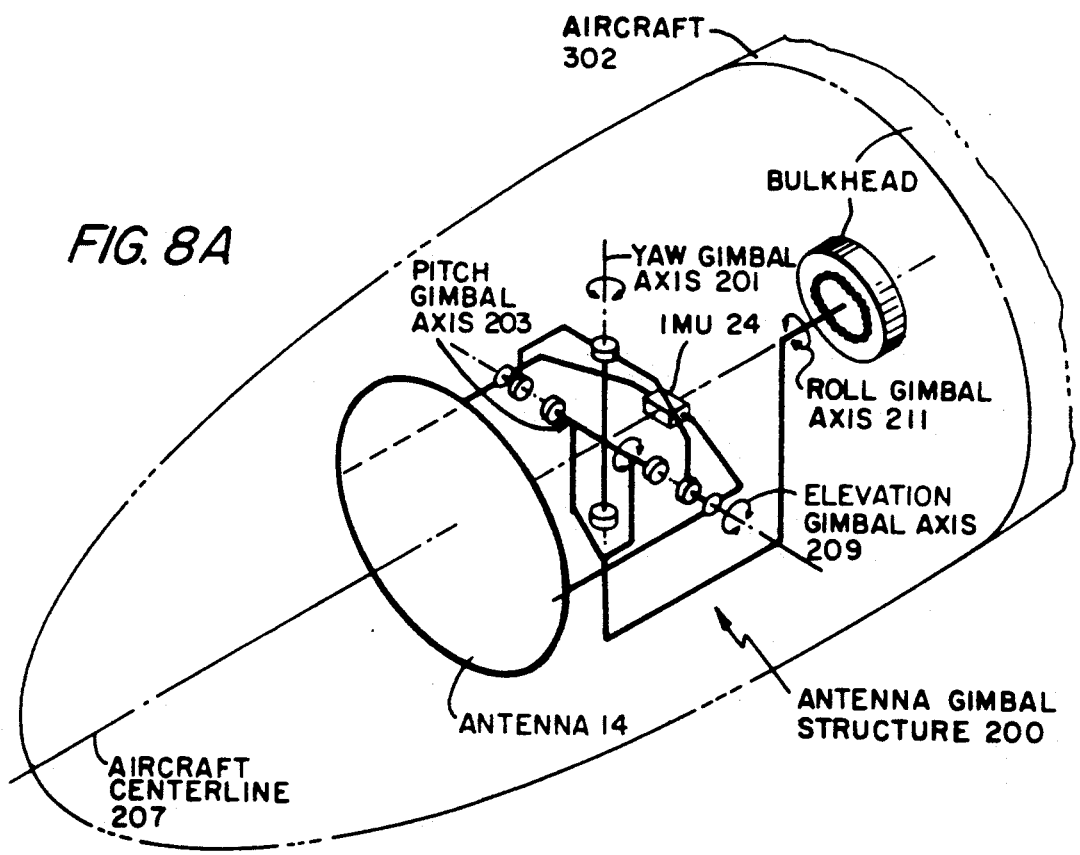
FIGS. 8A and 8B are sketches showing how the gimbal axes of the antenna shown in FIG. 1 are arranged and an outline drawing of the gimbal assembly supporting the antenna of FIG. 1.

Gimbal Structure and Antenna IMU (FIG. 8A)

Figure 8B:
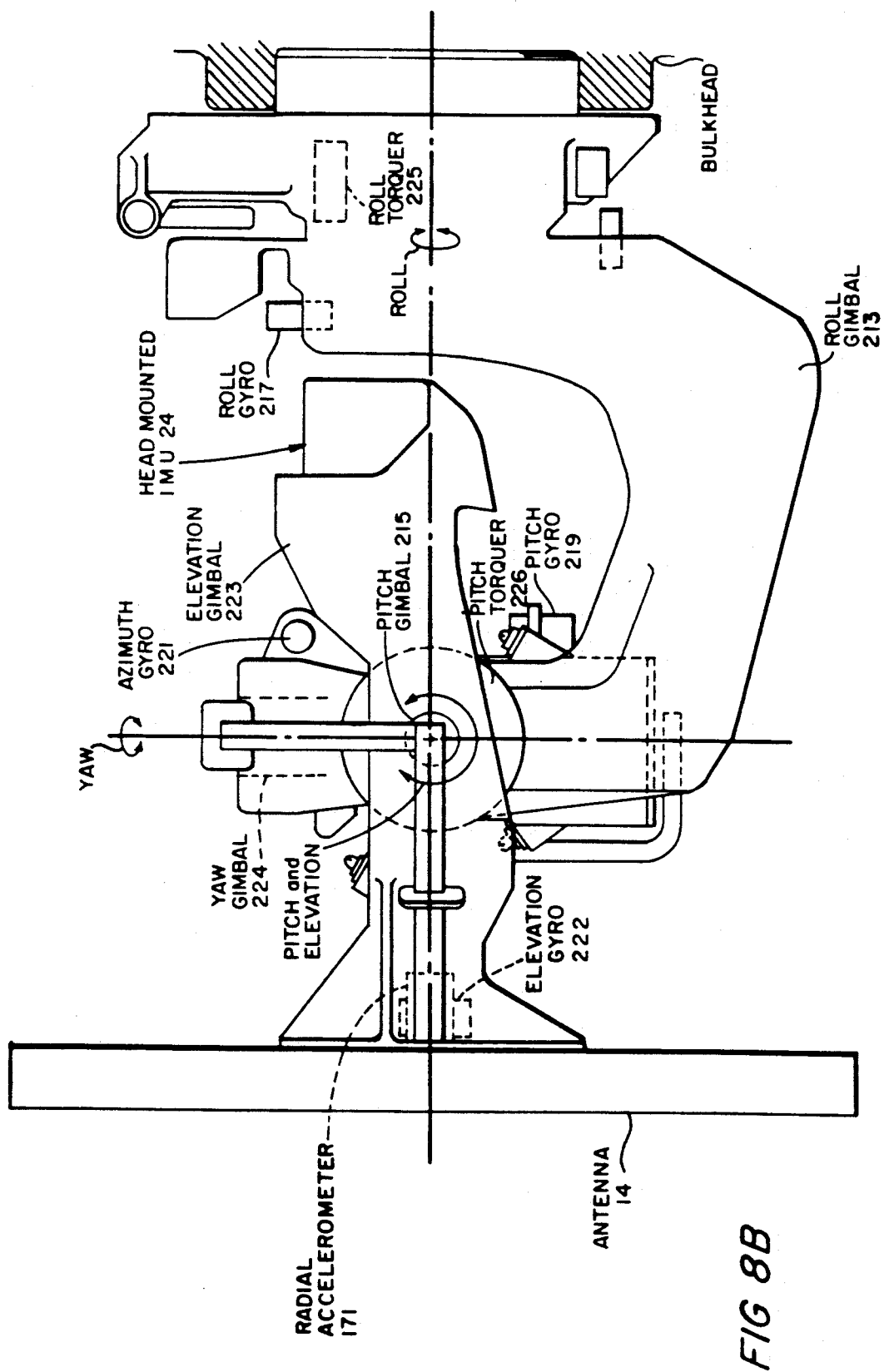

Referring now to FIGS. 8A and 8B, the antenna gimbal structure 200 is shown to comprise a four axis gimbal system. The yaw gimbal axis 201 and the pitch gimbal axis 203 are conventional, being required to point the antenna boresight axis 205 in a given direction relative to the aircraft centerline 207. In order to meet the requirement that the plane (not shown) containing the antenna azimuthal phase centers be maintained parallel to the slant plane (the plane defined by the velocity vector and the line-of-sight to the map reference point) a tilt (or elevation) gimbal axis 209 is required. It should also be noted that the slant plane is also the plane which cuts the isodop-isoran lines (not shown) at 90° and that, in consequence, the plane for the azimuth monopulse axis, which is coincident with the plane (not shown) containing the antenna azimuthal phase centers, is also coincident to the slant plane. Finally, a roll bulkhead gimbal axis 211 is provided to prevent gimbal lock and to maintain the requisite tracking accuracy in the presence of high angular accelerations.

It is noted than an inertial measuring unit 24 (sometimes hereinafter referred to simply as the head mounted IMU 24) is provided on the gimbal structure 200. The herein contemplated system utilizes both the head mounted IMU 24 and the inertial platform 38 for the purposes of motion compensation and navigation. If both functions were to be performed by the head mounted IMU 24, a precision strap-down system with its attendant performance degradations and computational difficulties would be required. On the other hand, if the inertial platform 38 were to be used for both the motion compensation and navigation functions, its location within the aircraft 302 presents a problem. That is to say, for navigation purposes it is desirable to locate the inertial platform 38 at, or within the proximity of, the center of gravity of the aircraft 302. This location here is about eighteen feet from the nose of the aircraft 302 where the antenna 14 is located. Since the instantaneous inertial acceleration at the antenna phase centers is not well correlated with the inertial acceleration occurring at the remote inertial platform 38, the accelerometers (not shown) within the inertial platform 38 are essentially useless for high frequency motion compensation purposes. Thus, the head mounted IMU 24 is utilized primarily for compensation of motion of the antenna 14, while the inertial platform 38 is used for navigation and as a vertical reference for gravity compensation of the IMU 24, although both units mutually aid each other, via a coordinate transformation process to be described in detail hereinbelow.

The uncompensated motion of the antenna 14 in a given radial direction must be constrained to satisfy the requirements imposed by the various mapping and tracking modes. The constituent sources of error in any estimate of the radial acceleration fall into three categories: (1) the magnitude of the velocity error; (2) the uncertainty in the angular orientation of the head coordinates with respect to the coordinates instrumented by the inertial platform 38 for the purpose of gravity compensation; and (3), the error in acceleration measured by each accelerometer along its input axis. For map focusing purposes, the angular uncertainty between local vertical (as measured by the inertial platform 38) and the input axis of the boresight or radial accelerometer 171 (FIG. 8B) must be held within a specified tolerance.

As mentioned above, the herein contemplated motion compensation system employs head mounted gravity compensated accelerometers (two of which are not shown but are within the IMU 24). The requisite gravity compensation is a two part process. First, the change with altitude of the magnitude of gravity must be estimated, and secondly, the component of gravity along the input axes of the accelerometers must be calculated. The variation of the magnitude of gravity relative to some ground reference is given by:

$$\Delta g = -2 g_e H / R_e \qquad \text{Eq. (2)}$$

where $g_e$ is the magnitude of the gravity vector at the ground reference point, H is the altitude of the aircraft 302, and $R_e$ is the radius of the earth at the ground reference point. The second part of compensation for gravity is somewhat more complex, requiring a special version of the standard acceleration matching technique for determining the direction cosine matrix between the inertial platform 38 and the coordinates of the accelerometers. The IMU 24 and the inertial platform 38 then are used in combination, via the matrix of direction cosines defined by the coordinate axes of each instrument, to resolve the components of gravity as required.

Before proceeding, it will be instructive at this point to briefly describe the antenna gimbal structure 200. Basically, the antenna gimbal structure 200 allows the beam to be transmitted along the requisite line-of-sight and isolates the antenna 14 from the motions of the aircraft 302. The antenna gimbal structure 200 comprises a four-axis gimbal arranged to decouple and stabilize the antenna 14 in the presence of aircraft motion (roll, pitch and yaw). The contemplated configuration further allows all of the cardinal axes to pass through a common point, thereby permitting servo control about all the axes by means of the head mounted IMU 24. It should be noted here that, as mentioned above, a four-axis gimbal assembly is provided to prevent a gimbal lock situation which otherwise might occur with a conventional three-axis gimbal system. Thus, for example, a conventional three-axis gimbal system would experience yaw gimbal lock if the antenna 14 were looking forward and down 45° and the aircraft 302 were to pitch upward by 45°. Furthermore, even in the absence of gimbal lock, servo performance degrades as the pointing angle approaches within 30° of gimbal lock, thereby compromising the requisite pointing accuracy.

Given that a four-axis gimbal structure 200 is required to meet the target tracking requirements, a gimbal order of outer roll, pitch, azimuth and elevation was selected as the optimum configuration from the point of view of, inter alia, stiffness, damping of resonances, ease of implementing the waveguide connection to the antenna 14 and gimbal travel requirements. In such a configuration, the roll axis 211 and the pitch axis 203 form a stable platform for a conventional azimuth/elevation mount. The yaw axis 201 and the elevation axis 209 then form the part of gimbal structure 200 required in the target tracking modes.

Referring now also to FIG. 8B, the roll gimbal 213 and the pitch gimbal 215 are stabilized by means of rate gyros 217, 219, respectively, which are mounted on their respective axes. The antenna 14 is rate stabilized about the yaw (azimuth) gimbal axis 201 and the elevation gimbal axis 209 by means of an azimuth rate gyro 221 and an elevation rate gyro 222. The roll gimbal 213 and the pitch gimbal 215 effectively isolate the azimuth gimbal axis 201 and the elevation gimbal axis 209 from the dynamic environment of the aircraft 302.

The head mounted IMU 24, which, as explained, is provided for compensation of motion of the antenna 14 relative to the aircraft 302, comprises three mutually orthogonal rate gyros, the radial accelerometer 171 and a pair of cross accelerometers, such elements (with the exception of the radial accelerometer 171) being mounted on the elevation gimbal 223 to serve also as a counterweight to the antenna 14.

The roll gimbal 213, the pitch gimbal 215, the elevation gimbal 223 and the yaw gimbal 224 are driven by conventional torque motors of which only the roll torquers 225 and the pitch torquers 226 are shown. Such motors here are direct current motors with direct drive to avoid the backlash associated with the use of gear drives.

The roll and pitch axes 211, 203, respectively, are rate controlled by operation of a roll rate gyro 217 and the pitch rate gyro 219 in conjunction with rate control commands received from the digital data processor 30 (FIG. 1). The inner gimbal axes, the yaw gimbal axis 201 and the elevation gimbal axis 209 are all controlled by means of coordinate transformation resolvers (not shown) mounted on their respective gimbals. The rate integrating gyros (not shown) within the IMU 24 are used to sense rotation about the yaw gimbal axis 201 and the elevation gimbal axis 209. The output signals from the former are fed back to both the coordinate transformation resolvers (not shown) and the digital data processor 30 (FIG. 1). It should now be appreciated by those of skill in the art that the coordinate transformation resolvers (not shown) are utilized to control the jaw and elevation gimbal axes 201, 209, respectively, to effect a higher control rate and thereby prevent undesired resonances. That is to say, the outer roll and pitch gimbal axes 211, 203, respectively, are controlled by feeding data directly back from their respective rate gyros 217, 219 to the digital data processor 30 (FIG. 1) at a relatively low data rate, here 64 Hz. Such a data rate is, however, too low to provide the requisite degree of rate control of the jaw and elevation gimbal axes 201, 209, respectively, and, therefore, the coordinate transformation resolvers (not shown) are provided to effect a higher data rate while maintaining an identical interface with the digital data processor 30 (FIG. 1).

It should be noted here that the antenna gimbal structure 200 is unique and provides the following advantages vis-a-vis conventional two or three axis gimbal structures: (a) the four axis gimbal provides the greatest angle coverage for the antenna 14; (b) it reduces the dynamic environment seen by the yaw axis 201 and the elevation axis 209, thereby achieving the requisite stabilization; (c) it permits placing the jaw axis 201 perpendicular to the slant plane; and (d) the four axis gimbal structure 200 allows target tracking without rotation of the antenna 14, thereby providing a signal processing advantage by easing clutter cancellation requirements. Furthermore, the inverted roll gimbal 211 design permits the placement of the head mounted IMU 24 and a counterweight (not numbered) directly in line behind the antenna 14, making the horizontal and vertical balance about the pitch gimbal axis 203 a symmetrical balance operation. This approach serves to produce the lightest possible system weight for a given antenna size.

Transfer Alignment (FIG. 8B)

As was mentioned above, the herein contemplated coordinate transformation technique involves resolving the direction cosine matrix between the instrumented axes of the inertial platform 38 and the head mounted IMU 24. To this end the strapdown processor 173 (FIG. 7C) (sometimes hereinafter referred to simply as processor 173 and which is here a Texas Instruments Model 9900 microprocessor) is shown to receive the output signals from the head mounted IMU 24 and from a line-of-sight sensor assembly (not numbered) mounted at the rear center of the antenna 14. The line-of-sight sensor assembly (not numbered) comprises the radial accelerometer 171 and the elevation rate gyro 222, both of which are aligned with the antenna boresight axis 205. The processor 173 is physically located within a boresight sensor assembly 36 (FIG. 1). It should be noted here in passing that the output signals from the IMU 24 comprise the output signals from three mutually orthogonal rate gyros (not shown), a pair of cross accelerometers (also not shown) and the line-of-sight sensor assembly (not numbered). It should also be noted that the process of transfer alignment in inertial navigation systems is well known to those of skill in the art (e.g. "The Kalman Filter in Transfer Alignment of Airborne Inertial Guidance Systems" by A. Sutherland and A. Geib, TASC Report TR-134-2, Jan. 15, 1968; "Strapdown Inertial System Alignment Using Statistical Filters: A Simplified Formulation"0 by J. Deyst and A. Sutherland, AIAA Journal, Apr. 1973, pp. 452–6; and "A New Concept in Strapdown Inertial Navigation" by J. E. Bortz, NASA Technical Report R-329, Mar. 1970) and will therefore not be recounted in detail here. Suffice it to say that within the processor 173 the signals from the boresight or radial accelerometer 171 and the accelerometers (not shown) within the IMU are rotated, via a direction cosine matrix, into local vertical coordinates and integrated to obtain horizontal velocity signals. High frequency changes in he direction cosine matrix are provided within the processor 173 by means of the input signals from the three orthogonal rate gyros which sense the angular motion of the antenna axes. The horizontal velocity signals are corrected for errors due to the displacement vector changes between the antenna 14 and the inertial platform 38 by being modified in a so-called "lever arm correction process" by the output signals from three rate gyros (not shown) within the boresight sensor assembly 36 which is disposed on the antenna bulkhead (not shown). The actual lever arm corrections are performed within the digital data processor 30 (FIG. 1). The thus corrected velocity signals from the digital data processor 30 are passed to a microcomputer (not shown) associated with the inertial platform 38 wherein they are compared, in a Kalman filter process, with the horizontal velocity outputs obtained from the inertial platform 38. The difference in the velocities as determined by the inertial platform 38 and the processor 173 are due to vertical and azimuth errors in the direction cosine matrix as well as errors in the accelerometer and gyro input signals to the processor 173. The Kalman filter process estimates the errors of the processor 173 and supplies these estimates to the latter as correction signals.

Antenna Phase Center Motion Compensation (FIG. 8B)

Completing the contemplated motion compensation system are a plurality of piezoelectric accelerometers (not shown, but which are here Model 606 devices from Columbia Research Laboratory, Woodlin, Pa.) which are provided to compensate for the effects of aircraft-induced vibrations on the antenna 14. Thus, although the signals out of the line-of-sight sensor assembly (not numbered) may be used to compensate for the effects of translational vibration, such signals are not useful in compensation for rotational or differential (between quadrants) vibrations. Compensation for the effects of differential antenna vibration is especially important in the ground moving target identification mode wherein vibration-induced sidebands can appear as moving targets and thus seriously affect the reliability of the moving target detection process. In such a mode the differential vibration of the antenna 14 will phase modulate the radar return signals and cause sidebands (or false targets) to appear, thereby resulting in ambiguous Doppler angle measurements. Further, in the target tracking mode specular sidebands can appear in the Doppler cell of a target being tracked, thereby producing significant angle tracking errors. In addition, in the target tracking mode the degree of clutter cancellation between the antenna phase centers is directly affected by differential vibratory motion which places an upper limit on the cancellation obtainable, thereby also degrading angle tracking performance.

As was mentioned above, the phase centers of the antenna 14 are displaced with respect to each other and can rotate about axes in the plane of the antenna 14 passing through its geometric center. If the vibration-induced phase center displacements are not symmetric for corresponding phase centers, the sum (Σ) and and difference (Δ) signals derived will contain uncompensated vibratory phase modulation even though a radial accelerometer has been provided to compensate for the pure translatory motion.

Piezoelectric accelerometers (not shown) are used to measure aircraft-induced vibrations of the antenna 14. A total of five such devices are provided, one at each of the four antenna phase centers and a fifth located at the center of the antenna 14. The radial accelerometer 171 is disposed adjacent to the piezoelectric accelerometer (not shown) located at the center of the antenna 14. It should be noted here that the radial accelerometer 171 serves as a reference for the piezoelectric accelerometers (not shown) which differ from conventional accelerometers in that their frequency range is from 2 Hz to 40 KHz.

It should now be appreciated that since the piezoelectric accelerometers (not shown) are high frequency devices, they do not measure the low frequency (linear or rotational) components of the inertial accelerations at the antenna phase centers and the geometric center of the antenna 14. It can therefore be shown that, assuming a linear chirp waveform is transmitted, the compensation signal for a given subaperture phase center would be of the form $$VMC_i = (e^{j2\pi y_i/\lambda})/\left(\sum_{i=1}^{4} e^{-\frac{j2\pi y_i}{\lambda}}\right) \quad \text{Eq. (3)}$$

where $y_i$ is the differential displacement estimate, which is given by $$y_i = \int_O^T \int_O^T (P_{im} - P_{am}) \, dt^2 \quad \text{Eq. (4)}$$

The $P_{im}$ term in equation (4) corresponds to the piezoelectric accelerometer signal from each phase center and the $P_{am}$ term is the signal from the piezoelectric accelerometer disposed at the center of the antenna 14. Thus, the signals from the piezoelectric accelerometers (not shown) disposed at the antenna phase centers are differenced with that from the piezoelectric accelerometer disposed at the geometric center of the antenna 14, and the resultant signal is integrated, in analog fashion, over the coherent integration time, T. It should be noted here in passing that the requisite integration is performed in the I.F. receiver 20 (FIG. 6) wherein compensation signals are developed to control phase shifters in respective channels of such receiver. It should also be noted here that the actual displacements given by equation (4) are formulated each PRI. These displacement values are subsequently modified by four different constants, corresponding to wavelength values for each of the four frequencies utilized during a given dwell, to develop the control signals for the phase shifters 351L, 351U (FIG. 6).

RADAR SYNCHRONIZER (FIGS. 9A-9F)

Before proceeding with a detailed description of the radar synchronizer 34 (FIG. 1), a brief discussion of its function and design requirements is in order. Thus, referring briefly back now to FIG. 1, the primary function of the synchronizer 34 is real time control of the radar system 10. As such, data and control commands from the digital data processor 30 (FIG. 1) in the form of digital words rae interpreted by the synchronizer 34 and translated into timing and control signals for operating such units as the I.F. receiver 20 (FIG. 1) and the exciter 32 (FIG. 1). Among the key timing functions provided by the synchronizer 34 are waveform gate generation for the exciter 32, analog-to-digital (A/D) sampling strobes for the I.F receiver 20 and mode control switching for the power distribution network 16.

Another function of the synchronizer 34 is high speed calculation. That is to say, the radar system timing depends upon controlling the pulse repetition interval of the radar system 10 in order to maintain equal angular increments between the pulse transmission paths to the map reference point as the aircraft 302 (FIG. 10) flies along during a mapping action thereby to provide the optimum focal width for the generated maps, as will be explained in greater detail hereinbelow. Suffice it to say here that the foregoing angle equality must be maintained in the presence of aircraft acceleration of up to 4 g's in magnitude in any direction and requires that the instantaneous range to the map reference point or target be known. Range and range rate are supplied to the synchronizer 34 by the signal processor 26 (FIG. 1) every 7.7 m sec. However, a range integration at a rate much higher than the digital data processor update rate is required for smooth interpolation within the synchronizer 34. The PRI variation computations also require cross-acceleration data which is provided by the strapdown processor 173 (FIG. 7C) from cross-acceleration measurements made at the antenna 14, as was explained hereinabove.

Within the synchronizer 34 the time spent performing calculations as well as the basic timing resolution and accuracy are determined by the requisite map resolution and tracking accuracy. Thus, for example, in the short pulse tracking mode the quantization noise is specified to be consistent with a 66 dB receiver dynamic range. In consequence, then, the A/D strobes sent by the synchronizer 34 to the signal processor 26 (FIG. 1) must be positioned consistently, with no more than thirteen picoseconds (ps) root means square (rms) jitter with respect to the transmitted waveform, to achieve this dynamic range.

The actual timing of the A/D strobes for the signal processor 26 is dependent on the range to the target or map reference point. The foregoing jitter constraint imposes a parallel requirement on how often the range word must be updated, for the reason that smooth transitions should occur in the range word to achieve stable mapping and tracking. The requisite range granularity considered together with the maximum specified aircraft velocities here define an update rate of at least 40 KHz for the range word.

As mentioned hereinabove, the digital data processor 30 (FIG. 1) calculates and delivers to the synchronizer 34 the range, $R_o$, and range rate, $\dot{R}_o$, every 7.7 msec. The necessity for instantaneous range every 25 μs means that a range calculation must be made within the synchronizer 34 at a 40 KHz rate. The range calculation is defined by the following equation:

$$R_{EST} = R_O + \sum_{i=o}^{n} \dot{R}_O \Delta t + \frac{1}{2} \sum_{i=o}^{n} \ddot{R}_O \Delta t^2 \quad \text{Eq. (5)}$$

where $R_{EST}$ is the instantaneous estimated range;

$R_o$ is the range calculated in the digital data processor 30 (FIG. 1);

$\dot{R}_o$ is the range rate calculated in the digital data processor 30 (FIG. 1);

$\ddot{R}_o$ is the radial acceleration calculated in the strapdown processor 173 (FIG. 7C); and $\Delta t$ equals 25 microseconds.

The range calculation is reset and restarted in synchronism with the radar dwell rate timing as soon after a signal processor update as possible.

The other major computational requirement is PRI variation. The PRI control processing within the synchronizer 34 will be described in detail hereinbelow. Suffice it to say here that the basic or minimum PRI is set by the digital data processor 30 (FIG. 1) for each dwell or group of dwells by sending a distance increment, $\Delta d$, to the synchronizer 34 at a 128 Hz rate. Every 25 μs the strapdown processor 173 (FIG. 7C) sends to the synchronizer 34 a velocity word based on accelerometer measurements. The synchronizer must predict the next velocity using a GH fading memory predictive filter and interpolate "instantaneous" velocities in real time. The rapidly updated (100 KHz) velocity is integrated by the synchronizer 34 at a 100 KHz rate to develop a travel word, $X_{\perp M}$. During a dwell, an accumulating sum of $\Delta d$'s (i.e. the desired amount of travel, $X_{\perp D}$) is compared to $X_{\perp M}$. When $X_{\perp M}$ equals $X_{\perp D}$, a PRI timing sequence is initiated. At the same time, another $\Delta d$ is added to the previously accumulated $X_{\perp D}$. The process repeats when $X_{\perp M}$ reaches the new $X_{\perp D}$.

The expression for $X_{\perp M}$ is given by:

$$X_{\perp M} = V\sin B_0(t - t_o) + \int_{t_o}^{T}\int (a_{H\perp} + (V^2\sin 2B_0\cos C_0/R_0))dt dt \quad \text{Eq. (6)}$$

It should now be appreciated that the terms on the right hand side of Eq. (6) are the "MOTION COMPENSATION" signals of FIG. 7C. The synchronizer 34 then is operative to compare $X_{\perp M}$ and $X_{\perp D}$ every 10 microseconds and to command a pulse to be transmitted whenever equality occurs. Sufficient accuracy in PRI variation is achieved if $X_{\perp M}$ is calculated at a 100 KHz rate. After each calculation $X_{\perp M}$ is compared to $X_{\perp D}$ to determine if the quantities are equal. A time granularity of 10 μs is adequate for satisfaction of the clutter nulling requirement.

Figure 12A:
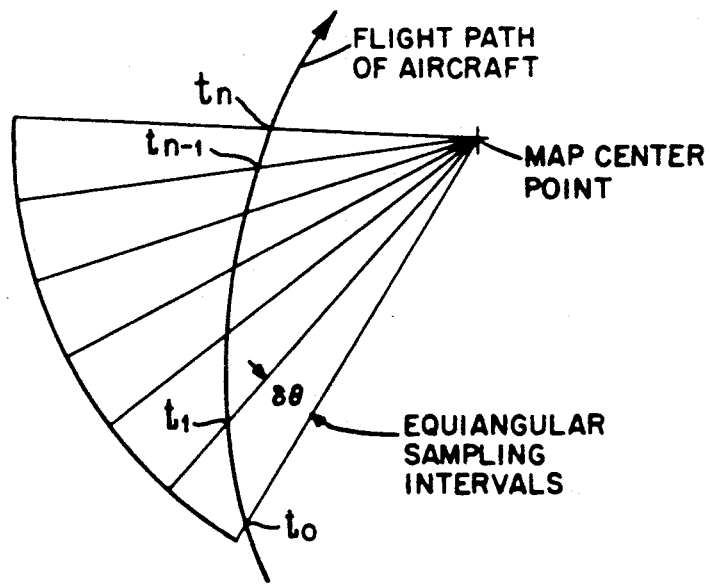
FIGS. 12A and 12B are sketches showing how the flight path of an aircraft and the pulse repetition interval are contemplated to be controlled during the navigation mode.
Figure 12B:
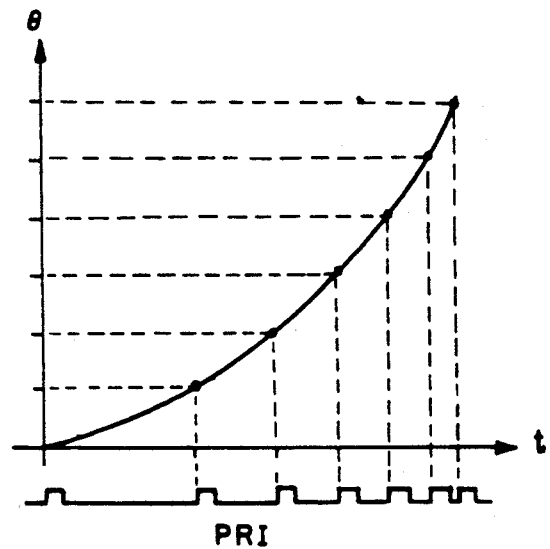

Digressing briefly here now for a moment and referring to FIGS. 12A and 12B, the effect of PRI control is illustrated. Thus, during a given mapping interval starting at time $t_o$ and proceeding to time $t_n$, the flight path of the aircraft 302 (FIG. 7A) is shown to gradually approach the map center point, O. It is apparent that between pulse transmission times $t_o$ and $t_l$ the aircraft 302 (FIG. 10) must traverse a greater distance than that required between pulse transmission times $t_{n-1}$ and $t_n$. It should also be apparent that the angular increment, $\delta\theta$, swept out between pulse transmission times $t_o$ and $t_l$, is identical to that swept out between times $t_{n-1}$ and $t_n$. Thus, it can be seen that the effect of PRI control is to insure that, despite the motion of the aircraft 302 (FIG. 10) equal angle increments are swept out between the pulse transmission times. For the flight path illustrated the PRI will decrease exponentially during the dwell period.

As mentioned above, a PRI variation is needed to attain a satisfactory width of a generated map when the aircraft 302 is maneuvered during a dwell. A greater depth-of-focus of a generated map is realized by varying the A/D strobe frequency slightly during each dwell as a function of change in the depression angle, $C_o$ (FIG. 7A). As the A/D strobe frequency need only be changed at relatively infrequent intervals, the 128 Hz update rate of the synchronizer 34 by the digital data processor 30 is adequate for satisfactory depth-of-focus and there is therefore no requirement for real-time calculation in the synchronizer 34 to perform this function.

Figure 9A:
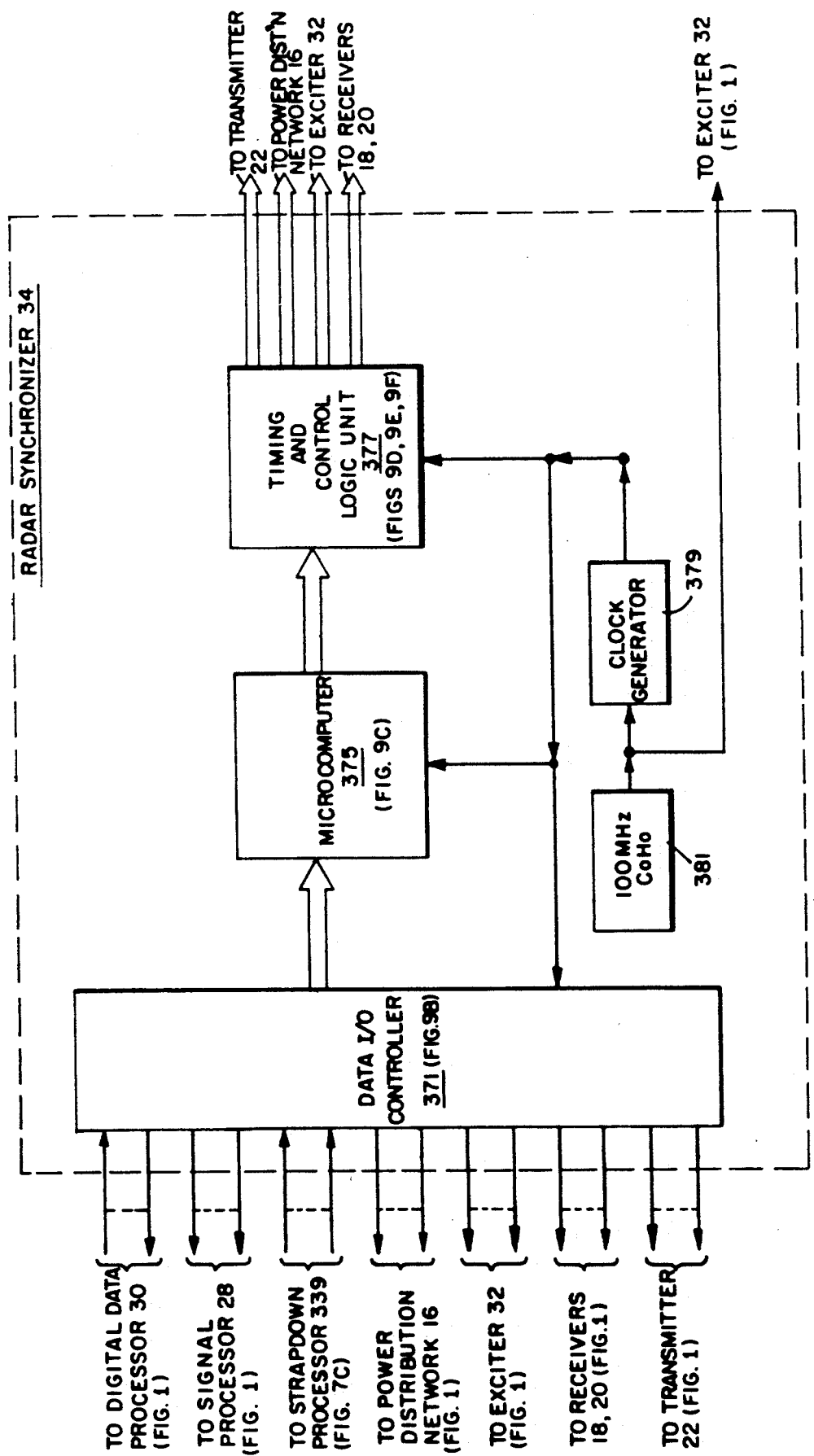
FIG. 9A is a block diagram of the radar synchronizer of FIG. 1.

Referring briefly now to both FIGS. 1 and 9A, the radar synchronizer 34 is shown to include a data input/output (I/O) controller 371, a microcomputer 375, a timing and control logic unit 377, a clock generator 379, and a 100 MHz coherent oscillator (COHO) 381. The design of the radar synchronizer 34 is driven by the requirement to communicate with several subsystems other than the digital data processor 30. Thus, for example, the digital data processor 30 sends, either at a 128 Hz rate or once per radar dwell, approximately 256 digital words (in 16 bit serial form) to the radar synchronizer 34 and the strapdown processor 173 (FIG. 7C) delivers a digital word (18 bits) every 25 μs. Further, before every dwell the radar synchronizer 34 must reprogram the exciter 32 (FIG. 1) with a 96-bit serial word, and the transmitter 22 requires an 8-bit word for power level control. Still further, before every PRI the signal processor 26 requires a PRI normalization factor which is the length of the previous PRI. The data links which are provided by the data I/O controller 371 are, therefore, data outputs to the exciter 32, the transmitter 22, the R.F. receiver 18, the I.F. receiver 20 and the power distribution network 16 and a data input from the strapdown processor 173 (FIG. 7C) and a bi-directional data link to the digital data processor 30 and the signal processor 26.

Referring now to FIG. 9B, the data I/O controller 371 is shown to include a data I/O module 373, a microprocessor 383 and a shared memory module 385. The data I/O module 373, which here may be comprised of a plurality of shift registers (not shown), provides the interface between the radar synchronizer 34 and the other major systems of the radar system 10 (FIG. 1). An exemplary data interface, here that with the digital data processor 30 (FIG. 1), is shown to include both data input and output lines. The data output lines include a request output (REQO) line, a data output (DATO) line, a clock output (CLKO) line, and an acknowledge (ACKO) line. The data input lines include a request input (REQI) line, a data input (DATI) line, a clock input (CLKI) line and an acknowledge (ACKI) line. A data output transfer from the data I/O module 373 is initiated by changing the REQO line from a logic 0 level to a logic 1 level. If the digital data processor 30 is ready to accept data the ACKI line is switched from a logic 0 to a logic 1 level. The data I/O controller 371 then gates ON (changes to a logic 1 level) the CLKO line and outputs, synchronously with the clock signals, a stream of data over the DATO line. The falling edge of the first clock pulse causes the digital data processor 30 to reset its ACKI output signal back to a logic 0 level. Data transfer form the digital data processor 30 to the data I/O module 373 is similarly accomplished with the digital data processor 30 initiating the REQ signals for data input and output transfers.

Within the radar synchronizer 34 all the high speed time-critical computations are performed within the microcomputer 375. The data I/O controller 371 acts as a buffer between the microcomputer 375 and the various subsystems of the radar system 10 (FIG. 1) to prevent interrupts of such microcomputer when data transfers are required. Such buffering is necessary because the microcomputer 375 may have to perform several concurrent calculations at both a 40 KHz and 100 KHz rate, with consistency in the timing of such calculations determining the accuracy of both the PRI variation and the A/D strobe frequency for the IF receiver 20 (FIG 1). It follows, then, that interrupts to the microcomputer 375 are inconsistent with the task of timing the PRI. Backing up incoming data from the digital data processor 30 (FIG. 1) in first-in, first-out memory and sampling it on a polled basis is feasible only for small amounts of data. The only architecture general enough to handle the requisite data transfers is one that features an intelligent data controller. Thus, the data I/O controller 371, although it is a peripheral of the microcomputer 375, contains local intelligence provided by the microprocessor 383, which is here a 2900 Series microprocessor from Advanced Micro Devices, Inc. Sunnyvale, Calif., 94086. The microprocessor 383 peels off synchronizer control words from the data stream provided by the digital data processor 30 (FIG. 1) and places them, together with an updated status word, in a small scratch-pad memory compartment of the shared memory module 385. The microcomputer 375 thus has a small group of data words to process and is protected from the necessity of directly servicing the radar subsystems.

The data I/O controller 371 is able to respond to data transfer request on an interrupt basis without affecting radar timing since it processes data in parallel. At initialization of the radar system 10 (FIG. 1), the data I/O controller 371 takes priority over the microcomputer 375 by halting the latter and performing direct memory address (DMA) data transfers into the shared memory module 385 and the control memory module 387 within the microcomputer 375.

The shared memory module 385 comprises a direct memory address (DMA) logic section (not shown) and a dual port random access memory (RAM) (also not shown) which is shared by the microcomputer 375 and the microprocessor 383. The dual port RAM serves as a macroprogram memory for the microcomputer 375 and, in addition, stores: (a) mode data for the timing and control unit 377 (FIG. 9A); and (b) numerical data for the microcomputer 375 and the timing and control logic unit 377 (FIG. 9A). It should be noted here that all the data transfers within the radar synchronizer 34 are accomplished by data busses (not numbered) comprising exposed registers (exposed register module 395), which will be described in detail hereinbelow.

It should be recalled here that all of the high speed, time-critical algorithms (as, for example, the PRI variation computations) are performed within the microcomputer 375. The update rate and the precision required for these calculations as well as the desire to avoid utilizing double precision arithmetic lead to the choice of a 24-bit bipolar bit-slice implementation for the microcomputer 375. The bit-slice family chosen for implementing the latter is the 2900 series available from Advanced Micro Devices (AMD). Thus, the sequencer 389 is here a 2910 series microprogram controller and the arithmetic logic unit (ALU) module 391 is comprised of six 4-bit 2903 microprocessor slices to achieve the requisite 24-bit machine width. It should be noted here that each of such slices includes sixteen randomly accessible dual-port general purpose internal registers with the necessary "hooks" to expand the register file by combining external (off-chip) and internal registers. The multiplier module 393 is here comprised of a plurality of MPY24HJM multipliers from the LSI Products Div. of TRW, Redondo Beach, Calif. and the memory module 397 is here a random access memory because of the versatility of such a device.

Completing the microcomputer 375 is an exposed register module 395 which handles all the data transfers form the microcomputer 375 to the data I/O controller 371 and the timing and control logic unit 377. Such unit is implemented using emitter-coupled logic (ECL) and, therefore, a TTL/ECL interface exists between the microcomputer 375 and the timing and control logic unit 377 (FIG. 9A). Because the length of each PRI must be controlled to within 10 $\mu$s, a very high premium is put on the rapid execution of the PRI algorithm within the microcomputer 375. Part of that execution time is expended in outputting the PRI start command to the timing and control logic unit 377 (FIG. 9A). Performing input/output I/O instructions with any conventional parallel output technique is too wasteful of the very limited execution time available to the microcomputer 375 within a PRI. The exposed register module 395 solves the data transfers problem by taking advantage of the register expansion capability within the ALU module 391. Thus, it should be recalled that each 2903 chip in the ALU module 391 contains sixteen general purpose internal registers as well as "hooks" permitting the connection of additional off-chip registers. A plurality of such off-chip registers (not shown) which are assigned dedicated functions are provided in the exposed register module 395. These off-chip registers are controlled in the same fashion as the on-chip registers, and TTL to ECL level shifters (also not shown) present the contents of these off-chip registers directly and in parallel to the ECL timing logic within the timing and control logic unit 377 (FIG. 9A). Thus, programming the ECL logic from the exposed register module 395 requires no processing time overhead specifically for output operations. That is to say, as soon as a control word is calculated in the microcomputer 375, control of the ECL logic within the timing and control unit 377 (FIG. 9A) takes effect because the result of each calculation always resides in the dedicated exposed register (not shown) within the exposed register module 395. Eight control words, some of which change four to six times per PRI, are handled in this fashion thereby saving significant amounts of processing time during each PRI.

Before proceeding with a detailed description of the timing and control logic unit 377 it should be noted here that the timing of the radar system 10 (FIG. 1) is performed in two different sections of the synchronizer 34. Thus, PRI variation and scheduling is performed within the microcomputer 375, while the timing within a PRI is determined by ECL logic within the timing and control logic unit 377 which is controlled by, but is much faster than, the microcomputer 375. It should also be noted that the logic circuitry within the timing and control logic unit 377 is divided into two halves corresponding, respectively, to transmit and receive mode timing. The transmit and receive mode circuitry are similar, differing only in that the receive mode circuitry does not include either a phase lock loop module or a range counter module because the receive mode clock is here generated in the phase lock loop module 401

(FIG 9E). Thus, for the sake of drawing clarity, only that portion of the circuitry corresponding to the transmit mode timing will be shown and described in detail.

Figure 9D:
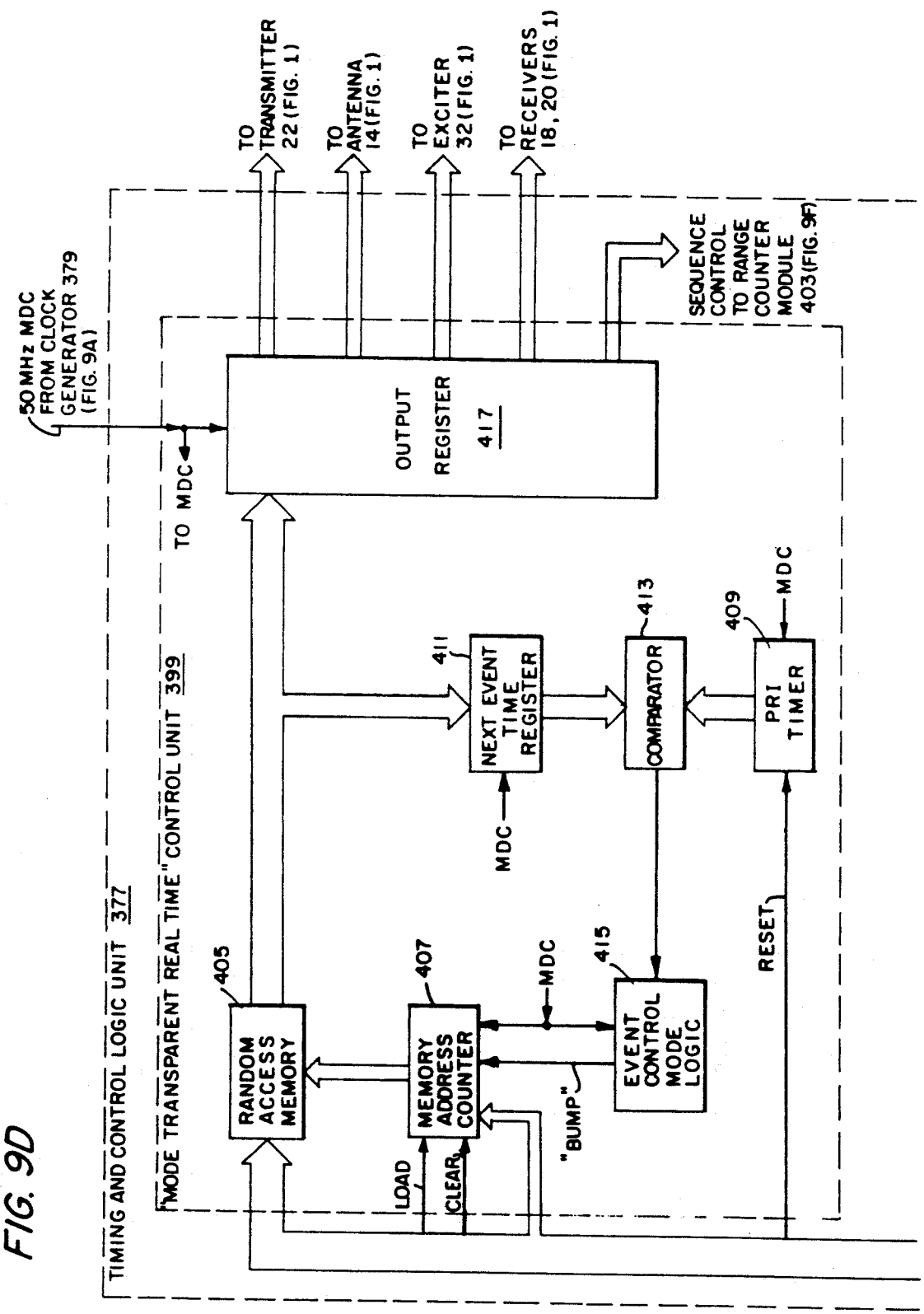
Figure 9F:
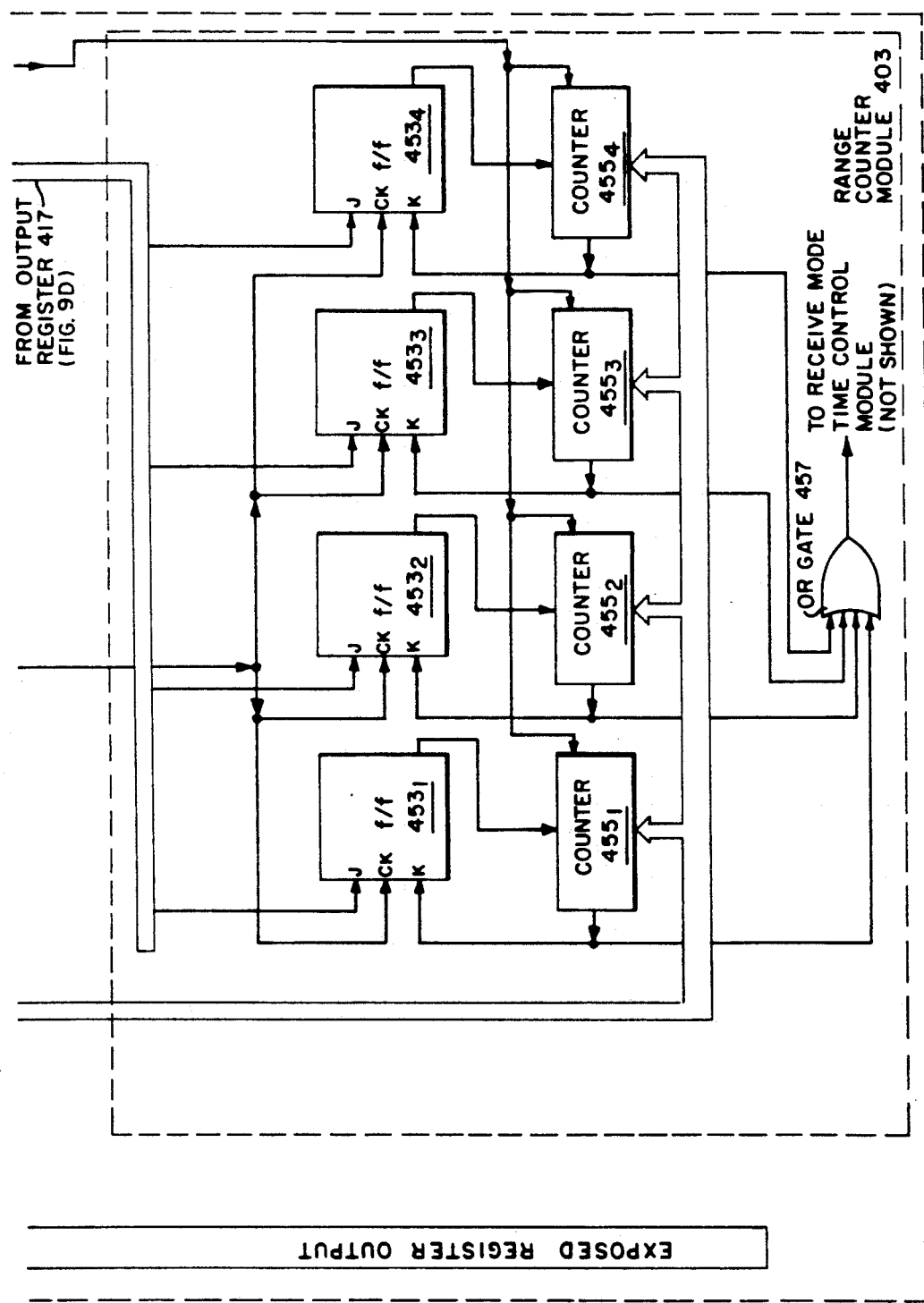

Referring now to FIGS. 9D to 9F, the transmit mode timing logic within the timing and control logic unit 377 is shown to include a "mode transparent, real time" control module 399, a phase lock loop module 401, and a range counter module 403, all of which receive control signals from the microcomputer 375 via exposed registers (not shown) within either the exposed register module 395 (FIG. 9C) or the multiplier module 393 (FIG. 9C). The basic clock for the transmit mode timing is the 50 MHz master digital clock (MDC) which is obtained from the clock generator 379 (FIG. 9A), and which is developed within the latter by dividing down the 100 MHz signal received from the 100 MHz COHO 381 (FIG. 9A).

The mode transparent real time control module 399 is required to generate, within a given PRI, control signals for the various radar subsystems as, for example, spoof frequency control signals for the exciter 32 (FIG. 1), power level control signals for the transmitter 22 (FIG. 1), and receiver gain levels for the R.F. receiver 18 (FIG. 1). Prior to the start of a given radar dwell (which could total 1,000 PRI's) the microcomputer 375 (FIG. 9C) clears the memory address counter 407 and then loads that counter (and the random access memory (RAM) 405) with real-time control states interleaved with state-change times. At the start of each PRI, the microcomputer 375 (FIG. 9C) resets a PRI timer 409, which is here a sixteen bit counter, with a word corresponding to the length of the desired PRI, which could range from 100 $\mu$s to 1.3 ms. The memory address counter 407 and the PRI timer 409 are then synchronously clocked by the 50 MHz MDC. The memory address counter 407 addresses the first event time stored in the RAM 405 (expressed as a sixteen bit binary number), which event is then clocked into a next event time register 411. A comparator 413 detects when the PRI timer 409 reaches such number stored in the next event time register 411. When such detection occurs, the comparator 413 provides a control signal to an event control mode logic unit 415, which is here of conventional design, and which, in turn, causes the memory address counter 407 to be bumped twice, once to clock a control word from the RAM 405 to an output register 417 and a second time to clock a new event time word into the next event time register 411. It should be noted here that as only changes of state (pulse edge scheduled times) are stored in the RAM 405, each data line leaving the output register 417 is a discrete control line.

Before proceeding with a detailed description of the phase lock loop module 401, the rationale for providing such a unit will be described. Thus, in order for the radar system 10 (FIG. 1) to reliably track a target with the precision desired here, a time resolution of 140 ps in 266 $\mu$s is required. Further, in the short pulse tracking mode the quantization noise is here specified to be consistent with a 66 dB dynamic range of a receiver. The A/D strobes sent by the synchronizer 34 (FIG. 1) to the I.F. receiver 20 (FIG. 1) must, therefore, be positioned consistently with no more than 13 ps RMS jitter (with respect to the transmitted waveform) to achieve such a dynamic range. The timing of the A/D strobes for the I.F. receiver 20 (FIG. 1) depends on the range to the target or map reference. The range and therefore the time resolution (140 ps) required relative to the maximum specified system range dictate that the range be known to eighteen binary places. The jitter requirement adds three more least significant bits (LSB's), bringing the total number of bits needed up to 21. Another result of the jitter constraint is a parallel requirement on how often the range word must be updated within the microcomputer 375 (FIG. 9C). Finally, from update to update smooth LSB transitions should occur in the range word to accomplish mapping and tracking without danger of the occurrence of excessively large transients.

The foregoing considerations dictated the requirement that the transmit-to-receive time interval be timed with 13 ps quantization and 39 ps resolution. The direct digital implementation of a range counter having 39 ps time increments requires a 25.6 GHz clock frequency. Because no commercially available logic family supports clock frequencies of that order of magnitude, a mixed analog and digital approach is used here to achieve the desired time resolution.

Thus, it will be appreciated by those of skill in the art that, in general, by introducing an analog offset voltage into the control loop of a phase-locked voltage-controlled oscillator (VCO), the phase of the VCO can be moved away from that of the phase detector reference frequency in a very controlled manner. Very precise departures in phase can be achieved by using an accurate digital-to-analog (D/A) converter to generate the analog offset voltage. Thus, if the phase of a VCO were to be locked to the 50 MHz MDC, which, as explained, controls the transmit mode timing, the phase of such VCO could be controlled over a 0 to $2\pi$ radian phase shift interval (corresponding to a 0 to 20 ns time interval). In consequence, then, a very fine time resolution can be achieved using a nine bit D/A converter to attain phase adjustments in 0.70° increments (or 39 ps time increments). If a twelve bit D/A is utilized with the 3 LSB's grounded, time uncertainty (or jitter) is controlled down to less than 5 ps, thereby satisfying the 13 ps jitter specification mentioned hereinabove.

It should now be appreciated that the phase-lock loop module 401 may be provided to develop clock signals for receive mode timing. Thus, such module is shown to include a first and second phase-lock loop (not numbered) which develop, respectively, a phase slipped clock (PSC) signal and a frequency slipped clock (FSC) signal. The PSC is used within the range counter module 403 (FIG. 9F) for the receive mode timing, while the FSC signal is used to provide the requisite A/D strobe frequency variation which, as mentioned hereinabove, is required to control the depth-of-focus of the generated maps. The first phase lock loop (not numbered) comprises a digital phase detector 419, the reference signal to which is the 50 MHz MDC, a loop control amplifier 421, which here may be an operational amplifier, a loop filter 423 and a voltage-controlled crystal oscillator VCXO 425. A second control signal is applied to the loop control amplifier 421, via a range register 427 (a 24 bit device) and a converter 429 (a 12 bit device with the three least significant bits grounded). The range register 427 is, at the start of a given dwell, loaded with a 24 bit estimated range word, $R_{EST}$ (which is also a measure of the transmit-to-receive timing) and updated by the microcomputer 375 (FIG. 9C) at a 40 KHz rate. The nine LSB's of the estimated range word, $R_{EST}$, from the range register 427 are translated to an analog voltage with 12 bit accuracy by the D/A 429 wherein the 3 LSB's are grounded. Thus, nine LSB's of the estimated range word, $R_{EST}$, are used to develop the PSC for the receive mode timing. The thus described phase lock loop (not numbered) is effective to divide one 20 ns 50 MHz clock cycle into 512 parts, each of 39 ps duration. The nine LSB's of the estimated range word, $R_{EST}$, set a phase delay for the PSC in terms of these 39 ps time units.

A practical problem arises when very little phase difference exists between the master digital clock (MDC) and the phase slipped clock (PSC). In this event, the range counter module 403 (FIG. 9F) could be enabled just before the rising edge of the PSC. The requisite setup time for the range counter module 403 would not be met in this instance. This problem is dealt with through the use of a comparator 439 to detect marginal timing situations in the range word, $R_{EST}$. The output of the comparator 439 is combined in an exclusive OR gate 441 with the 50 MHz MDC signal. Reference numbers, corresponding to the ranges occurring 5 ns before and after $R_{EST}$ are stored in the comparator 439. When the nine LSB's of the range word, $R_{EST}$, from the range register 427 fall between these reference numbers the comparator 439 causes the phase of the 50 MHz MDC out of the exclusive OR gate 441 to be inverted. Such reversal, as will be explained in detail hereinbelow, ensures that the range counters within the range counter module 403 (FIG. 9F) are enabled well in advance of the first PSC signal to which they must respond.

As mentioned hereinabove, an A/D strobe frequency variation must be included to provide for the depth of focus of the generated maps. This A/D strobe frequency control is provided by means of the second phase lock loop (not numbered), which here comprises a phase comparator 431, the reference signal to which is the PSC signal, a loop control amplifier 433, which may be an operational amplifier used as a summing amplifier, a loop filter 435 and a VCXO 437. The output signal from the phase lock loop (not numbered) is the frequency slipped clock (FSC) signal which is passed ultimately to the I.F. receiver 20 (FIG. 1). The loop control amplifier 433 is shown to receive a pair of control signals, a first one of which is received from a phase register 443 (12 bits) via a D/A 445, (12 bits with the 3 LSB's grounded). The second control signal to the loop control amplifier 433 is received from a range register 447 (12 bits), via a D/A 449 (12 bits with the 3 LSB's grounded), and an integrator 451, comprising a switch S1, a capacitor C1 and an amplifier A1. The microcomputer 375 (FIG. 9C) provides the phase register 443 with a phase offset word and the range register 447 with a range offset word. The phase offset word and the range offset words are effective to produce the FSC having a phase ramp (frequency offset) with both an adjustable starting phase and phase slope which are dependent on measured, real-time motion compensation parameters provided to the microcomputer 375 (FIG. 9C). It should now be appreciated by those of skill in the art that the FSC signal is a coherent transform of the PSC signal and that the starting phase and phase slope of the FSC signal are real time functions of aircraft motion. Finally, it should be noted that the integrator enable signal to the integrator 451 is provided a signal from the timing and control logic unit for the receiver (which unit has not been illustrated but is, as noted above, similar to the timing and control logic unit being discussed).

Referring now to FIG. 9F, the range counter module 403 is shown to include four J-K flip-flops (f/f) $453_1$, $453_2$, $453_3$ and $453_4$, each of which controls a corresponding counter $455_1$, $455_2$, $455_3$ and $455_4$ to make up four counter paris (not numbered). it should be noted here that four counter pairs are required to control the four transmitted frequencies and that a different number of such pairs would be used if the number of possible transmitted frequencies were changed. The R.F. receiver 18 (FIG. 1) and the I.F. receiver 20 (FIG. 1) are activated and strobed by the synchronizer 34 (FIG. 1) to pass the desired return signal from any transmitted pulse, even though such signal could occur at any time (even after the transmission of a third transmitted pulse). The requisite range timing and gating must be done concurrently for all four pulses because of the interleaved nature of system timing and, therefore, four independent range counters are required. Thus, the flip-flops $453_1 \ldots 453_4$ are shown to be clocked by the 50 MHz noncoincidence MDC obtained from the exclusive OR gate 441 within the phase lock loop module 401, while the counters $455_1 \ldots 455_4$, which are all sixteen bit devices, are clocked by the 50 MHz PSC. The data input to the J data terminals of each of the flip-flops $453_1 \ldots 453_4$ are provided by the transmit sequence control lines (not numbered) from the output register 417 within the mode transparent real time control module 399 (FIG. 9D).

The J data terminals of the flip-flops $453_1 \ldots 453_4$, in conjunction with the Q output terminals, provide enabling signals to the counters $455_1 \ldots 455_4$. The latter receive via an exposed register bus (not numbered) the fifteen MSB's of the range word, $R_{EST}$, from the range register 427. Once enabled, each of the counters $455_1 \ldots 455_4$ begin to count the range word, $R_{EST}$, and upon completion of the count, each provides an output signal at the logic 1 level. The output signals from the counters $455_1 \ldots 455_4$ are provided as input signals to the K data terminals of their respective flip-flops. It will be appreciated by those of skill in the art that when both the J and K terminals of the flip-flops $455_1 \ldots 455_4$ are at the logic 1 level and a clock pulse is received, the Q output will change state. Advantage is taken of this property of the flip-flops $453_1 \ldots 453_4$ to provide enabling or disabling signals to the counters $455_1 \ldots 455_4$.

Synchronously with the terminal count word provided to the flip-flops $453_1 \ldots 453_4$, receive sequence start signals are sent, via an OR gate 457, to the "receive" mode, real time control module (not shown, but corresponding to that shown in FIG. 9D) to initiate the receive mode timing.

At this point in time a brief review of the PRI timing is in order. The PRI is a cycle of four transmitted active pulses, each at a different frequency. Preceding the transmission of each active pulse is a panoramic analysis receive period and an additional transmitted pulse (spoof frequency). The spoof frequency pulses have unique frequencies different from that of the active pulse frequencies. The active pulses could be either uncoded, frequency ramped, or phase coded. The timing of the just described features (i.e., the panoramic analysis, the spoof frequency transmissions and the active pulses) is synchronized to the 50 MHz MDC.

Navigation and Position Update Modes (FIG. 10)

Before proceeding with a detailed description of the various operating modes of the radar system 10 (FIG. 1) together with the associated signal flow diagrams through the signal processor 26 (FIG. 1) and the digital data processor 30 (FIG. 1), it will be beneficial at this point to remember that, in addition to being used for weapon guidance, that radar must also be used to solve the navigational problem involved. Part of such problem is that of navigating the aircraft 302 (FIG. 10) to a position in space, relative to the target area, with sufficient accuracy (both in position and velocity) to make weapon delivery possible. The problem is compounded by the fact that the aircraft 302 (FIG. 10) must operate in a tactical environment, meaning that it will be exposed to a hostile ECM environment, adverse weather conditions and interdicting fire.

It will be recalled that the aircraft 302 (FIG. 10) is equipped with an inertial platform 38 (FIG. 1) which is utilized, inter alia, for navigation of the aircraft 302 (FIG. 10). Because the inertial platform 38 (FIG. 1) is subject to long term drift errors which effect the navigational accuracy, it is periodically updated with radar derived velocity and position data. The aircraft 302 (FIG. 10), in the navigation mode, may be operating at an altitude of from 500 to 30,000 feet which imposes a rather severe dynamic range requirement, as will be explained in detail hereinbelow. To minimize the risk of detection, the radar system 10 (FIG. 1) will be operated only periodically and then for the minimum amount of time. Furthermore, while penetrating enemy territory the aircraft 302 will operate at the minimum altitude and will rise (pop up) to a high altitude only when required. In consequence, then, the system of synthetic aperture measurements taken for position and velocity updates must reflect a great degree of invention to the effects of altitude.

As was explained hereinabove, synthetic aperture radar systems require precise measurements of antenna acceleration for motion compensation of the radar return signals. In order to satisfy operational requirements and mounting constraints within the aircraft 302 (FIG. 10), the antenna 14 (FIG. 1) and the inertial platform 38 (FIG. 1) are physically separated. This physical separation causes relative motion between the antenna 14 (FIG. 1) and the inertial platform 38 (FIG. 1) due both to aircraft maneuvers and to the flexure of the airframe. As was also explained hereinabove, the motion of the antenna 14 (FIG. 1) can be measured and therefore compensated by the high resolution inertial measuring unit 24 (FIG. 1), which is mounted in close proximity to the former. The long term alignment of the latter is maintained by slaving it to the inertial platform 38 (FIG. 1).

Referring briefly back now to FIGS. 1, 8A and 8B, the method of transfer alignment will be reviewed. Thus, the boresight sensor assembly 36, which comprises three orthogonal ate gyros (not shown), is mounted near the base of the antenna 14. The rate gyros (not shown) are aligned to the aircraft roll, pitch and yaw axes 211, 203, 201, respectively. The sensed angular rates of such gyros, together with the orientation and position of the antenna 14 relative to the inertial platform 38 (as measured by the IMU 24), are used to determine the north and east velocity differences between such antenna and platform during aircraft dynamic maneuvers. The IMU 24 is mounted on the elevation gimbal 223 (FIG. 8B) and comprises two accelerometers (not shown) and three orthogonal rate gyros (also not shown). The third accelerometer required to complete the IMU 24 triad is the radial accelerometer 171 which is mounted at the rear center of the antenna 14 (FIG. 1). The roll rate gyro (not shown) is aligned with the antenna line-of-sight (LOS) vector (not numbered), while the pitch rate gyro (not shown) and the Y-axis accelerometer (also not shown) and the Z-axis accelerometer (also not shown) are mounted orthogonal to the roll and pitch rate gyros (not shown). The rate gyro outputs and the accelerometer outputs from the IMU 24, as well as the accelerometer signal output from the radial accelerometer 171 (FIG. 8B) are passed to the strapdown processor 173 (FIG. 7C) wherein processing is carried out to generate earth-referenced (north, east and local vertical) mathematical gimbal axes as well as north and east velocities. Such velocities are compared within a Kalman filter (not shown but within the inertial platform 38) with inertial velocities obtained from the inertial platform 38 to determine both misalignment angles and sensor errors within the head mounted IMU 24. These errors are then used to correct the output signals from the head mounted IMU 24. Antenna axis accelerations are sent from the strapdown processor 173 to the digital data processor 30 for motion compensation purposes. This acceleration data corresponds to the output signals from the head mounted IMU 24 which have been gravity compensated as well as corrected for bias and scale factor errors.

Referring now to FIG. 10, the aircraft 302 is shown to be flying along a path such that its velocity vector, $\bar{V}$, is coincident with $Y_i$ axis of the aircraft inertial reference frame $X_i$, $Y_i$, $Z_i$. In the velocity update mode, the radar system 10 (FIG. 1) illuminates successive portions of the ground terrain (not shown) and processes the return data from at least three of such portions to derive the three components of aircraft velocity. The theory of operation of Doppler radar navigators is well known to those of skill in the art and will therefore not be recounted. Suffice it to say here that the radar system 10 (FIG. 1) may be thought of as transmitting a cone of constant Doppler frequency centered about the aircraft velocity vector, $\bar{V}$. The cone angle corresponds to the beam squint angle, A, which is the angle between the estimated position of the velocity vector, $\bar{V}$, and the antenna boresight axis 205 (FIG. 8B). The azimuth angle, B, is defined as the angle between the horizontal projections of the antenna boresight axis 205 and the velocity vector, $\bar{V}$. The elevation angle, C, is the angle of the antenna boresight axis 205 with respect to the horizontal ground terrain.

The intersection of a constant doppler cone (not shown) with a terrain produces a contour line of constant Doppler frequency referred to as an isodop 501, which is here in the form of a hyperbola when such terrain is horizontal. The particular shape of the isodop 501 is dependent on the squint angle, A, and the height of the aircraft 302 above the terrain. If, therefore, the altitude of the aircraft 302 and the beam squint angle, A, are held constant as the antenna 14 (FIG. 1) is moved from dwell to dwell, the antenna boresight axis 205 will be forced to travel along the isodop 501. It can be shown that the squint angle, A, the azimuth angle, B, and the elevation angle, C, are related as follows:

$$\cos A = \cos B \cos C \qquad \text{Eq. (7)}$$

Holding the squint angle, A, constant as the antenna 14 (FIG. 1) is scanned will therefore require changes in both the azimuth angle, B, and the elevation angle, C. As a given squint angle, A, and aircraft altitude will define a particular hyperbola, the requisite gimbal control commands to cause the antenna boresight axis 205 to follow the isodop 501 may be computed from an a priori knowledge of the equation of the hyperbola that corresponds to the isodop 501.

It should be recalled here that the widest possible focal width maps under the conditions of aircraft acceleration are obtained by controlling the PRI of the radar system 10 (FIG. 1). It can be shown, however, that the PRI is also dependent on the squint angle, A. That is, as the antenna 14 (FIG. 1) is squinted from broadside toward the nose of the aircraft 302, the range to the illuminated terrain continually increases. Thus, in order to avoid range ambiguity problems and to prevent pulse eclipsing, the PRF of the radar system 10 must decrease as the antenna 14 (FIG. 1) is squinted toward the nose of the aircraft 302. Decreasing the PRF will result in a concomitant increase in the PRI. The PRI control problem is further aggravated by the fact that the depth, width and height of focus of the illuminated terrain are all dependent on the cell resolution width, $\Delta a$, which, in turn, is dependent, inter alia, on the height of the aircraft 302 above the terrain.

Under PRI variation the depth, height and width of focus are given, respectively, by $$DOF = \frac{8/3 \ V^2 \sin^2 B_O (\Delta a)^2}{\lambda[|a_{ZI}|(R_O \sin 2C_O/2 + V^2 \cos C_O(\sin^2 A_O + 2\cos^2 B_O \sin^2 C_O)]} \quad \text{EQ (9)}$$

$$HOF = \frac{8/3 V^2 \sin^2 B_O (\Delta a)^2}{\lambda(|a_{ZI}|R_O + 2V^2 \sin C_O \cos^2 B_O)} \quad \text{EQ (10)}$$

$$WOF = \frac{8/3 V^2 \sin B_O (\Delta a)^2}{\left[\frac{\lambda}{2} \cos C_O a_{HR} + \frac{2V^2 \cos 2B_O \cos C_O}{R_O}\right]^{\frac{1}{2}}} \quad \text{EQ (11)}$$

where $\Delta a = (\lambda/2)(h/d)(n/N)(1/\sin C)$ and n = number of dwells.

Using the criteria given by the foregoing equations ensures that the azimuth cell resolution is sufficiently large for depth of focus to equal the transmitted beamwidth. Thus, as the antenna 14 (FIG. 1) is slued to successive points on the isodop 501, the number of pulses, N, for each successive dwell is computed from Equation (12).

$$N^2 \leq \left(\frac{h\lambda n^2 \left(1 - \frac{\sin^2 C_O}{\sin^2 A_O}\right)}{4(\cos^2 C_O)d^2(\Delta A_O)}\right) \Bigg/ \left[\frac{|a_{ZI}|h}{V^2 \sin^2 A_O} + 1 + \cos^2 A_O \tan^2 C_O\right] \quad \text{EQ (12)}$$

As was mentioned above, the radar system 10 (FIG. 1) is equipped with both an azimuth and elevation monopulse capability. Thus, range and range rate (Doppler) measurements can be associated with a specific direction in space. In order to use this capability to estimate the velocity of the aircraft 302 the estimate of aircraft velocity obtained from the inertial platform 38 (FIG. 1) is used to first estimate the component of velocity along the antenna boresight axis 205. As was mentioned hereinabove, the velocity data estimates from the inertial platform 38 (FIG. 1) are compensated by data from the boresight sensor assembly 36 (FIG. 1) and are passed to the digital data processor 30 (FIG. 1) wherein they are used in conjunction with estimates of the direction cosine matrix obtained from the head mounted IMU 24 (FIG. 1) to develop estimates of the range and range rate to the point on the terrain in the antenna boresight direction. Radar measurements about these estimated values of range and range rate are then made and the resulting data is used to determine the error in the range rate (Doppler) estimate.

Each beam or dwell measurement consists of data derived from each of four illumination frequencies. It is noted here in passing that the number of pulses for each of the four frequencies is determined from Equation (12) prior to the start of each dwell. The radar return data from each antenna phase center (quadrant) and for each illumination frequency are passed through the R.F. receiver 18 (FIG. 1) and the I.F. receiver 20 (FIG. 1) wherein they are downconverted to in-phase (I) and quadrature-phase (Q) video signals. The I and Q signals are ultimately digitized and passed to the signal processor 26 (FIG. 1). Within the latter the data samples are motion compensated in a manner to be described in detail hereinbelow. The resulting motion compensated data samples are pulse compressed and processed by means of a fast Fourier transform (FFT) algorithm ultimately to form range-Doppler data arrays (N range cells by M Doppler cells) for the four antenna phase centers and for each illumination frequency. It should be noted here that for the purpose of this discussion it is presumed that the transmitted pulses are binary phase encoded although, depending on the mapping range, they could just as well be chirped or uncoded. The data from each of the range-Doppler arrays are processed, in a known manner such as is described in U.S. patent application Ser. No. 047,957 filed June 11, 1979 by Ogar et al and assigned to the assignee of the present application, to generate normalized azimuth and elevation monopulse data on a cell-by-cell basis for the N by M array for each illumination frequency. The normalized azimuth and elevation monopulse data arrays are processed, in a manner described in the just recited application, to determine the Doppler frequency associated with the zero-crossing point of the monopulse discriminator curve which corresponds to the center of the radar beam. The difference between the predicted and measured velocity, as determined from the Doppler frequency associated with the zero crossing point, is the velocity error for the beam data being processed.

The just described process is repeated for each beam and the resulting velocity errors are combined with their associated beam direction cosine matrix to produce the components of velocity error in inertial reference coordinates for updating the inertial platform 38 (FIG. 1).

POSITION UPDATE MODE (FIG 10)

As mentioned previously, the inertial platform 38 (FIG. 1) is periodically updated in order to maintain the long term position errors so that the aircraft 302 (FIG. 10) can be navigated to a point (say point p, FIG. 10) in space under varying environmental conditions and aircraft dynamics with, here, an error of no more than 0.8 nautical miles. The position update mode entails mapping the terrain surrounding a predetermined checkpoint whose position is known and then determining the position errors of the inertial platform 38 (FIG 1) by measuring the difference between the position of such check point and the position of the center of the radar beam in the map.

The position update mode is initiated by the radar operator, in practice, at successive fifteen minute intervals during flight of the aircraft 302 (FIG. 10). In the position update mode transmitter power is radiated from a single antenna segment (say segment 14AS, FIG. 3A) in order to produce a relatively broad antenna beam, thereby to illuminate as large an area as possible around the predetermined checkpoint. Return signals are, however, processed in a manner similar to that described hereinabove for the velocity update mode. That is, the map center which corresponds to the antenna boresight axis 205 is computed both in azimuth and elevation. In the position update mode, the map produced by processing return signals is displayed to the radar operator. Using a cursor (not shown) the operator designates the predetermined checkpoint on the map. The offset of the predetermined checkpoint with respect to the map center is then computed in antenna reference frame coordinates. The cursor address of the predetermined checkpoint in range/Doppler coordinates provides the basis for determining an offset error for such checkpoint with respect to the center of the beam. That offset error, in antenna space coordinates, is then combined in a known manner with the beam direction cosine matrix to provide the components of position error in inertial reference frame coordinates for updating the inertial platform 38 (FIG. 1).

FIXED TARGET DETECTION (FIG. 11)

The radar system 10 (FIG. 1) is required to automatically detect trackable targets (meaning targets of significant military value as, for example, armored columns, aircraft hangars, runways, bridges, fuel supply depots or air defense radars), both fixed and moving in the presence of ground clutter, large point targets and ECM. The detection of fixed trackable targets requires a screening process to sort the map data while the detection of moving targets and their relocation to the proper map position requires discrimination techniques between targets and ground clutter. It should be noted here that the trackable target concept is important in that it determines the requisite map resolution size which, in turn, determines whether or not there will be a range slip problem during any dwell. That is to say, the amount of range slip during a given dwell may be expressed as:

Range Slip = $(N_{RG}/2)(\lambda/2\Delta X)$    Eq. (14)

where $N_{RG}$ is the number of range gates processed, $\lambda$ is the wavelength of the transmitted signal and $\Delta X$ is the map resolution size. Substituting into the foregoing expression, it may be seen that for a total of 256 range gates a wavelength of 0.1 ft. and a resolution of 25 ft., the total range slip during a dwell is approximately one-half of a cell.

The detection of fixed targets depends on the capability of the radar system 10 (FIG. 1) to make sufficient quality high resolution maps and then, by signal processing techniques, to highlight potential targets on these maps. It should be noted here that a 12 m. (40 ft.) resolution area search map will have sufficient image quality (even in a severe rain environment) to make both natural and man-made features such as road intersections, mountains and rivers clearly visible on the display. A 6 m. resolution map, on the other hand, is needed to ensure recognition of targets such as bridges, hangars and water tanks. In a higher resolution map a bridge contrasts markedly from background (made up of usually of water, railroad tracks or ravines over which the bridges pass); hangars are detectable for a like reason because of their proximity to runways and aprons; and water tanks are readily detectable because they generally produce a regular geometrical high intensity map image.

Stationary vehicles, however, present a different type of problem because the dimensions of such vehicles are usually in the same order as, or smaller than, the dimensions of a cell when a 6 or a 12 meter resolution is used. Although an ultra-high resolution map, say one with a resolution of 1 to 2 meters, could be generated to allow vehicles to be recognized, such a map would be too detailed to be used by an operator in a tactical situation. That is to say, there would be so many objects displayed, each of which could be a vehicle but probably is not, that an operator would take too much time to identify a vehicle, or vehicles.

The herein-contemplated radar system 10 (FIG. 1) employs a screening process to winnow out, from a large number of displayed objects in an ultra-high resolution map, those objects which most probably are vehicles. The screening process then, obviously, aids the operator by reducing the number of objects to be recognized and classified. The screening process will be described in detail hereinbelow. Suffice it to say here that the contemplated screening process subjects all the processed radar return signals (which have been converted to digital numbers representing magnitude in a range-Doppler matrix) to a sequence of logical tests including: (a) an amplitude threshold test, (b) a local maxima test, (c) a clear region test, and (d) a scintillation test. The logical tests are such that only radar return signals which are probably from vehicles will pass predetermined set limits. Before testing a preliminary process is carried on to determine that the digital numbers being tested are not derived from jamming signals.

Figure 11:
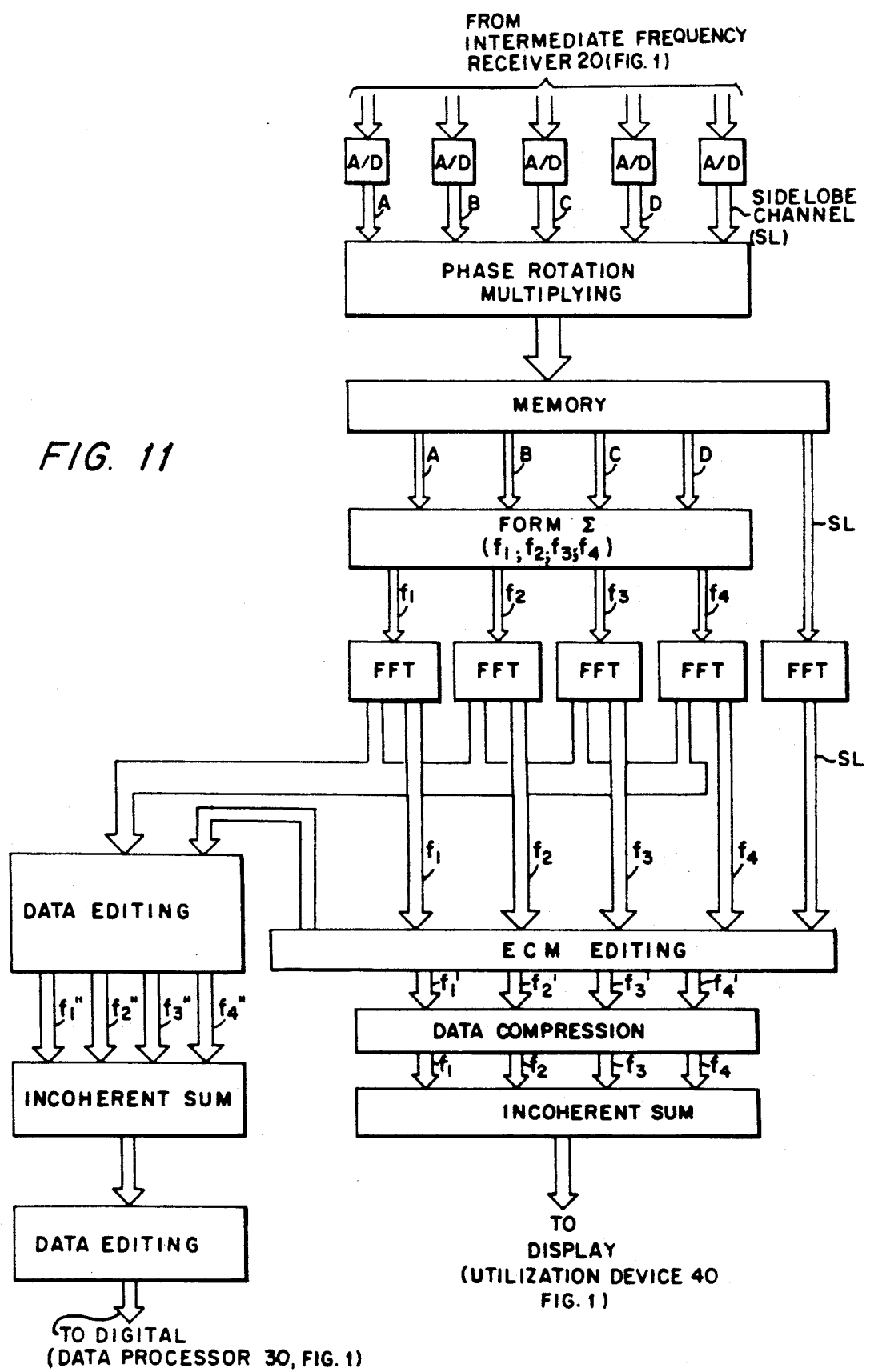
FIGS. 11 and 11A are flow charts showing how signals received from, respectively, stationary and moving targets are contemplated to be processed.

Referring now to FIG. 11, a block diagram representation of the signal processing flow in the contemplated fixed target search mode is presented. As may be seen the raw (unprocessed) radar return data corresponding to each of the four transmitted carrier frequencies from each of the antenna quadrants 14A, 14B, 14C and 14D, (FIG. 3A), as well as the data from the sidelobe channel (not numbered) are stored in memory (not numbered). It should be noted here that the data stored in memory (not numbered) have been previously motion compensated by being complex multiplied by a series of phase rotation multipliers as, for example, the REPLICA lock data. The first step in the contemplated signal processing procedure is to form the monopulse sum ($\Sigma$) signal for each of the four transmitted frequencies from the antenna quadrant data. The resulting $\Sigma$ channel data for each of the four frequencies are separately processed by means of an FFT algorithm to produce four separate range/Doppler matrices (maps). The resulting maps are then processed through two different signal processing paths, both of which involve an editing process.

The first or ECM editing process examines each of the four maps to see if any portions thereof are obscured or obliterated from the effects of ECM as, for example, by means of active repeater jammers and/or spot noise jammers. Each of the maps is also examined on a cell by cell basis against data from the sidelobe monitor (not numbered) which is provided in the slidelobe channel and which has been separately FFT processed. The sidelobe monitor data editing will be described in detail hereinbelow. Suffice it to say here that the sidelobe monitor editing is effective to reduce the sensitivity of the radar system 10 (FIG. 1) to the effects of repeater type jammers.

After ECM editing the data corresponding to the four separate maps are adaptively compressed from twelve bit magnitude words to four bit magnitude words in order that they may be displayed in an optimum manner on the video display unit (not shown). The adaptive compression process involves rearranging the data samples in each of the four maps in accordance with their amplitude distribution. That is, the samples are rearranged in a new matrix wherein amplitude is the abscissa and the number of samples is the ordinate. The amplitude corresponding to the greatest number of samples is then used to form the mean and four bit magnitude words formed about such mean. The resulting four bit magnitude maps are then incoherently added to form a single display map. The incoherent addition tends to fill in the gaps in the individual maps identified in the ECM editing process.

The second or fixed target detection editing process submits the data in each of the four maps to: (a) an amplitude threshold test, (b) a local maxima test, (c) a clear region test, and (d) a scintillation test. The amplitude threshold test removes most of the elements within the range-Doppler matrix from further consideration. The surviving members are then subjected to a local maxima test wherein it is required that the element of the map under consideration be greater than its immediate neighbors since it is desirable that a selected target stand out from its adjacent neighbors to ensure that a point target is not counted more than once.

Each of the elements that survive the local maxima test are then subjected to a clear region test which requires that the local maximum be greater by a fixed ratio than each of the targets falling in a ring around the given target. This screening test favors point targets over spread targets and also tends to select the largest target in a given neighborhood.

Those elements which survive the clear region test are then subjected to a scintillation test by comparing the four separate maps. The scintillation test requires that the three immediately preceding maps be investigated to determine the presence or absence of a target which has passed the clear region test. The question to be determined is whether or not the target under test is also present in one, two or three of the preceding maps at an amplitude which is within a given number of dB of its magnitude in the fourth map. In the scintillation test a lower and upper threshold are computed which are above and below the magnitude of the target under test. This maximum is then tested to determine if it lies within the adaptive bounds. The location of the maxima furnishes the center point around which the next preceding map is tested. This process is iterated for the three maps preceding the map under test. It should be noted here that all the cells tested in the scintillation test are in the same range bin as the target under test and that to pass the scintillation test the target must fall within the thresholds on three out of four maps.

An acceleration drift test is also employed to examine the Doppler drift between time sequential source maps. Interpolated Doppler frequencies for the cells surviving the prior tests are determined for each of the time sequential maps. The individual cell acceleration consistency is tested and the cell drift rate is tested against the composite mean. Those cells that fluctuate excessively or that exhibit drift rates which deviate sufficiently from the average values will also be deleted.

The foregoing logic testing can be extended to include some additional ECM editing features, as, for example, discrimination against corner reflector decoys. As is known, corner reflectors are utilized to simulate large fixed targets in an attempt to prevent the detection of actual targets. However, corner reflector decoys may be discriminated by virtue of their small scintillation vis-a-vis actual tactical targets as, for example, tanks or trucks. Further, the clear region ratio testing criteria can be modified to detect extended or shaped targets. Geometric pattern shape groupings of cell-sized targets can also be further tested in a correlation process to evaluate the grouping as a possible convoy or surface-to-air missile (SAM) site.

Each of the four maps are also edited with respect to the sidelobe monitor data to remove jammer-induced false targets as was described above. Following editing with the sidelobe monitor data, the four maps are incoherently added to form a composite map. In order for a potential target in the composite map to be automatically designated to an operator, that target must meet the following criteria in the composite map: (a) the magnitude of the eight adjacent cells must be less than or equal to the magnitude of the test cell; (b) at least five out of eight of the adjacent cells must be less than half the magnitude of the test cell; and (c) the magnitude of the nine cells contiguous to the cells adjacent to the test cell must be no greater than one-quarter the magnitude of the test cell. Further, a test cell that passes the foregoing criteria must not have a magnitude in any of the four maps making up the composite map which is less than half that of its integrated scaled value on the composite map. The target search in the composite map is initiated at the center of the map and proceeds to the map extremities using a spiral search pattern.

Targets passing the foregoing tests are cataloged by range, angle, Doppler and magnitude and are subsequently stored within the digital data processor 30 (FIG. 1). Such targets are also automatically displayed to the operator who may cursor a particular target for display on a higher resolution map. The cursor addresses the location of the selected target within the digital data processor 30 (FIG. 1).

Figure 11A:
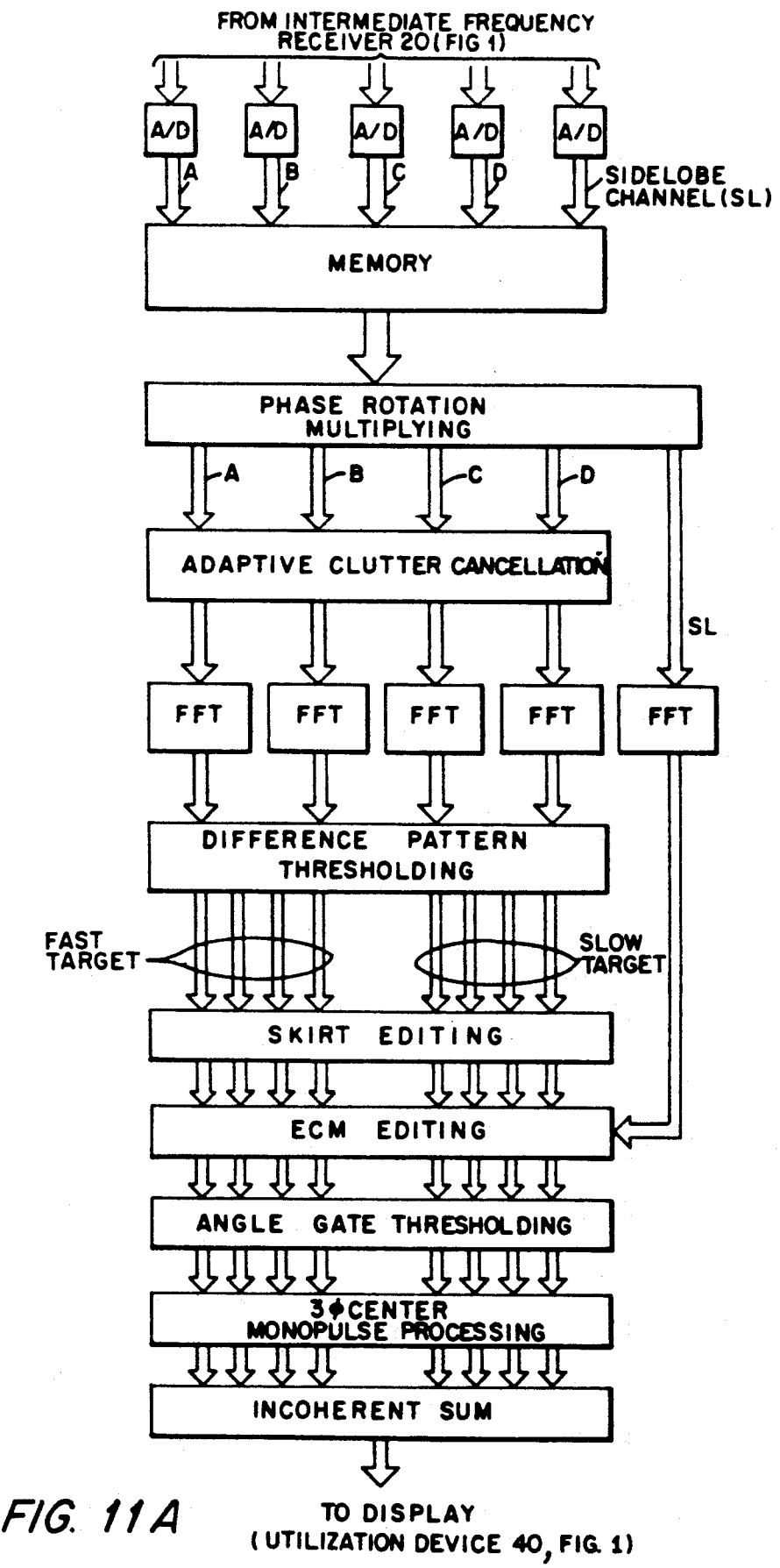

Moving Target Detection (FIG. 11A)

The radar system 10 (FIG. 1) must also detect ground moving targets in an environment of extended ground clutter, large discrete scatterers, wind-driven rain and chaff and active jamming. In such an environment, targets with one percent relative velocity must be detectable in the forward (±20°) sector, while targets with radial velocities as low as 1 m/s must be detectable in the squint (20° to 90°) sector. The latter case involves the detection of moving targets which are competing with clutter scatterers well inside the radar antenna sum beam.

Referring now to FIG. 11A, the contemplated moving target detection technique will be described. Before proceeding, however, it will be instructive to note that the effects of ground clutter and discrete scatterer interference may be appreciated by recognizing that coherent pulse Doppler radars provide high resolution synthetic aperture mapping by virtue of the fact that each fixed ground point scatterer that reflects energy has a Doppler phase history corresponding to its mean angular position relative to the aircraft velocity vector. Moving targets impart an additional Doppler phase history to the radar signal; thus, the Doppler history from a moving target does not correspond to the moving target's angular position with respect to the velocity vector, $\bar{V}$. In many cases there will exist a ground clutter scatterer which has a Doppler history due only to the motion of the aircraft 302 (FIG. 10) which essentially corresponds with the Doppler history of a moving target. The angle, as viewed from the aircraft, between the moving target and such a ground clutter scatterer is referred to as the displacement angle. The displacement angle is, as previously explained, attributable to the Doppler ambiguities resulting from the radial velocity of the moving target and the aircraft line-of-sight cross velocity in the slant plane, and may be expressed as:

$$\Delta\alpha = V_T / V_{AC} \sin \alpha \qquad \text{eq. (15)}$$

where $V_T$ is the radial velocity of the target and $V_{AC} \sin \alpha$ is the cross velocity of the aircraft 302 (FIG. 10). If a displacement angle of significant magnitude exists, antenna weighting can be used to attenuate the competing clutter scatterers such that the moving target becomes detectable.

If the displacement angle is large relative to the transmitted antenna beamwidth, then conventional $\Sigma$ channel detection techniques can be employed. That is, the competing clutter cell will be attenuated relative to the target by virtue of the fact that it is on the far main beam skirts or in the sidelobe region when the target is within the main lobe. Sum channel detection methods also apply when the total Doppler shift of the ground moving target is beyond foldover (i.e., greater than the maximum Doppler clutter frequency). Strictly speaking, there is no competing ground clutter when this occurs although either noise modulated clutter residues or ambiguously sampled clutter may be detected along with wind-driven rain and chaff. Thus, when required, rain rejection is provided by means of an adaptive polarization technique which was described hereinabove.

Before proceeding, it should be noted here that during a given radar dwell the antenna 14 (FIG. 1) will be slued to maintain the line-of-sight vector on a single area target focal point. As the antenna 14 (FIG. 1) is slued, the PRF of the radar system 10 (FIG. 1) must be changed accordingly. It should also be recalled that during a given radar dwell the PRI of the latter is controlled, for motion compensation purposes, such that equal angle increments are swept out between pulse transmission times. Finally, it should be noted that for long range applications a relatively low radar PRF is utilized which may result in Doppler ambiguities in the case of high speed targets. From the foregoing it should now be appreciated by those of skill in the art that the contemplated moving target detection technique must be adaptive in order to enable the radar system 10 (FIG. 1) to detect both low and high speed targets in a relatively complex clutter background.

Illustrated in FIG. 11A is a block diagram representative of the contemplated signal processing technique for the ground moving target detection mode. Similar to the fixed target detection mode, the raw target return data (from each of the four antenna quadrants corresponding to each of the four transmitted frequencies) are complex multiplied by a series of phase rotation multipliers as, for example, the REPLICA signal, and the phase shifts required as a result of slueing or rotating the antenna 14 (FIG. 1) during the radar dwell, as well as other motion compensation phase multipliers, and are ultimately stored in memory.

Following the phase correction multipliers the data are passed to an adaptive clutter canceller wherein a displaced phase center clutter cancelling technique is utilized to cancel background clutter. At this point it will be instructive to refer back for a moment to FIG. 3A where the arrangement of the antenna quadrants is illustrated. The phase centers of antenna quadrants 14A and 14B are disposed along the horizontal axis (not numbered) of the antenna 14, while the phase centers of antenna quadrants 14C and 14D are disposed along the vertical axis (also not numbered) of the antenna 14. The phase centers of antenna quadrants 14C and 14D must be phase compensated to account for their difference in elevation vis-a-vis the horizontal axis (not numbered) of the antenna 14. One-half the sum of the two latter is designated "E".

Referring briefly now to FIG. 7A, the contemplated clutter cancelling technique for the case of a two phase center antenna will be explained. It should be recalled here that the following technique was described in detail hereinabove with reference to the motion compensation section where the technique was expanded to include a three phase center antenna. Suffice it to say here that if the phase centers are originally at $A_o$ and $B_o$, then according to FIG. 7A the best time to take the $B_1$ sample for subtraction from $A_o$ is when B crosses $R_{Ao}$. The PRI of the radar system 10 (FIG. 1) is controlled such that equal angle increments are swept out by the antenna 14 (FIG. 1) between pulse transmission times. This ensures that when the second pulse is transmitted at time $t_1$, the B phase center will be on the line between the phase center A at time $t_o$ and the reference point, o; i.e., phase center B is somewhere along $\bar{R}_{Ao}$. The exact distance, $L_1$, that phase center B at time $t_1$ is from phase center A at time $t_o$ must be known so that the phase of the samples obtained from phase center B at time $t_1$ can be shifted by $4\pi L_1/\lambda$ in order to match those obtained from phase center A at time $t_o$. The requisite phase shifts are obtained by generating the range, $\bar{R}_{Bo}(t)$, between the B phase center and the map reference point, 0, from the antenna velocity, radial acceleration and squint angle and sampling it each time a pulse is transmitted.

Once the radar return data has been properly phase compensated, the characterization of clutter rejection is dependent, inter alia, on the physical separation of the phase centers being cancelled. As a general rule, the greater the separation between the phase centers being cancelled, the greater the degree of slow target detection. It will also be shown in detail hereinbelow that multiple antenna phase centers may be utilized to distinguish between fast and slow moving targets.

If the returns from phase center A are to be cancelled with the returns from phase center B, the procedure involves cancelling (subtracting) a present sample from phase center A with a previous sample obtained from phase center B. The particular phase center B sample chosen for cancellation (meaning the sample that corresponds to a previously transmitted pulse) is dependent on the distance between the A and B phase centers and here is the second previously transmitted pulse. Thus, samples obtained from phase center A at time $t_n$ are cancelled with phase center E samples obtained at time $t_{n-1}$. In like manner, if phase center E samples are to be cancelled with phase center B samples, then phase center E samples obtained at time $t_n$ are cancelled with phase center B samples obtained at time $t_{n-1}$.

Digressing here now for a moment, it should be recalled that each fixed ground point scatterer that reflects energy has a Doppler phase history corresponding to its mean angular position relative to the velocity vector of the aircraft 302 (FIG. 10), and that moving targets impart an additional Doppler phase history to the radar signal. The relative angle as viewed from the aircraft 302 (FIG. 10) between a moving target and a ground scatterer having an identical Doppler frequency as the moving target is known as the displacement angle. As mentioned hereinbefore, if a sufficient displacement angle exists, antenna weighting can be used to attenuate the competing clutter scatterers such that the moving target becomes detectable.

Figure 13:
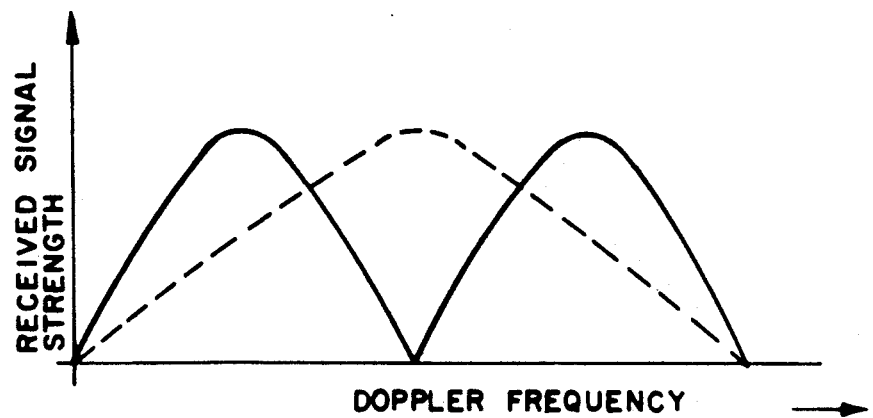
FIG. 13 is a sketch showing how the received signal strength from moving targets varies with spacing between phase centers on the antenna of FIGS. 3A, 3B and 3C.

Referring now to FIG. 13, the effectiveness of the contemplated antenna weighting technique in detecting both fast and slow moving ground targets will be explained. Thus, the solid curve of FIG. 13 represents the difference pattern obtained by subtracting the returns from phase center B from those received by phase center A. The ordinate of FIG. 13 represents received signal strength, while the abscissa represents Doppler frequency or, equivalently, angular extent from a given null position. The returns from any ground clutter scatterer located in the nulls will be completely cancelled. As explained hereinabove, any ground moving target will impart an additional Doppler frequency to the radar signal and, therefore, the doppler frequency from a moving target will not correspond to its angular position with respect to the null axis. Thus, if the total Doppler frequency of a moving target is sufficient to place the target return in the Doppler filter corresponding to the null axis, that target will be detected. This is the so-called moving target anomaly detection technique which is described in co-pending patent application Ser. No. 582,965 entitled "Moving Target Indicator (MTI) Radar System", filed May 30, 1975, inventors Hiller et al., now U.S. Pat. No. 4,217,583 issued Aug. 8, 1980 It is important to note here that although the anomaly detection technique permits the detection of moving targets, further processing is required to accurately position the target in angle. It should also be noted that if a moving target is actually located in the reference null or is displaced in angle from the reference null axis or Doppler filter by an amount equal to the width of the difference pattern lobe, (i.e., it falls in the second difference pattern null), it will not be detected. It can be shown that that angular displacement here corresponds to the displacement angle. Furthermore, as the displacement angle is related to the relative velocity of the target, antenna weighting can be utilized to distinguish between various speed ground targets. The spacing between the nulls of the A-B pattern is determined by dividing the operating wavelength, λ, by the distance between phase centers A and B, which is here 12 λ. As the displacement angle is equal to the difference between the nulls, it can be seen that ground moving targets having a velocity of 8 percent relative to the cross velocity of the aircraft 302 (FIG. 10) are likely not to be detected by means of the A-B pattern. Thus, ground moving targets having a velocity of up to 8 percent of the aircraft cross velocity will be detectable by means of the A-B pattern. This corresponds to the so-called "slow moving target" detection mode.

If, on the other hand, the returns from phase center E (formed by combining the returns from phase centers C and D in a manner described in detail hereinabove) are subtracted from those of phase center A to form a new null axis, the difference pattern indicated by the dashed line of FIG. 13 is obtained. As may be seen, the difference pattern lobe of the a-E pattern is twice as wide as that of the A-B pattern. This follows from the fact that the distance between the A and E phase centers is 6 λ. Ground moving targets having a relative velocity of up to 16 percent of the cross velocity of the aircraft 302 (FIG. 10) will therefore be detectable with A-E pattern. That is to say, the angular extent or Doppler frequency excursion between the nulls of the A-E difference pattern corresponds to a target having a velocity equal to 16 percent of the cross velocity of the aircraft 302 (FIG. 10). This is the so-called "fast moving target" detection mode. It should again be noted here that the three phase center clutter cancellation techniques just described simply allow for the detection of either slow or fast moving ground targets, and does not provide for the location in angle of the detected targets. Additional processing, to be described in detail hereinbelow, is required to accurately position the detected targets in angle.

Referring back now to FIG. 11A, following the adaptive clutter cancelling phase processing described hereinbelow, the data corresponding to each of the four transmitted frequencies for each of the antenna phase centers A, B and E are processed by an FFT algorithm, the net effect of which is to arrange the data in a range/Doppler matrix. Following the FFT processing, the data undergo a thresholding process wherein the difference patterns A-B, A-E and E-B are formed. Those returns that exceed a predetermined threshold level in the A-E and E-B patterns are classified as fast moving target candidates, while those exceeding a similar threshold in the A-B pattern are classified as slow moving target candidates. The moving target candidates identified by the thresholding process are next subjected to a series of editing processes designed to filter out false targets induced by ground based ECM equipment.

The first of the editing processes is a so-called "SKIRT EDITOR" designed to identify and remove those false targets introduced into the radar system 10 (FIG. 1) by repeater type jammers. As is known, the latter attempt to introduce false targets into the radar system 10 (FIG. 1) via the sidelobes of the antenna 14 (FIG. 1). If the returns from the repeater jammers occur at frequencies corresponding to the Doppler frequency of the returns from the main lobe of the antenna 14 (FIG. 1) or at frequencies corresponding to the Doppler ambiguities of the main lobe, then the false returns could be mistaken for real targets. The skirt editing process is designed to examine the sidelobes of the various antenna patterns formed to test for the presence of false target returns. Thus, the returns as seen by a single antenna quadrant, here quadrant A, are compared with the returns as seen by the sum of antenna quadrants A and B, (A+B), as well as the sum of all four antenna quadrants, (A+B+C+D). It will be appreciated by those of skill in the art that the pattern from the single antenna quadrant A is sufficiently broad to cover the null in the A+B pattern, which results from the physical arrangement of antenna quadrants A and B, and the sidelobe region of the A+B+C+D pattern. In the contemplated skirt editing process an arbitrary threshold is established based on the magnitude of the return signals as seen by the single antenna quadrant A. That threshold is here two times the magnitude of the returns seen by antenna quadrant A. Hence, if twice the magnitude of the returns seen by antenna quadrant A in any given region is greater than the magnitude of the returns seen by either the A+B or A+B+C+D patterns in the same region, then the returns from the latter (sum patterns not exceeding the 2A threshold are rejected as false targets.

It should be noted here that the just described skirt editing process may be expanded, depending on the threshold level selected, to provide some degree of protection against main lobe repeaters or break-lock repeaters which initially repeat the radar signal faithfully to capture the tracking circuits of the radar system 10 (FIG. 1) and then move off the true target return, either in range or frequency, thereby pulling the radar system 10 (FIG. 1) off the true target return signal.

The next step in the editing process is also an ECM editor referred to as the sidelobe monitor. The sidelobe monitor editing is similar to the skirt editing just described in that both are designed to reject the returns from repeater type jammers which attempt to enter the radar system 10 (FIG. 1) via the antenna sidelobes. It should be noted here that the intent of these repeater type jammers is to produce multiple false targets in the radar system 10 (FIG. 1) in an attempt to exceed the data handling capability of the latter and thereby prevent true targets from being identified. In the skirt editing process just described the returns detected in a single antenna quadrant pattern were compared against the returns seen by the patterns resulting from the sum of antenna quadrants A and B as well as antenna quadrants A, B, C and D. The sidelobe monitor editing provides not only protection against repeater type jammers from entering the sidelobes of the single quadrant antenna pattern, but also a degree of protection against spot noise jammers. Thus, it will be recalled that the sidelobe monitor (not numbered) described hereinabove with reference to FIGS. 4A and 4B has an adaptive null forming capability which may be used to cancel the returns from spot jammers.

It should be noted here that the sidelobe monitor data are received through the auxiliary channel of the RF receiver 18 (FIG. 1) and are separately FFT processed into a range-Doppler matrix. The resulting map (range-Doppler matrix) is compared against similar maps generated from the data received by each of the antenna quadrants. The sidelobe monitor map is then compared with each of the quadrant maps and any potential target whose amplitude in the former is greater than in any of the latter is rejected as a false target. This editing is dependent on the fact that the gain of the sidelobe monitor pattern is greater than that of the antenna quadrant patterns in the sidelobe region of the latter.

Following the sidelobe monitor editing the surviving target candidates are subjected to an additional ECM editing stage designed to nullify the effects of swept, frequency modulated (FM) barrage type jammers on the radar system 10 (FIG. 1). As is known, the effect of this type of jammer on the latter is to reduce the signal-to-noise ratio to an extent determined by the effective radiated power of the jammer, the range to the jammer, and the gain of the antenna sidelobes in the direction of the jammer. One known method to counter the effect of such a jammer is to turn off (blank) the R.F. receiver 18 (FIG. 1) whenever the jammer sweeps through the radar band. An alternate technique which takes full advantage of the adaptive null forming capability of the herein contemplated radar system 10 (FIG. 1) to discriminate against a number of spatially separated slow sweeping barrage jammers would be to form a spatial null in the direction of each jammer as they randomly sequence through the radar spectrum. This technique presupposes the existence of a means of cataloging the location of the slow sweeping jammers which here may be provided by means of the sidelobe cancelling circuits (not numbered) described hereinabove with reference to FIGS. 4A and 4B. The contemplated null forming technique will be described in detail hereinbelow with reference to the target angle estimation section. Suffice it to say here that that technique takes advantage of the multiple antenna phase centers to form a pair of steerable monopulse nulls.

If, however, blanking must be utilized for some reason, as for example, the sheer number of swept jammers that must be nullified, then the herein contemplated radar system 10 (FIG. 1) still provides an advantage. That is to say, systematic blanking disturbs the continuity of the received waveform which will result in the introduction of Doppler sidelobes in the return signal. However, since the blanking commands are developed within the radar system 10 (FIG. 1), the signature (time of occurrence and duration) of the blanks may be stored within the latter and upon completion of the radar dwell time this blanking sequence (signature) may be transformed into weights and used to reduce the generated Doppler sidelobes to an acceptable level.

The potential moving target candidates that survive the foregoing ECM editing processes are next subjected to an angle gate thresholding process, sometimes referred to as a spread moving target gate, which is designed to remove those potential moving target candidates which are attributable to intrinsic clutter. The effect of intrinsic clutter which may, for example, be due to the motion of wind driven trees in leaf, is to cause an increase of energy in a particular Doppler filter or a spread of energy between a group of Doppler filters. The angle gate thresholding technique therefore subjects each moving target candidate, which will be recalled is positioned in a range Doppler matrix, to a monopulse angle measurement. That measurement takes full advantage of the multiple phase center antenna in forming the monopulse angle estimate. Thus, the estimate is formed by normalizing the difference of the E-A and B-E difference patterns to the sum of those difference patterns and may be expressed as:

$$((E-A)-(B-E))/((E-A)+(B-E)) \qquad \text{Eq. (16)}$$

The procedure now is to form the foregoing ratio for every candidate target in the range Doppler matrix. As is known, normalization will assign each moving target candidate in the range/Doppler matrix (map) to a particular Doppler filter or angular location. If two or more target candidates are assigned to the same Doppler filter or angular location, then the angle gate editor will reject all of these candidates as being intrinsic clutter due, for example, to the motion of a single tree. In like manner, if some number n of target candidates, where n>4, are assigned to adjacent Doppler filters or angular locations, the angle gate editor will reject all of these candidates as being intrinsic clutter due, for example, to the motion of a group of wind driven trees.

Before proceeding, it should be recalled here that the radar system 10 (FIG. 1) is required not only to detect ground moving targets, but also to accurately position those targets on a displayed map. Thus, those moving target candidates that survive all of the foregoing editing processes are subjected to a so-called "three phase center" monopulse target detection technique. As previously explained, the radar return data may be combined to provide a minimum of three colinear phase centers A, B and E which lie in the slant plane determined by the aircraft velocity vector and the line of sight vector to a ground reference point. In the three phase center monopulse target detection technique the returns from the three phase centers are processed such that the angles to both a target and its competing clutter patch can be resolved. The solution is directly analogous to multiple sidelobe jammers in which more than one jammer is cancelled in the sidelobes of a tracking radar by using multiple small apertures, one for each jammer. The three phase centers form a pair of independently controllable difference patterns exhibiting two nulls, one for the target and one for clutter. Error signals can then be obtained for either or both the target or clutter by using the appropriate source in the denominator of the three phase center monopulse normalization routine.

As the moving target candidates that survive the foregoing editing processes are arranged in a range-Doppler matrix (map), an estimate of the Doppler frequency associated with each target cell is readily obtained. With knowledge of the Doppler frequency associated with the potential target cell, the angular location of that cell with respect to the antenna boresight axis may be determined by means of the following expression:

$$f_D = 2V \sin B \Delta B / \lambda \qquad \text{Eq. (17)}$$

where $f_D$ is the Doppler frequency associated with the target cell relative to boresight, V is the aircraft velocity, B is the antenna aspect angle with respect to the aircraft velocity vector, $\lambda$ is the wavelength of the transmitted signal and $\Delta B$ is the angular location of the target cell.

The first step in the three phase center target detection process is to place the nulls obtained from both the A-E and E-B patterns at the angular location of the target cell. It should now be appreciated by those of skill in the art that the contemplated null steering may be accomplished by shifting (rotating in angle) the data from each of the antenna phase centers A, B and E prior to forming the difference pattern beams. The requisite amount of phase rotation is given by:

$$\phi = 2\pi d \sin \Delta B / \lambda \qquad \text{Eq. (18)}$$

where d is the distance between the antenna phase centers and $\Delta B$ is the angular location of the target cell. It should also now be appreciated that when both difference pattern nulls are placed on the given target cell (Doppler filter) any clutter within that cell (Doppler filter) will, for all practical purposes, be completely nulled. Therefore, any residual energy within that cell (Doppler filter) will be due to the motion of an off axis moving target. The angular position of the moving target relative to the null axis may be estimated by means of a conventional monopulse ($\Delta/\Sigma$) measurement made on the reference cell (Doppler filter). That is to say, once the monopulse discriminator curve is formed the off axis location of the target may be estimated from the magnitude of the residual energy within the target or reference cell. The procedure now is to phase shift (rotate in angle) one of the difference pattern nulls by an amount given by:

$$\phi_T = 2\pi d \sin \Delta B_T / \lambda \qquad \text{Eq. (19)}$$

where $\Delta B_T$ is the estimated off axis angular location of the moving target. Next, with one of the difference pattern nulls located on the cell (Doppler filter) corresponding to the estimated position of the moving target, the reference cell (Doppler filter) is re-examined. If the residual energy within the latter falls to the level of the null or is otherwise indiscernible, then the moving target is unambiguously located in angle. That is to say, if the second difference pattern null is accurately positioned on the moving target, then the latter will be unable to contribute any energy to the reference cell or Doppler filter. If, on the other hand, when the second difference pattern null is placed on the estimated moving target cell there is little or no change in the energy level within the reference cell (Doppler filter), then the moving target is not accurately located and the process is repeated.

Once the correct angular location of the moving target is determined that location is stored in memory (not shown) for subsequent display. The three phase center monopulse detection technique is then repeated for each of the moving target candidates that survived the editing processes. When all the moving target candidates have been accurately located in angle a composite, incoherent map is formed from the returns corresponding to each of the transmitted frequencies. The composite map is displayed to an operator who may then select a particular target or group of targets for attack.

PPI Mode (FIG. 1)

The radar system 10 (FIG. 1) is required to provide a ground mapping mode utilized principally for course navigation and in the designation of sectors for high resolution mapping. In such a mode, sometimes hereinafter referred to as the PPI mode, a non-coherent frequency agile sector map is generated. The requisite maps must cover a 60° azimuth sector and must be displayed in any one of three operator-designated range scales (i.e. 15 to 100 km, 5 to 40 km, or 5 to 20 km). The range resolution varies with the range scales being respectively 150, 60 and 30 m. It will be appreciated by those of skill in the art that in the long range (15 to 100 km) application the standard antenna $\Sigma$ beam will be sufficiently broadened (due simply to antenna beam dispersion with range) to provide the requisite elevation coverage. In consequence, then, in the long range PPI mode the antenna 14 need only be stabilized in elevation while it is slued in azimuth to provide the requisite terrain coverage.

In the short range (5 to 20 km) PPI mode a different situation arises. That is, the $\Sigma$ beam will not be sufficiently dispersed with range to provide the requisite elevation coverage. In this instance, advantage is taken of one of the antenna segments, here segment 14AS, to form a fan beam. As is known by those of skill in the art, a fan beam will be formed from an antenna where one of the principal dimensions of such antenna exceeds the other by a ratio in the range of from 2 to about 5. The length of the antenna segments 14AS, 14BS, 14CS and 14DS exceeds their width by the required amount and, therefore, each of such segments will form a fan beam.

Thus, in the short range PPI mode the antenna 14 (FIG. 1) is rotated to align antenna segment 14AS in a vertical position and the four axis gimbal assembly 12 is used to stabilize the antenna 14 at a constant elevation angle irrespective of aircraft motion. Elevation monopulse calculations are then performed on selected range bins and these monopulse estimates, as a function of range, are employed to estimate and track the height of the aircraft 302 (FIG. 10) above the mapped terrain. This information is employed in controlling the antenna elevation fan beam pointing. It should be noted here that, as mentioned briefly hereinabove, the nominal PRF of the radar 10 will be varied as a cosine of the antenna pointing angle to compensate for the change in range with antenna scan angle.

Antenna Segment Null Patterns (FIGS. 3A, 4A, 4B)

It should be recalled here that the antenna aperture is subdivided into four identical quadrants 14A, 14B, 14C and 14D and four identical segments 14AS, 14BS, 14CS and 14DS. Further, as mentioned hereinabove, the antenna aperture (not numbered) is divided into square quadrants rather than serrated quadrants even though serrated quadrants would provide low quadrant sidelobes in the 0°, 45° and 90° planes of the antenna 14. As also noted, if the quadrants 14A, 14B, 14C and 14D were serrated the grating lobes would be randomly distributed to either side of the principal and diagonal planes of the antenna 14. The square quadrant was here chosen because, in such a configuration, the sidelobes are known to be along the diagonal planes and, therefore, compensation for such sidelobes may be effected.

Referring now to FIG. 4B, it should be recalled that the output signals from antenna segments 14AS, 14BS are passed to switch networks 245V, 245H and that such switch networks may, in response to a control signal provided by the radar synchronizer 34 (FIG. 1), produce an output signal corresponding to: (a) the input signal received from antenna segment 14AS; (b) the input signal received from antenna segment 14BS; or (c) the difference between the input signals received from antenna segments 14AS and 14BS. The output signals from the switch networks 245V, 245H are ultimately passed through the auxiliary channel (not shown) of the R.F. receiver 18 (FIG. 1) to the signal processor 26 (FIG. 1) and the digital data processor 30 (FIG. 1).

It should now be appreciated by those of skill in the art that the main lobes (fan beam) from antenna segments 14AS, 14BS will be of greater magnitude vis-a-vis the antenna quadrant side lobes that reside in their respective diagonal planes. In consequence, then, the returns from antenna segments 14AS, 14BS may be utilized to cancel jamming signals which would otherwise enter the radar system 10 via such diagonal plane sidelobes.

It should also be appreciated that the pattern resulting from taking the difference of antenna segments 14AS, 14BS will have a null located at the geometric center of the antenna 14 (corresponding to the location of the Σ beam peak) with lobes extending radially outward in each of the diagonal planes. Such a pattern is effective in cancelling jammers that would normally fall beyond the range of the quadrant sidelobe cancellers. The segment difference pattern offers a second advantage in that it provides jammer cancellation without increasing the clutter level as the clutter is along the range axis.

Difference Channel Sidelobe Cancelling

Referring back now for a moment to FIGS. 4A and 4B, it should be recalled that the arithmetic networks 259V, 259H are included in the sidelobe cancelling channels (not numbered) to form both the monopulse sum and difference signals from the quadrant sidelobe cancelling elements (not numbered). It should also be recalled that switches 261V, 261H are provided to selectively apply either the monopulse sum or difference signals through the R.F. receiver 18 (FIG. 1) to the digital data processor 30 (FIG. 1) for further processing. The reason for selectively applying either the monopulse sum or difference signals from the sidelobe cancelling elements to the digital data processor 30 (FIG. 1) will be appreciated when it is recognized that conventional sidelobe cancellers utilize only a single beam to cancel the returns from the sidelobes of both the sum and difference beams of the antenna that they are intended to protect. Thus, while such single beam sidelobe cancellers are effective in cancelling undesired returns from the sidelobes of the main antenna sum beam, they introduce a tracking error when they are utilized to cancel undesired returns from the main antenna difference beam sidelobes. This tracking error results from the fact that the beam from such conventional sidelobe cancellers is designed to be of greater magnitude than the sum beam sidelobes in the region of the sum beam sidelobes. In consequence, then, the peak of the sidelobe canceller pattern will be coincident with the null axis of the main antenna difference beam and, therefore, interference signals from the sidelobe canceller beam will be injected into the main antenna difference channels. The radar system will then cause its difference channel null to be shifted in an attempt to null these error signals, thereby introducing tracking errors into the antenna system.

The problem in the herein contemplated radar system (wherein the returns from each of the antenna quadrants 14A, 14B, 14C and 14D (FIG. 3A) are modified by their sidelobe cancellers before being combined to form monopulse sum and difference beams) is analogous to the foregoing problem. Thus, while each of the quadrant cancellers is controlled to provide the optimum degree of cancellation for each of the antenna quadrants, the phase and amplitude settings of each of the quadrant sidelobe cancellers will not be identical due principally to the actual physical separation between each of the quadrant sidelobe cancellers. As a result, then, when the returns from, say, antenna quadrants 14A and 14B are subtracted to form the monopulse azimuth difference beam it is possible for the sidelobe cancellation components in each of the channels to combine in such a manner as to introduce an interference signal in the difference channel. In light of the foregoing, the monopulse arithmetic networks 259V, 259H are provided in the sidelobe cancelling channels (not numbered) so that a monopulse difference pattern null may be formed from each of the quadrant sidelobe cancellers and steered in the direction of the interference. When the quadrant difference pattern is then formed, the effect of the sidelobe cancellers in the resulting difference channel will be minimized.

Figure 14:
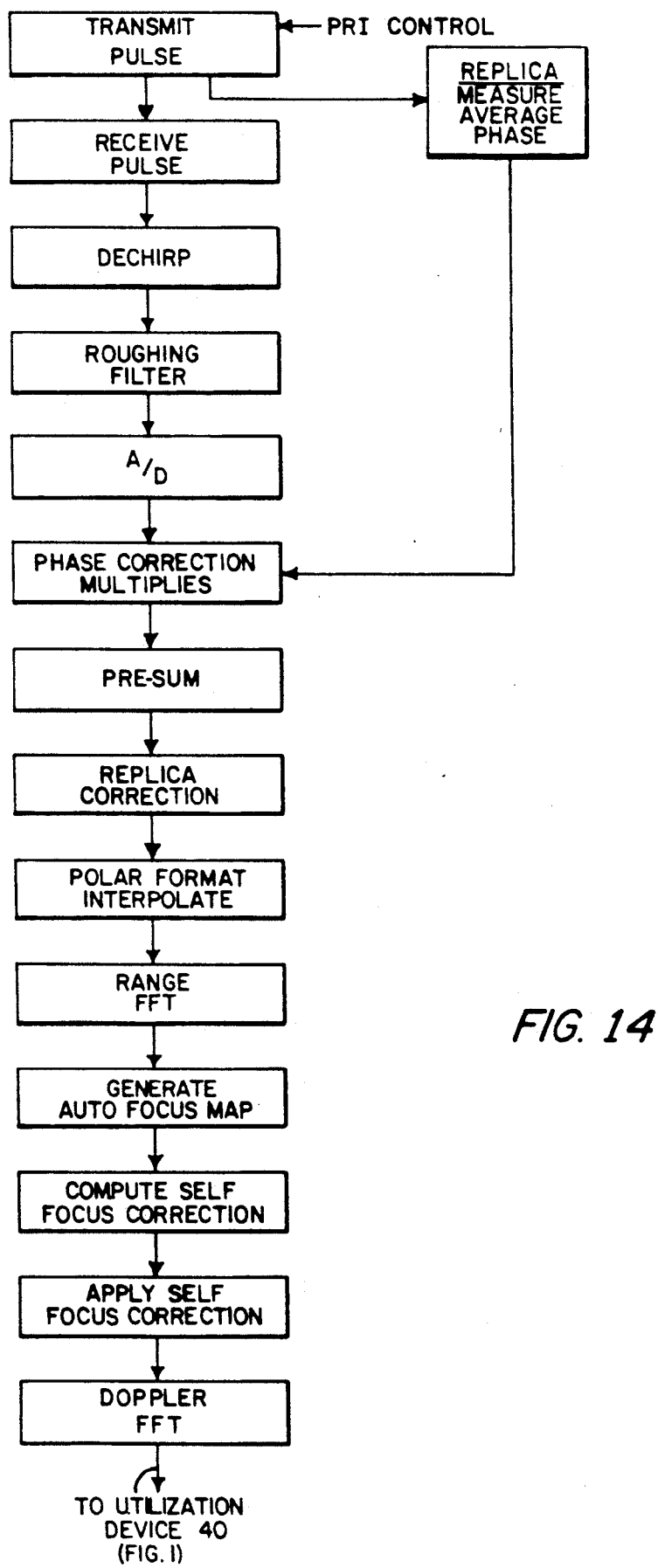
FIG. 14 is a flow chart showing how a high resolution map is generated.

Ultrahigh Resolution Mapping (FIG. 14)

The herein-contemplated system is required to generate a high resolution (2 ft.) map around an area designated by the radar operator. This mode is utilized for target classification whereby vehicles may be distinguished from each other. A chirp waveform must be used to achieve the wide bandwidth required to achieve the desired degree of resolution, along with equalization of the waveform time sidelobes rising the replica lock equalization technique which was mentioned before hereinabove. Briefly, that technique involves taking a sample of the transmitted waveform and using that sample to correct errors in the returned pulse, thereby to reduce the time sidelobes of the compressed pulse and to correct random pulse-to-pulse phase errors.

It will be appreciated by those of skill in the art that the focus zone of the generated map would be an unacceptably small area around the center of focus of the map if of aircraft motion effects are not properly compensated. Thus, the techniques of equiangular sampling, which was described hereinbefore, and polar format interpolation, which will be described in detail hereinbelow, are used to expand the focus zone into a usable size. The polar format technique inherently implies the use of a two-dimensioned FFT for processing since corrections must be made in the complex plane before resolving the map into individual cells. In order to be able to process the two dimensional map data in a reasonable amount of time, the technique of A/D strobe frequency control, which was described briefly hereinabove, is used to align the data samples taken in such a way that they can be processed with a minimum amount of interpolation and therefore in a minimum amount of time.

Even with the compensations which are made for aircraft motion, errors can cause areas of the map to be improperly focused when there are large accelerations. Thus, a technique of self-focusing, wherein point targets detected in the map are used to determine the extent of the acceleration error so that the error may be removed before the final FFT process which resolves all the cells, is used to correct for acceleration errors.

Digressing here now for a moment, it should be recalled that the replica-lock technique is used to solve two problems produced by distortion of the wideband chirp signal in the high power microwave portion of the radar system 10. This distortion takes the form of amplitude and phase modulations which are impressed on the transmitted waveform producing deviations from the ideal quadratic phase characteristic of a chirp signal. These deviations, if not compensated for in some manner, generate time (range) sidelobes and Doppler sidelobes which degrade the small area contrast ratio of the map. The second problem which is solved by the replica lock technique is the removal of pulse-to-pulse random phase changes. The average phase of the replica is measured for each transmitted pulse and the deviation from nominal phase is removed in the signal processor 26 (FIG. 1). The replica lock technique takes samples of each transmitted pulse for the purpose of measuring the average phase of the pulse. For the purpose of compensating for the waveform transmission characteristics, the signal processing necessary to derive the correction factor is only done once per dwell as the phase transmission characteristics of the transmitter and receiver components are slowly changing functions.

When the replica is used to compensate the received signal for time (range) sidelobes, the compensation consists of multiplying the digitized radar data by the reciprocal of a stored replica of the transmitted pulse. Since both quantities are complex, this operation to a first order is a series of phase rotations which correct for phase irregularities in the transmitted signal.

As is known, defocusing of the map is caused by quadratic phase terms in the recorded data for points displaced from the map center which remain after the focus compensation for the center point has been performed. While equiangular sampling does, in fact, linearize the phase history for points displaced from the map center, its effectiveness is limited in very high resolution applications by differential range shifts of points within the map during the mapping dwell. The differential range slip problem may be understood by considering that as the synthetic aperture map is developed the radar range gate is fixed on a central point. Points at the same range but different azimuth positions have varying ranges with respect to this point and, over the dwell, they will move into and out of the central gate. If a simple range gated system is used these targets will smear through several range gates, and a defocused map will result. The relative target motion at different azimuth angles is the parameter used to obtain azimuth resolution and it is implicit in all synthetic aperture maps. For ultra high resolution maps the differential motion of $\lambda/2$ (where $\lambda$ is the wavelength) required to resolve two adjacent cells is about 1/40 of the cell size and since several hundred azimuth cells are desired, a differential range slip of several cells for points at the edges of the map is inherent and unavoidable.

Polar formating is a signal processing technique used to solve the differential range slip problem. The concept of polar formating evolved out of optical processing where initially the dechirped, uncompressed returns for each transmitted pulse are recorded directly on film and the returns from successive pulses are laid down in parallel strips. The result is a hologram of the ground image. Coherent processing of the hologram (equivalent to a two-dimensional FFT) recovered the ground image. When ultra high resolution was attempted it was found that laying the strips down with a slight angle between successive strips (instead of parallel) would compensate for differential range slip and give a correct hologram of the ground image. This slight angle between successive strips was equivalent to using a polar coordinate system for recording and became known as "polar formating". The herein contemplated system uses a discrete digital equivalent of an optical polar formating technique which has been optimized for the real time operational requirements of the system. The technique employs the following sequence of operations. First, a long frequency ramped signal is transmitted and the received signal is heterodyned against a similarly ramped local oscillation. In digitizing the return data the timing of the A/D converter strobe pulses is varied by means of the frequency slipped clock signal developed within the synchronizer 34 (FIG. 1) to compensate for changes in the line of sight depression angle during the dwell. The PRI being varied, data samples equally spaced in angle around the map center are produced. The digitized return data are subsequently thinned in a presummer/roughing filter to lower the sample rate. Next, interpolation of the data is performed to produce a modified data set in which the nonlinearity of the phase history of any point in the map is minimized. Finally, a two-dimensional FFT is performed on the modified data set to generate the ultra high resolution maps.

It should be noted here in passing that prior to interpolation the return data consists of a fan-shaped grid of points in which the data arranged in vertical columns are separated by a constant angle as the result of PRI control and the data arranged in horizontal rows are separated by a constant distance as the result of A/D strobe control. Interpolation across horizontal points is then used to effectively arrange the data in a horizontal grid.

The effect of the foregoing sequence of operations is to generate a sampled data phase plane across which each resolvable point in the map produces a unique, nearly linear phase gradient. Since the effect of interpolation is to rearrange the data into the form of an orthogonal grid, a two-dimensional FFT performed along the two principal axes will produce a map in which the two dimensions are also orthogonal. That is, the cross-coupling between the range and the cross-range dimensions produced by differential range slip is eliminated by the interpolation process.

As previously mentioned, the times at which A/D strobe pulses and radar transmitter pulses are produced are both controlled to simplify the computations involved in producing polar formatted data. The equation which governs the timing of the A/D strobe pulses is:

$$t = \frac{2r_y}{C} + \frac{f_o}{K}\left(1 - \frac{\cos\phi_o}{\cos\phi\cos(\theta - \theta_o)}\right) + \frac{1}{(2K/C)\Delta\cos\phi\cos(\theta - \theta_o)} \qquad \text{Eq. (20)}$$

where
$f_o$ = transmitter frequency
$K$ = chirp slope
$C$ = velocity of light
$\Delta$ = map resolution
$\theta$ = line-of-sight azimuth angle to the map reference point
$\phi$ = line-of-sight elevation angle to the map reference point
$r_y$ = range to the map reference point The strobe timing consists of a constant term and a linear term. The constant term gives the time delay to the first data sample taken after any transmitter pulse, while the linear term gives the repetition interval of the strobe pulse train. Since both $\theta$ and $\phi$ can be considered constant during any radar interpulse interval, the strobe pulse frequency is constant during any receive interval. The dependence of t upon cos $\phi$ is such as to maximize the extent of the focused region in the presence of vertical maneuvers.

Before proceeding with a detailed description of the contemplated interpolation process, it will be instructive at this point to recall that the result of stretch processing of the chirp waveform from a point target located within the mapped region is a relatively long fixed frequency tone whose frequency is a function of the range to the target. The received tones are sampled with an A/D at a fixed rate with the result that the point target is thereby converted to a phase gradient in the sampled domain for that pulse. This process is repeated over many pulses and a two-dimensional sampled phase plane results.

Since the PRF is significantly higher than the frequency extent of the ultra high resolution (UHR) map, the initial returns are over sampled in the azimuth direction. Consequently, these data are thinned in the presummer/roughing filter to obtain a lower sample rate. In order to suppress aliasing around the filter output sample lines, the roughing filter is sampled at approximately twice the bandwidth occupied by the mapped region which restricts the phase quadrant (the phase difference between successive data points) to $\pm 90°$ for points at the edges of the map.

The basic equation for the phase, P, of a given sample is:

$$P_{n,m} = 2\pi\left(\frac{mM_x}{M} + \frac{nmM_x}{NMB} - \frac{nN_y}{N}\right) \qquad \text{Eq. (21)}$$

where:
N = number of samples in the range dimension
$N_y$ = y position of point target expressed as an output index number
n = input index number in range
M = number of samples in the azimuth dimension
$M_x$ = x position of point target expressed as an output index number
m = input index number in azimuth
B = resolution factor (resolution $\div \lambda/2$)

If the middle term in the foregoing equation were zero, the phase would be the linear superposition of two independent functions and two orthogonal FFTs could be performed to obtain the map. The center term is not zero except, of course, for $M_x = 0$ at the map center. This is due to differential range slip and is, as explained hereinabove, inherent in all synthetic aperture maps.

The function $P_{n,m}$ can be converted to a function $P_{n,k}$ of the form $$P_{n,k} = 2\pi\left(\frac{kM_x}{M} - \frac{nN_y}{N}\right) \qquad \text{Eq. (22)}$$

Since, strictly speaking, the radar system 10 (FIG. 1) operates on complex voltages, the index, k, may be treated as a noninteger with different gradient values depending on n. A fractional counter (not shown) may then be used to increment k. Samples for interpolation may then be selected by the integer portion of the fractional counter and the weights to be applied by the fractional part of the counter. For a given n, the interpolation process will generate harmonics. The nature of the harmonics, which have frequencies that are a function of n, is that when the range FFT is performed, they tend to smear into several Doppler filters. This smearing tends to reduce the harmonic power in a single Doppler filter.

As mentioned briefly hereinabove, the contemplated UHR signal processing mode utilizes a self-focus technique to correct for quadratic phase errors in the map data introduced by inertial instrument drift. If uncompensated, these errors would degrade the focus quality of the map in the cross-range dimension thereby increasing the amplitude of the near-in sidelobes and ultimately broadening the cell width.

The self-focus technique consists of dividing the data record obtained from a mapping dwell into subrecords in which the quadratic phase error is small enough to be ignored. Each of these subrecords is subsequently used to generate a map in which strong point targets can be identified. Although the resolution of these maps will be poorer than that specified for the UHR mode, it will still be sufficient to permit an accurate determination of target location in each of them. The principal effect of the quadratic phase error produced by instrument drift is to cause the images of fixed point targets to change their locations systematically in successive maps. Thus, it is possible to estimate the magnitude of the error by tracking the apparent motion of these targets. The contemplated self-focus technique extracts acceleration correction information in this manner and applies these corrections to the map data gathered during the entire dwell to form a well focused, high resolution map from the corrected data.

Having described a preferred embodiment of the contemplated system, it will now be apparent to one of skill in the art that many changes may be made without departing from our inventive concepts. That is to say, the actual structural elements making up a system according to our inventive concepts may be changed from those illustrated so long as the resulting system is operative as described. In particular, the provisions here made for: (a) compensating for the error due to the presence of a radome and for vibration of the antenna; (b) the assembly, in effect, of a number of radars using a single array antenna assembly with a "four-axis" gimbal to make up a monopulse radar which may be operated as a synthetic aperture radar on a maneuvering aircraft; (c) the "three-phase" monopulse arrangement to improve operation in the presence of clutter; (d) the arrangement of a sidelobe cancelling antenna located at the phase center of each quadrant of the single array antenna assembly to render the system almost impervious to electronic countermeasures which would incapacitate any known system; and (e) the methods used to generate and to process signals so that maps with various degrees of resolution may be generated even in the presence of jamming signals, broadly distinguish our inventive concepts. It is felt, therefore, that this invention should not be restricted to its disclosed embodiment, but rather should be limited only by the spirit and scope of the appended claims.

What is claimed is:

1. In a monopulse radar system utilizing a phased array antenna with a four-element diamond feed connected to a pair of azimuth phase centers and to a pair of elevation phase centers to provide requisite signals for monopulse operation, such radar system and such array antenna being mounted on a moving aircraft with the boresight line of such array antenna pointed toward a reference point on the underlying terrain as such aircraft moves at a known velocity, the method of processing pulse echo signals received by such antenna comprising the steps of:

(a) at a first moment in time, transmitting a first pulse of radio-frequency energy to illuminate the underlying terrain around the reference point and receiving echo signals from each reflecting element on such illuminated terrain;

(b) converting, in a separate receiving channels, the echo signals at each one of the pair of azimuth phase centers and the echo signals at each one of the elevation phase centers to corresponding intermediate frequency signals;

(c) delaying the intermediate frequency signal corresponding to the echo signal at the first one of the pair of azimuth phase centers;

(d) at a second moment in time, when the line of sight between the second one of the azimuth phase centers to the reference point is coincident with the line of sight between the first one of the azimuth phase centers extant at the first moment in time, transmitting a second pulse of radio frequency energy to illuminate the same underlying terrain as was illuminated by the first pulse of radio frequency energy and receiving echo signals from each reflecting element on such illuminated terrain;

(e) converting, in the separate receiving channels, the received echo signals to corresponding intermediate frequency signals;

(f) phase shifting, to compensate for the difference in distances between the reference point and the first and the second azimuth phase centers, the intermediate frequency signal corresponding to the radio frequency signal at the second one of the azimuth phase centers at the second moment in time;

(g) determining the difference between the delayed intermediate frequency signal and the phase shifted intermediate frequency signal;

(h) determining the average of the intermediate frequency signals corresponding to the pair of radio frequency signals at the pair of elevation phase centers; and (i) determining the monopulse ratio of the signals resulting from steps (g) and (h).

* * * * *